(12) United States Patent
Park et al.

(10) Patent No.: US 11,870,717 B2
(45) Date of Patent: Jan. 9, 2024

(54) METHOD FOR TRANSMITTING AND RECEIVING CHANNEL STATE INFORMATION REFERENCE SIGNAL IN WIRELESS COMMUNICATION SYSTEM, AND APPARATUS

(71) Applicant: LG ELECTRONICS INC., Seoul (KR)

(72) Inventors: Haewook Park, Seoul (KR); Jonghyun Park, Seoul (KR); Kijun Kim, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1462 days.

(21) Appl. No.: 16/088,050

(22) PCT Filed: Mar. 24, 2017

(86) PCT No.: PCT/KR2017/003187
§ 371 (c)(1),
(2) Date: Sep. 24, 2018

(87) PCT Pub. No.: WO2017/164688
PCT Pub. Date: Sep. 28, 2017

(65) Prior Publication Data
US 2023/0155758 A1    May 18, 2023

Related U.S. Application Data

(60) Provisional application No. 62/313,116, filed on Mar. 24, 2016, provisional application No. 62/315,642,
(Continued)

(51) Int. Cl.
*H04L 5/00* (2006.01)
*H04J 11/00* (2006.01)

(52) U.S. Cl.
CPC ............ *H04L 5/0048* (2013.01); *H04J 11/00* (2013.01); *H04J 2011/0006* (2013.01)

(58) Field of Classification Search
CPC .... H04J 11/00; H04L 27/2613; H04L 5/0048; H04B 7/0626
See application file for complete search history.

(56) References Cited

U.S. PATENT DOCUMENTS

| 2016/0013906 A1* | 1/2016 | Guo ....................... H04B 7/068 370/329 |
| 2016/0050006 A1 | 2/2016 | Ko et al. |

(Continued)

FOREIGN PATENT DOCUMENTS

| KR | 20110091839 | 8/2011 |
| KR | 20130040933 | 4/2013 |

(Continued)

OTHER PUBLICATIONS

Ericsson, On CSI-RS Design, Apr. 3, 2017, 3GPP TSG-RAN WG1, R1-1705900 (Year: 2017).*

(Continued)

*Primary Examiner* — Shukri Taha
(74) *Attorney, Agent, or Firm* — LEE, HONG, DEGERMAN, KANG & WAIMEY

(57) ABSTRACT

An aspect of the present invention provides a method for receiving a channel state information-reference signal (CSI-RS) by a terminal in a wireless communication system, the method comprising the steps of: receiving, from a base station, CSI-RS configuration information indicating a CSI-RS configuration about mapping of the CSI-RS; and receiving, from the base station, the CSI-RS which is transmitted through multiple antenna ports, on the basis of the received CSI-RS configuration information, wherein, when the CSI-RS configuration is a 32-port CSI-RS configuration into which four 8-port CSI-RS configurations are aggregated, a
(Continued)

code division multiplexing (CDM)-8 pattern, in which the number of orthogonal weight vectors is 8, is applied to the 32-port CSI-RS configuration, wherein the CDM-8 pattern may be applied to one resource element (RE)-pair selected for each of the aggregated 8-port CSI-RS configurations.

15 Claims, 35 Drawing Sheets

Related U.S. Application Data filed on Mar. 30, 2016, provisional application No. 62/368,134, filed on Jul. 28, 2016, provisional application No. 62/401,917, filed on Sep. 30, 2016, provisional application No. 62/417,432, filed on Nov. 4, 2016.

(56) References Cited

U.S. PATENT DOCUMENTS

2017/0202014 A1* 7/2017 Moon ............... H04L 5/005
2019/0273544 A1* 9/2019 Cha ................. H04L 1/0026

FOREIGN PATENT DOCUMENTS

KR          20130045137          5/2013
WO       WO2017039399    *   3/2017  ............ H04L 5/003

OTHER PUBLICATIONS

PCT International Application No. PCT/KR2017/003187, International Search Report dated Jun. 28, 2017, 3 pages.
NEC, "Introduction of 12/16 ports CSI-RS for extended cyclic prefix" 3GPP TSG-RAN #84, R1-160383, Feb. 2016, 11 pages.

* cited by examiner (a)

METHOD FOR TRANSMITTING AND RECEIVING CHANNEL STATE INFORMATION REFERENCE SIGNAL IN WIRELESS COMMUNICATION SYSTEM, AND APPARATUS

CROSS-REFERENCE TO RELATED APPLICATIONS

This application is the National Stage filing under 35 U.S.C. 371 of International Application No. PCT/KR2017/003187, filed on Mar. 24, 2017, which claims the benefit of U.S. Provisional Application No. 62/313,116, filed on Mar. 24, 2016, No. 62/315,642, filed on Mar. 30, 2016, No. 62/368,134, filed on Jul. 28, 2016, No. 62/401,917, filed on Sep. 30, 2016, and No. 62/417,432, filed on Nov. 4, 2016, the contents of which are all hereby incorporated by reference herein in their entirety.

TECHNICAL FIELD

The present invention relates to a wireless communication system and, more particularly, to a method for transmitting and receiving a channel state information-reference signal and an apparatus for performing/supporting the method.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed service, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

An object of the present invention is to provide a method for transmitting and receiving channel state information (CSI).

Also, an object of the present invention is to provide an efficient method for aggregating CSI-RS resources having a smaller number of ports to design a CSI-RS resource having a larger number of ports.

Also, an object of the present invention is to provide a method for minimizing overhead which may be incurred as a plurality of CSI-RS resources are aggregated and used.

Also, an object of the present invention is to provide a method for transmitting and receiving a channel state information-reference signal.

Also, an object of the present invention is to provide a method for applying a CDM pattern to achieve full power transmission of a CSI-RS.

Technical objects to be achieved by the present invention are not limited to those described above, and other technical objects not mentioned above may also be clearly understood from the descriptions given below by those skilled in the art to which the present invention belongs.

Technical Solution

A method for receiving a channel state information-reference signal (CSI-RS) by a UE in a wireless communication system according to one aspect of the present invention comprises receiving, from an eNB, CSI-RS configuration information about a CSI-RS configuration to which the CSI-RS is mapped; and receiving the CSI-RS transmitted from the eNB through a plurality of antenna ports based on the received CSI-RS configuration information, wherein, when the CSI-RS configuration is a 32-port CSI-RS configuration into which four 8-port CSI-RS configurations are aggregated, a code division multiplexing (CDM)-8 pattern, in which the number of orthogonal weight vectors is 8, is applied to the 32-port CSI-RS configuration, wherein the CDM-8 pattern is applied to one resource element (RE)-pair selected for each of the aggregated 8-port CSI-RS configurations.

Also, the 32-port CSI-RS configuration may comprise aggregation of a first to a fourth 8-port CSI-RS configurations selected from among five 8-port CSI-RS configurations located at a resource block (RB)-pair.

Also, an 8-port CSI-RS configuration '0' including REs located at orthogonal frequency division multiplexing (OFDM) symbol index 5 to 6, subcarrier index 8 to 9 and 2 to 3; an 8-port CSI-RS configuration '1' including REs located at the OFDM symbol index 9 to 10, the subcarrier index 10 to 11 and 4 to 5; an 8-port CSI-RS configuration '2' including REs located at the OFDM symbol index 9 to 10, the subcarrier index 8 to 9 and 2 to 3; an 8-port CSI-RS configuration '3' including REs located at the OFDM symbol index 9 to 10, the subcarrier index 6 to 7 and 0 to 1; and an 8-port CSI-RS configuration '4' including REs located at the OFDM symbol index 12 to 13, the subcarrier index 8 to 9 and 2 to 3.

Also, the first 8-port CSI-RS configuration corresponds to the 8-port CSI-RS configuration '0', the fourth 8-port CSI-RS configuration corresponds to the 8-port CSI-RS configuration '4', and the second and the third 8-port CSI-RS configurations may be selected from the 8-port CSI-RS configurations '1' to '3'.

Also, the second 8-port CSI-RS configuration may correspond to the 8-port CSI-RS configuration '2', and the third 8-port CSI-RS configuration may correspond to the 8-port CSI-RS configuration '3'.

Also, when a first group consisting of aggregation of RE pairs having the highest subcarrier index for each of the aggregated 8-port CSI-RS configurations, a third group consisting of aggregation of RE pairs having the second highest subcarrier index for each of the aggregated 8-port CSI-RS configurations, a second group consisting of aggregation of RE pairs having the third highest subcarrier index for each of the aggregated 8-port CSI-RS configurations, and a fourth group consisting of aggregation of RE pairs having the fourth highest subcarrier index for each of the aggregated 8-port CSI-RS configurations are defined, the same CDM-8 pattern is applied to each of the first to the fourth groups.

Also, coordinates (k', l') of RE pairs belonging to the first group correspond to (9, 5) and (9, 6); (9, 9) and (9, 10); (7, 9) and (7, 10); and (9, 12) and (9, 13); the coordinates of the RE pairs belonging to the third group correspond to (8, 5) and (8, 6); (8, 9) and (8, 10); (6, 9) and (6, 10); and (8, 12) and (8, 13); the coordinates of the RE pairs belonging to the second group correspond to (3, 5) and (3, 6); (3, 9) and (3, 10); (1, 9) and (1, 10); and (3, 12) and (3, 13); and the coordinates of the RE pairs belonging to the fourth group correspond to (2, 5) and (2, 6); (2, 9) and (2, 10); (0, 9) and (0, 10); and (2, 12) and (2, 13), respectively, wherein the k' denotes the subcarrier index within one subframe, and the l' denotes the OFDM symbol index within the one subframe.

Also, 32 CSI-RS antenna ports transmitting the 32-port CSI-RS configuration may be numbered in units of 8-ports.

Also, 32 CSI-RS antenna ports transmitting the 32-port CSI-RS configuration may be numbered according to Eq. 1 below:

$$n = kN + p', \; p' = 15, \ldots, +14+N, \; k = 0, 1, \ldots, K-1, \quad [\text{Eq. 1}]$$

wherein n indicates a final CSI-RS port number determined according to Eq. 1, N indicates the number of antenna ports for each of the aggregated CSI-RS configurations, and k denotes the aggregated CSI-RS configuration number.

Also, antenna port numbers corresponding to the first group may be {15, 16, 23, 24, 31, 32, 39, 40}, antenna port numbers corresponding to the second group may be {17, 18, 25, 26, 33, 34, 41, 42}, antenna port numbers corresponding to the third group may be {19, 20, 27, 28, 35, 36, 43, 44}, and antenna port numbers corresponding to the fourth group may be {21, 22, 29, 30, 37, 38, 45, 46}.

Also, the weight vector of the CDM-8 pattern may be determined by Eq. 2 below:

$$W_0 = [1\;1\;1\;1\;1\;1\;1\;1],$$

$$W_1 = [1\;-1\;1\;-1\;1\;1\;-1\;1\;-1],$$

$$W_2 = [1\;1\;-1\;-1\;1\;1\;-1\;-1],$$

$$W_3 = [1\;-1\;-1\;1\;1\;-1\;-1\;1],$$

$$W_4 = [1\;1\;1\;1\;-1\;-1\;-1\;-1],$$

$$W_5 = [1\;-1\;1\;-1\;-1\;1\;-1\;1],$$

$$W_6 = [1\;1\;-1\;-1\;-1\;-1\;1\;1],$$

$$W_7 = [1\;-1\;-1\;1\;-1\;1\;1\;-1], \quad [\text{Eq. 2}]$$

Also, a CDM-8 pattern of [1 1 1 1 1 1 1 1] may be applied according to the Eq. 2 to CSI-RS transmitted through antenna ports numbered as 15, 17, 19, and 21 according to the Eq. 1, a CDM-8 pattern of [1 −1 1 −1 1 −1 1 −1] may be applied according to the Eq. 2 to CSI-RS transmitted through antenna ports numbered as 16, 18, 20, and 22 according to the Eq. 1, a CDM-8 pattern of [1 1 −1 −1 1 1 −1 −1] may be applied according to the Eq. 2 to CSI-RS transmitted through antenna ports numbered as 23, 25, 27, and 29 according to the Eq. 1, a CDM-8 pattern of [1 −1 −1 1 1 −1 −1 1] may be applied according to the Eq. 2 to CSI-RS transmitted through antenna ports numbered as 24, 26, 28, and 30 according to the Eq. 1, a CDM-8 pattern of [1 1 1 1 −1 −1 −1 −1] may be applied according to the Eq. 2 to CSI-RS transmitted through antenna ports numbered as 31, 33, 35, and 37 according to the Eq. 1, a CDM-8 pattern of [1 −1 1 −1 −1 1 −1 1] may be applied according to the Eq. 2 to CSI-RS transmitted through antenna ports numbered as 32, 34, 36, and 38 according to the Eq. 1, a CDM-8 pattern of [1 1 −1 −1 −1 −1 1 1] may be applied according to the Eq. 2 to CSI-RS transmitted through antenna ports numbered as 39, 41, 43, and 45 according to the Eq. 1, and a CDM-8 pattern of [1 −1 −1 1 −1 1 1 −1] may be applied according to the Eq. 2 to CSI-RS transmitted through antenna ports numbered as 40, 42, 44, and 46 according to the Eq. 1.

Also, the CSI-RS configuration may be set to one of the 32-port CSI-RS configuration which is aggregation of the four 8-port CSI-RS configurations, 20-port CSI-RS configuration which is aggregation of five 4-port CSI-RS configurations, 24-port CSI-RS configuration which is aggregation of three 8-port CSI-RS configurations, and 28-port CSI-RS configuration which is aggregation of 7 four-port CSI-RS configurations.

Also, according to another aspect of the present invention, a UE receiving a CSI-RS in a wireless communication system may comprise a Radio Frequency (RF) unit transmitting and receiving a radio signal; and a processor controlling the RF unit, wherein the processor is configured to receive, from an eNB, CSI-RS configuration information about a CSI-RS configuration to which the CSI-RS is mapped; and to receive the CSI-RS transmitted from the eNB through a plurality of antenna ports based on the received CSI-RS configuration information, wherein, when the CSI-RS configuration is a 32-port CSI-RS configuration into which four 8-port CSI-RS configurations are aggregated, a code division multiplexing (CDM)-8 pattern, in which the number of orthogonal weight vectors is 8, is applied to the 32-port CSI-RS configuration, wherein the CDM-8 pattern is applied to one resource element (RE)-pair selected for each of the aggregated 8-port CSI-RS configurations.

Also, the 32-port CSI-RS configuration may comprise aggregation of a first to a fourth 8-port CSI-RS configurations selected from among five 8-port CSI-RS configurations located at a resource block (RB)-pair.

Advantageous Effects

According to an embodiment of the present invention, a UE may easily derive CSI and provide the derived CSI to an eNB as feedback information.

Also, when a CSI-RS pattern according to an embodiment of the present invention is used, since a CSI-RS pattern of a legacy system is employed, a new and efficient CSI-RS pattern may be derived/used without modifying the legacy system significantly. Also, by doing so, compatibility may be maintained between the new and the legacy systems.

Also, when a CSI-RS pattern according to an embodiment of the present invention is used, full power transmission may be achieved for CSI-RS transmission.

The technical effects of the present invention are not limited to the technical effects described above, and other technical effects not mentioned herein may be understood to those skilled in the art to which the present invention belongs from the description below.

DESCRIPTION OF DRAWINGS

The accompanying drawings, which are included herein as a part of a description in order to help understanding of the present invention, provide embodiments of the present invention, and describe the technical features of the present invention with the description below.

FIG. 21 illustrates 5 legacy CSI-RS configurations available for CSI-RS transmission by 8 CSI-RS antenna ports.

FIG. 28 illustrates a CDM-8 pattern design applied to a 24-port CSI-RS resource/pattern/configuration according to one embodiment of the present invention.

FIG. 29 illustrates a CDM-8 pattern design applied to a 24-port CSI-RS resource/pattern/configuration according to one embodiment of the present invention.

FIG. 30 illustrates CDM-8 patterns according to one embodiment of the present invention.

FIG. 31 illustrates a CDM-8 patterns according to one embodiment of the present invention.

MODE FOR INVENTION

Figure 1:
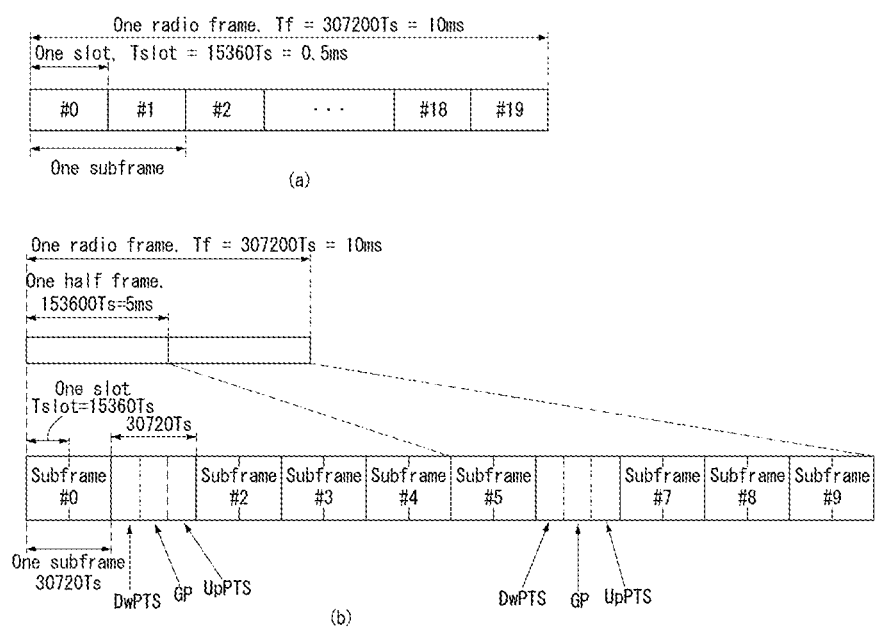
FIG. 1 illustrates the structure of a radio frame in a wireless communication system to which an embodiment of the present invention may be applied.

Some embodiments of the present invention are described in detail with reference to the accompanying drawings. A detailed description to be disclosed along with the accompanying drawings is intended to describe some exemplary embodiments of the present invention and is not intended to describe a sole embodiment of the present invention. The following detailed description includes more details in order to provide full understanding of the present invention. However, those skilled in the art will understand that the present invention may be implemented without such more details.

In some cases, in order to avoid making the concept of the present invention vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the device may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which an Embodiment of the Present Invention May be Applied

FIG. 1 shows the structure of a radio frame in a wireless communication system to which an embodiment of the present invention may be applied.

3GPP LTE/LTE-A support a radio frame structure type 1 which may be applicable to frequency division duplex (FDD) and a radio frame structure which may be applicable to time division duplex (TDD).

In FIG. 1, the size of the radio frame in a time domain is represented as a multiple of a time unit of $T\_s=1/(15000*2048)$. Downlink and uplink transmission includes a radio frame having a period of $T\_f=307200*T\_s=10$ ms.

FIG. 1(a) illustrates the structure of a type 1 radio frame. The type 1 radio frame may be applied to both full duplex and half duplex FDD.

The radio frame includes 10 subframes. One radio frame includes 20 slots of $T\_slot=15360*T\_s=0.5$ ms in length. 0 to 19 indices are assigned to the respective slots. One subframe includes consecutive 2 slots in the time domain, and a subframe i includes a slot 2i and a slot 2i+1. The time taken to send one subframe is called a transmission time period (TTI). For example, the length of one subframe may be 1 ms, and the length of one slot may be 0.5 ms.

In FDD, uplink transmission and downlink transmission are divided in a frequency domain. There is no limit to full duplex FDD, whereas UE cannot send and receive data at the same time in a half duplex FDD operation.

One slot includes a plurality of orthogonal frequency division multiplexing (OFDM) symbols in the time domain and includes a plurality of resource blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of consecutive subcarriers in one slot.

FIG. 1(b) shows a frame structure type 2.

The frame structure type 2 includes two half frames, each having a length of $153600*T\_s=5$ ms. Each half frame includes 5 subframes, each having a length of $30720*T\_s=1$ ms.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, "D" indicates a subframe for downlink transmission, "U" indicates a subframe for uplink transmission, and "S" indicates a special subframe including three types of fields, including a downlink pilot time slot (DwPTS), a guard period (GP), and an uplink pilot time slot (UpPTS).

The DwPTS is used for initial cell search, synchronization or channel estimation in UE. The UpPTS is used for synchronization of uplink transmission for UE and channel estimation in an eNB. The GP is a period for removing interference generated in uplink due to multi-path delay of a downlink signal between uplink and downlink.

Each subframe i includes a slot 2i and a slot 2i+1, each having $T\_slot=15360*T\_s=0.5$ ms length.

An uplink-downlink configuration may be classified into 7 types. The positions and/or number of downlink subframes, special subframes, and uplink subframe are different in each configuration.

Table 2 shows the configuration (the length of a DwPTS/GP/UpPTS) of a special subframe.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of the radio frame according to the example of FIG. 1 is only an example. The number of subcarriers included in a radio frame or the number of slots included in a subframe and the number of OFDM symbols included in a slot may be changed in various ways.

Figure 2:
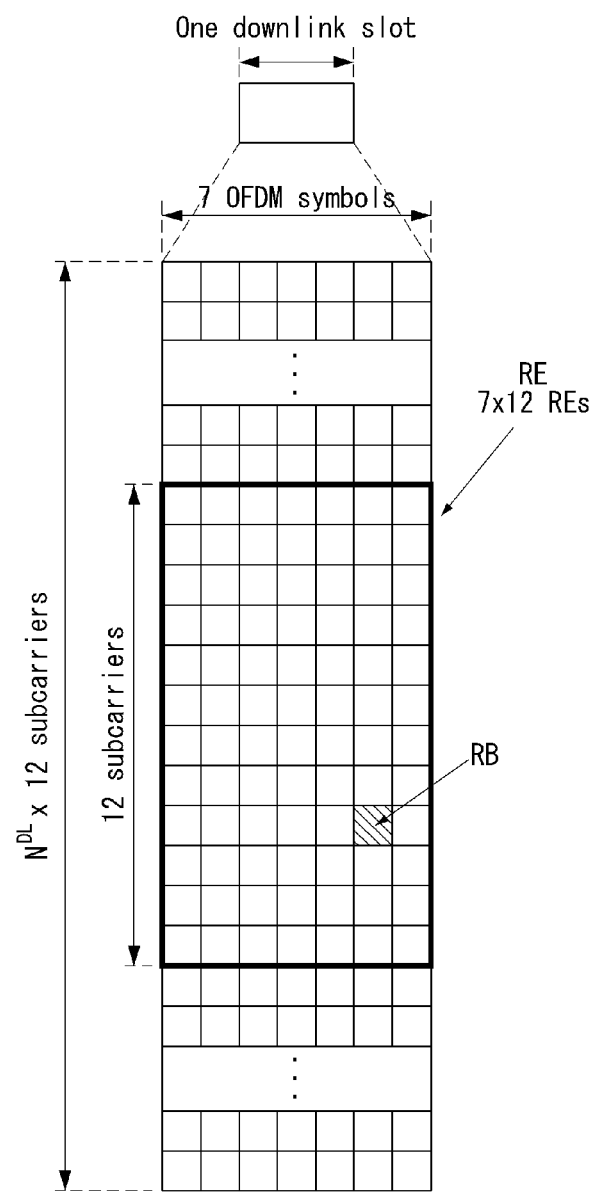
FIG. 2 is a diagram illustrating a resource grid for a downlink slot in a wireless communication system to which an embodiment of the present invention may be applied.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs N^DL included in a downlink slot depends on a downlink transmission bandwidth.

The structure of an uplink slot may be the same as that of a downlink slot.

Figure 3:
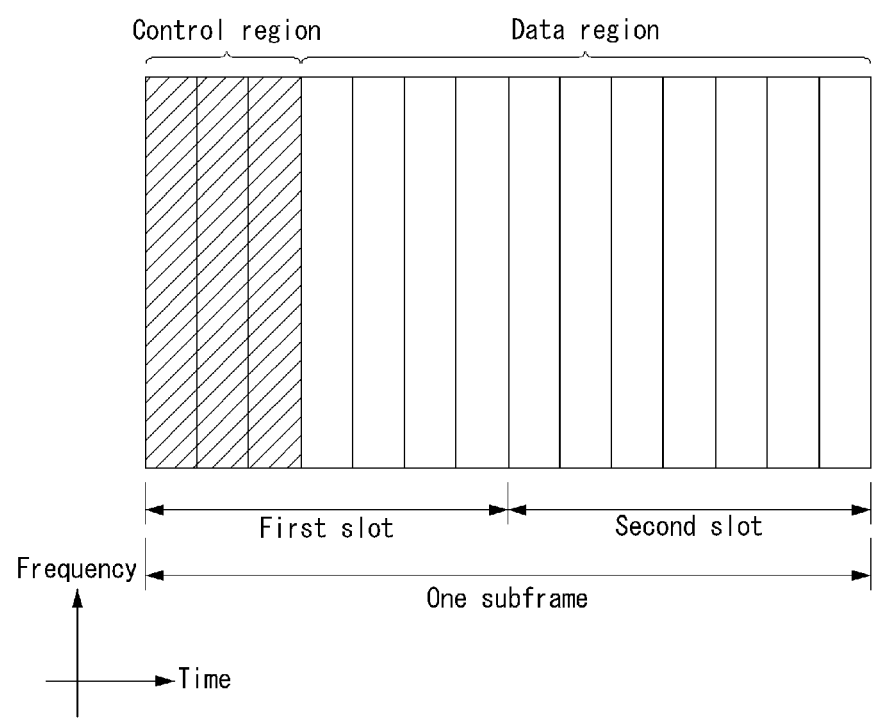
FIG. 3 illustrates the structure of a downlink subframe in a wireless communication system to which an embodiment of the present invention may be applied.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

Figure 4:
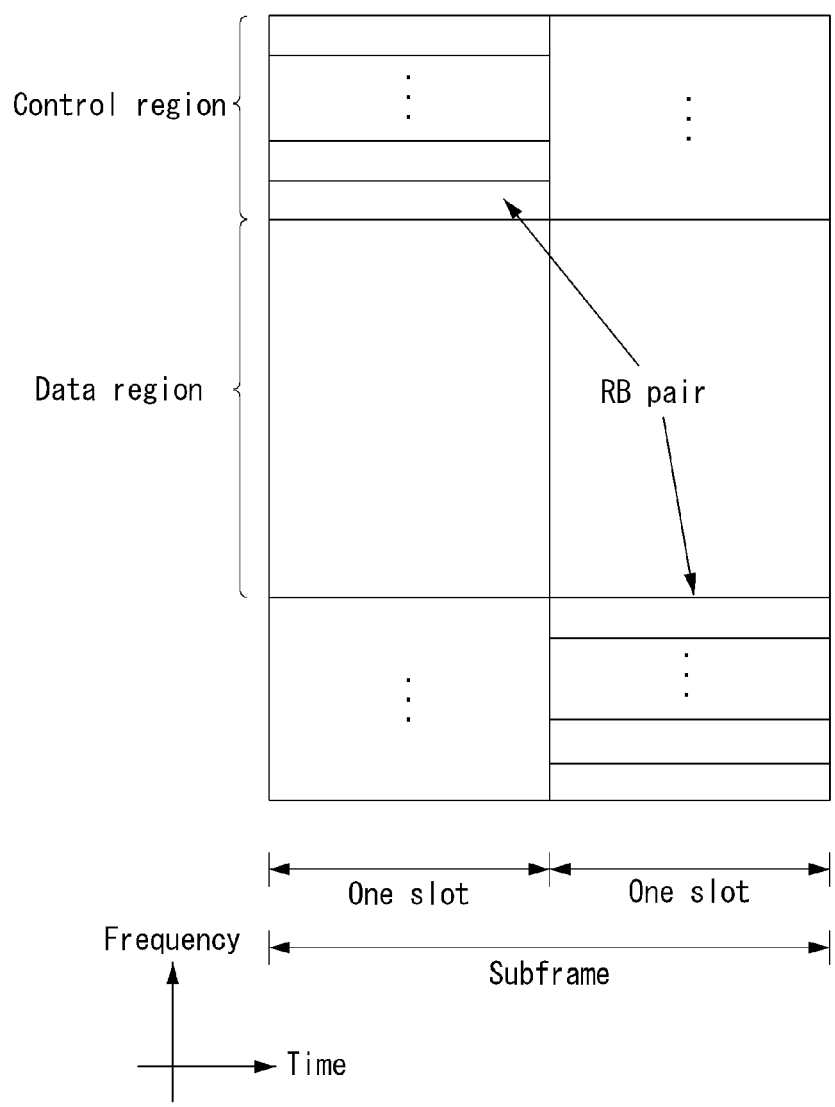
FIG. 4 illustrates the structure of an uplink subframe in a wireless communication system to which an embodiment of the present invention may be applied.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A resource block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna."

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

The multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

Figure 5:
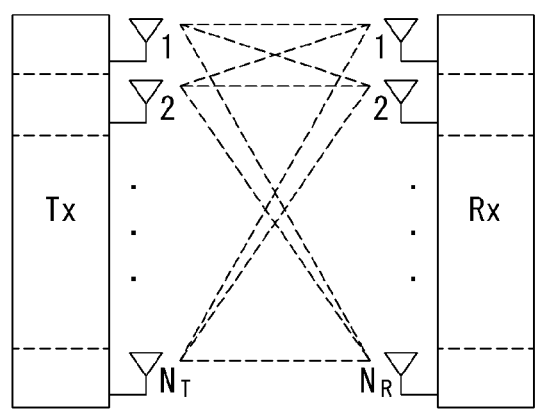
FIG. 5 shows the configuration of a known MIMO communication system.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R) \qquad \text{[Equation 1]}$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trellis code-series method using a diversity gain and a coding gain at the same time. In general, the Trellis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case, may include a maximum likelihood detection (MLD) receiver, a zero-forcing (ZF) receiver, a minimum mean square error (MMSE) receiver, diagonal-bell laboratories layered space-time (D-BLAST), and vertical-bell laboratories layered space-time (V-BLAST). In particular, if a transmission end can be aware of channel information, a singular value decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and N_R reception antennas are present.

First, a transmission signal is described below. If the N_T transmission antennas are present as described above, a maximum number of pieces of information which can be transmitted are N_T, which may be represented using the following vector.

$$s = [s_1, s_2, \ldots, s_{N_T}]^T \qquad \text{[Equation 2]}$$

Transmission power may be different in each of pieces of transmission information s_1, s_2, . . . , s_NT. In this case, if pieces of transmission power are P_1, P_2, . . . , P_NT, transmission information having controlled transmission power may be represented using the following vector.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

In Equation 3, transmission information having controlled transmission power may be represented as follows using the diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

The information vector having controlled transmission power in Equation 4 is multiplied by a weight matrix W, thus forming N_T transmission signals x_1, x_2, . . . , x_NT that are actually transmitted. In this case, the weight matrix functions to properly distribute the transmission information to antennas according to a transport channel condition. The following may be represented using the transmission signals x_1, x_2, . . . , x_NT.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Equation 5]}$$

In Equation 5, w_ij denotes weight between an i-th transmission antenna and a j-th transmission information, and W is an expression of a matrix of the weight. Such a matrix W is called a weight matrix or precoding matrix.

The transmission signal x, such as that described above, may be taken into consideration to be used in the case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, ..., y_NR of the respective antennas are represented as follows using a vector y.

$$y = [y_1, y_2, \ldots, y_{N_R}]^T \qquad \text{[Equation 6]}$$

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

Figure 6:
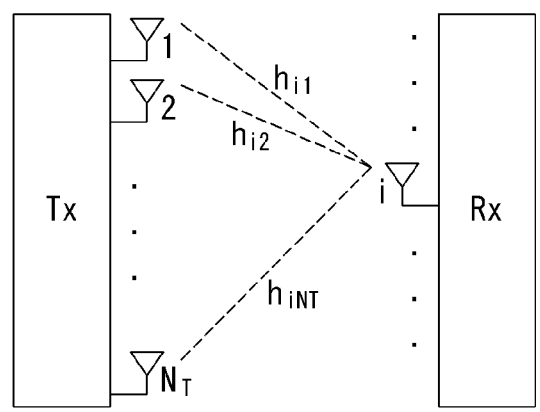
FIG. 6 is a diagram showing a channel from a plurality of transmission antennas to a single reception antenna.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T = [h_{i1}, h_{i2}, \ldots, h_{iN_T}]^T \qquad \text{[Equation 6]}$$

Furthermore, if all channels from the N_T transmission antenna to N_R reception antennas are represented through a matrix expression, such as Equation 7, they may be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \qquad \text{[Equation 8]}$$

Additive white Gaussian noise (AWGN) is added to an actual channel after the actual channel experiences the channel matrix H. Accordingly, AWGN n_1, n_2, ..., n_N_R added to the N_R reception antennas, respectively, are represented using a vector as follows.

$$n = [n_1, n_2, \ldots, n_{N_R}]^T \qquad \text{[Equation 9]}$$

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ \vdots \\ y_i \\ \vdots \\ y_{N_T} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_i \\ \vdots \\ x_{N_T} \end{bmatrix} + \begin{bmatrix} n_1 \\ n_2 \\ \vdots \\ n_i \\ \vdots \\ n_{N_T} \end{bmatrix} = \qquad \text{[Equation 10]}$$

$$Hx + n$$

The number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \leq \min(N_T, N_R) \qquad \text{[Equation 11]}$$

Furthermore, if a matrix is subjected to Eigen value decomposition, a rank may be defined as the number of Eigen values that belong to Eigen values and that are not 0. Likewise, if a rank is subjected to singular value decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Reference Signal (RS)

In a wireless communication system, since data is transmitted through a radio channel, a signal may be distorted during transmission. In order for the receiving end to accurately receive the distorted signal, the distortion of the received signal needs to be corrected using channel information. In order to detect the channel information, a signal transmitting method known to both the transmitter side and the receiver side and a method for detecting the channel information using the degree of distortion when the signal is transmitted through the channel are primarily used. The aforementioned signal is referred to as a pilot signal or a reference signal (RS).

Recently, when packets are transmitted in most mobile communication systems, multiple transmission antennas and multiple reception antennas are adopted to increase data transmission/reception efficiency, unlike the related art using a single transmission antenna and a single reception antenna. In transmission and reception of data using multiple input/output antennas, the channel states between transmission antennas and reception antennas should be detected in order to accurately receive signals. Accordingly, each transmission antenna needs to have an individual reference signal.

In a wireless communication system, RSs can be largely classified into two types according to its purpose. The RSs include an RS for channel information acquisition and RSs for data demodulation. The former is used for acquisition of channel information to downlink by a UE. Thus, the former RS needs to be transmitted in a wideband, and even a UE that does not receive downlink data in a specific subframe needs to receive and measure the RS. In addition, this RS is also used for measurement for mobility management (RRM) such as handover. The latter is an RS that is transmitted together with corresponding resource when a base station transmits downlink data. In this regard, the UE can receive the corresponding RS to estimate the channel and accordingly demodulate data. This RS needs to be transmitted in a region in which data is transmitted.

Downlink reference signals include a common RS (CRS) for acquiring information on channel states shared by all terminals within a cell and measuring handover, etc. and a dedicated RS used for data modulation for a specific terminal. Using these reference signals, information for demodulation and channel measurement may be provided. That is, the DRS is used only for data demodulation, while the CRS is used for two purposes including channel information acquisition and data demodulation.

The receiver side (that is, terminal) measures the channel state from the CRS and feeds back the indicators associated with the channel quality, such as the channel quality indicator (CQI), the precoding matrix index (PMI), and/or the rank indicator (RI) to the transmitting side (that is, base station). The CRS is also referred to as a cell-specific RS. On the contrary, a reference signal associated with a feed-back of channel state information (CSI) may be defined as CSI-RS.

The DRS may be transmitted through resource elements when data demodulation on the PDSCH is required. The terminal may receive whether the DRS is present through the upper layer and is valid only when the corresponding PDSCH is mapped. The DRS may be referred to as a UE-specific RS or a demodulation RS (DMRS).

Figure 7:
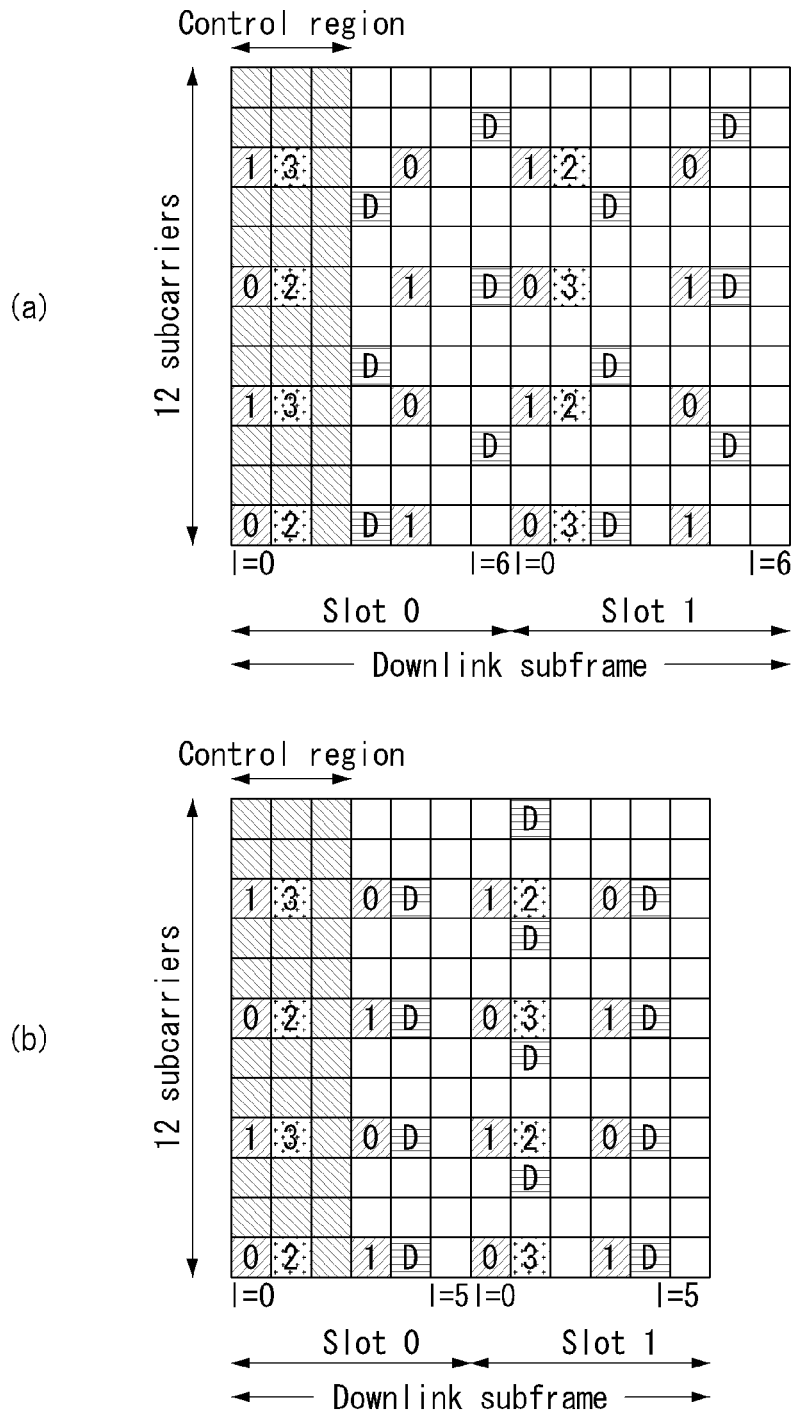
FIG. 7 illustrates a reference signal pattern mapped to a downlink resource block pair in the wireless communication system to which an embodiment of the present invention may be applied.

FIG. 7 illustrates a reference signal pattern mapped to a downlink resource block pair in the wireless communication system to which an embodiment of the present invention may be applied.

Referring to FIG. 7, as a unit by which a reference signal is mapped, a downlink resource block pair may be represented by one subframe in the time domain x 12 subcarriers in the frequency domain. In other words, one resource block pair on the time axis (x-axis) has a length of 14 OFDM symbols in the case of a normal CP (Cyclic Prefix) (in the case of FIG. 7(a)) and has a length of 12 OFDM symbols in the case of an extended CP (in the case of FIG. 7(b)). In the resource block grids, the resource elements (REs) denoted by '0', '1', '2', and '3' indicate the CRS positions of antennas with indices of '0', '1', '2', and '3', respectively; and the resource elements denoted by 'D' indicate DRS positions.

If the base station uses a single transmission antenna, a reference signal for the single antenna port is arrayed.

When the base station uses two transmission antennas, reference signals for two transmitting antenna ports are arrayed by using a time division multiplexing (TDM) scheme and/or a frequency division multiplexing (FDM) scheme. That is, different time resources and/or different frequency resources are allocated to the reference signals for two antenna ports so as to be distinguished from each other.

Moreover, when the base station uses four transmission antennas, reference signals for four transmitting antenna ports are arrayed using the TDM and/or FDM scheme. Channel information measured by a downlink signal receiving side (i.e., a terminal) may be used to demodulate data transmitted by using a transmission scheme such as single transmitting antenna transmission, transmission diversity, closed-loop spatial multiplexing, open-loop spatial multiplexing, or multi-user MIMO.

In the case where the multi-input/multi-output antenna is supported, when the reference signal is transmitted from a specific antenna port, the reference signal is transmitted to the positions of specific resource elements according to a pattern of the reference signal and not transmitted to the positions of the specific resource elements for another antenna port. That is, reference signals among different antennas are not duplicated with each other.

The LTE-A system, which has evolved from the LTE system, has to be designed to support up to 8 transmission antennas for downlink transmission of the base station. Therefore, an RS for up to 8 transmission antennas also has to be supported. The LTE system only defines a downlink RS for up to four antenna ports. Therefore, if the base station in the LTE-A system uses 4 up to 8 downlink transmission antennas, an RS for these antenna ports has to be additionally defined and designed. The RS for up to 8 transmission antennas has to be designed for both an RS for channel measurement and an RS for data demodulation as described above.

One of important factors to be considered in designing the LTE-A system is backward compatibility; namely, an LTE terminal is required to operate smoothly in the LTE-A system, and the system has to also support the operation. In view of RS transmission, an RS has to be defined additionally for up to 8 transmission antenna ports in the time-frequency region in which a CRS defined in the LTE system is transmitted over the whole frequency band at each subframe. If an RS pattern for up to 8 transmission antennas is added in the LTE-A system over the whole frequency band for each subframe in the same way as the CRS of the existing LTE system, the RS overhead becomes too large.

Therefore, RSs newly designed in the LTE-A system may be classified largely into two types: an RS for channel measurement to select MCS, PMI, etc. (CSI-RS: Channel State Information-RS, Channel State Indication-RS, etc.) and an RS for demodulation of data transmitted by 8 transmission antennas (DM-RS: Data Demodulation-RS).

The CSI-RS for channel measurement is designed for the purpose of channel measurement, which is different from the conventional CRS that is used for both measurement, such as channel measurement and handover measurement, and data demodulation. This CSI-RS may also be used for handover measurement, etc. Since the CSI-RS is transmitted only for obtaining channel state information, the CSI-RS does not have to be transmitted for each subframe, as opposed to the conventional CRS. To reduce the overhead of the CSI-RS, the CSI-RS is transmitted intermittently on the time axis.

An LTE-A system supports up to 8 transmission antennas for downlink transmission of the base station. If an RS for up to 8 transmission antennas is transmitted over the whole frequency band for each subframe in the same way as the CRS of the existing LTE system, the RS overhead becomes too large. Therefore, two types of RSs are added to the LTE-A system: a CSI-RS for CSI measurement to select MCS, PMI, etc. and a DM-RS for data modulation. The CSI-RS is designed mainly for CSI acquisition, although it may be used for RRM measurement as well. Since the CSI-RS is not used for data demodulation, the CSI-RS does not have to be transmitted for each subframe. To reduce the overhead of the CSI-RS, the CSI-RS is transmitted intermittently on the time axis. In other words, the CSI-RS may be transmitted repeatedly with a period of an integer multiple of one subframe or transmitted with a specific transmission pattern. At this time, the eNB may determine the period or pattern by which the CSI-RS is transmitted.

To measure a CSI-RS, the UE has to be aware of the information about a transmission subframe index of the CSI-RS for each CSI-RS antenna port of a cell to which the UE belongs, the time-frequency position of a CSI-RS resource element (RE) within the transmission subframe, and a CSI-RS sequence.

The eNB in the LTE-A system has to transmit a CSI-RS to each of up to eight antenna ports. Resources used for CSI-RS transmission of different antenna ports have to be orthogonal to each other. When one eNB transmits CSI-RSs for different antenna ports, the eNB may allocate the resources orthogonally according to the FDM/TDM scheme by mapping the CSI-RS for each antenna port to a different RE. Similarly, the CSI-RSs for different antenna ports may be transmitted according to the CDM scheme in which the CSI-RSs are mapped to orthogonal codes.

When an eNB notifies information of a CSI-RS to a UE in its own cell, the information of the time-frequency in which the CSI-RS for each antenna port is mapped should be notified. Particularly, the information includes the subframe numbers on which the CSI-RS is transmitted, the period of the CSI-RS being transmitted, the subframe offset in which the CSI-RS is transmitted, the OFDM symbol number in which the CSI-RS RE of a specific antenna is transmitted, the frequency spacing, the offset or shift value of RE on the frequency axis.

The CSI-RS is transmitted through 1, 2, 4 or 8 antenna ports. In this case, the antenna port which is used is p=15, p=15,16, p=15, . . . , 18, or p=15, . . . , 22. The CSI-RS may be defined only for the subcarrier interval Δf=15 kHz.

In the subframe configured to transmit the CSI-RS, the CSI-RS sequence is mapped to the complex-valued modulation symbol a_k,l^(p) that is used as a reference symbol on each antenna port (p) as represented by Equation 12 below.

$$a_{k,l}^{(p)} = w_{l''} \cdot r_{l,n_s}(m')$$ [Equation 12]

$$k = k' + 12m + \begin{cases} -0 & \text{for } p \in \{15, 16\}, \text{normal cyclic prefix} \\ -6 & \text{for } p \in \{17, 18\}, \text{normal cyclic prefix} \\ -1 & \text{for } p \in \{19, 20\}, \text{normal cyclic prefix} \\ -7 & \text{for } p \in \{21, 22\}, \text{normal cyclic prefix} \\ -0 & \text{for } p \in \{15, 16\}, \text{extended cyclic prefix} \\ -3 & \text{for } p \in \{17, 18\}, \text{extended cyclic prefix} \\ -6 & \text{for } p \in \{19, 20\}, \text{extended cyclic prefix} \\ -9 & \text{for } p \in \{21, 22\}, \text{extended cyclic prefix} \end{cases}$$

$$l = l' + \begin{cases} l'' & \text{CSI reference signal configurations } 0-19, \text{normal cyclic prefix} \\ 2l'' & \text{CSI reference signal configurations } 20-31, \text{normal cyclic prefix} \\ l'' & \text{CSI reference signal configurations } 0-27, \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{maxDL} - N_{RB}^{DL}}{2} \right\rfloor$$

In Equation 12 above, (k',l') (herein, k' is a subcarrier index in a resource block, and l' represents an OFDM symbol index in a slot) and the condition of n_s is determined according to the CSI-RS configuration shown in Table 3 or Table 4 below.

Table 3 exemplifies the mapping of (k',l') according to the CSI-RS configuration for the normal CP.

TABLE 3

| CSI reference signal configuration | | Number of CSI reference signals configured | | | | | |
|---|---|---|---|---|---|---|---|
| | | 1 or 2 | | 4 | | 8 | |
| | | (k', l') | n_s mod 2 | (k', l') | n_s mod 2 | (k', l') | n_s mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Table 4 exemplifies the mapping of (k',l') according to the CSI-RS configuration for the extended CP.

TABLE 4

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| Frame structure type 1 and 2 | | | | | | |
| 0 | (11, 4) | 0 | (11, 4) | 0 | (11, 4) | 0 |
| 1 | (9, 4) | 0 | (9, 4) | 0 | (9, 4) | 0 |
| 2 | (10, 4) | 1 | (10, 4) | 1 | (10, 4) | 1 |
| 3 | (9, 4) | 1 | (9, 4) | 1 | (9, 4) | 1 |
| 4 | (5, 4) | 0 | (5, 4) | 0 | | |
| 5 | (3, 4) | 0 | (3, 4) | 0 | | |
| 6 | (4, 4) | 1 | (4, 4) | 1 | | |
| 7 | (3, 4) | 1 | (3, 4) | 1 | | |
| 8 | (8, 4) | 0 | | | | |
| 9 | (6, 4) | 0 | | | | |
| 10 | (2, 4) | 0 | | | | |
| 11 | (0, 4) | 0 | | | | |
| 12 | (7, 4) | 1 | | | | |
| 13 | (6, 4) | 1 | | | | |
| 14 | (1, 4) | 1 | | | | |
| 15 | (0, 4) | 1 | | | | |
| Frame structure type 2 only | | | | | | |
| 16 | (11, 1) | 1 | (11, 1) | 1 | (11, 1) | 1 |
| 17 | (10, 1) | 1 | (10, 1) | 1 | (10, 1) | 1 |
| 18 | (9, 1) | 1 | (9, 1) | 1 | (9, 1) | 1 |
| 19 | (5, 1) | 1 | (5, 1) | 1 | | |
| 20 | (4, 1) | 1 | (4, 1) | 1 | | |
| 21 | (3, 1) | 1 | (3, 1) | 1 | | |
| 22 | (8, 1) | 1 | | | | |
| 23 | (7, 1) | 1 | | | | |
| 24 | (6, 1) | 1 | | | | |
| 25 | (2, 1) | 1 | | | | |
| 26 | (1, 1) | 1 | | | | |
| 27 | (0, 1) | 1 | | | | |

Referring to Table 3 and Table 4, for the CSI-RS transmission, in order to decrease the inter-cell interference (ICI) in the multi-cell environment including the heterogeneous network (HetNet) environment, different configurations of maximum 32 (in the case of normal CP) or maximum 28 (in the case of extended CP) are defined.

A CSI-RS configuration differs depending on the number of antenna ports in a cell, and neighboring cells are configured as differently as possible. Also, the CSI-RS configuration may be applied to both an FDD frame and a TDD frame or only a TDD frame, depending on the frame structure.

Based on Table 3 and Table 4, (k',l') and n_s are determined according to the CSI-RS configuration, and time-frequency resources used for CSI-RS transmission are determined for each CSI-RS antenna port.

Figure 8:
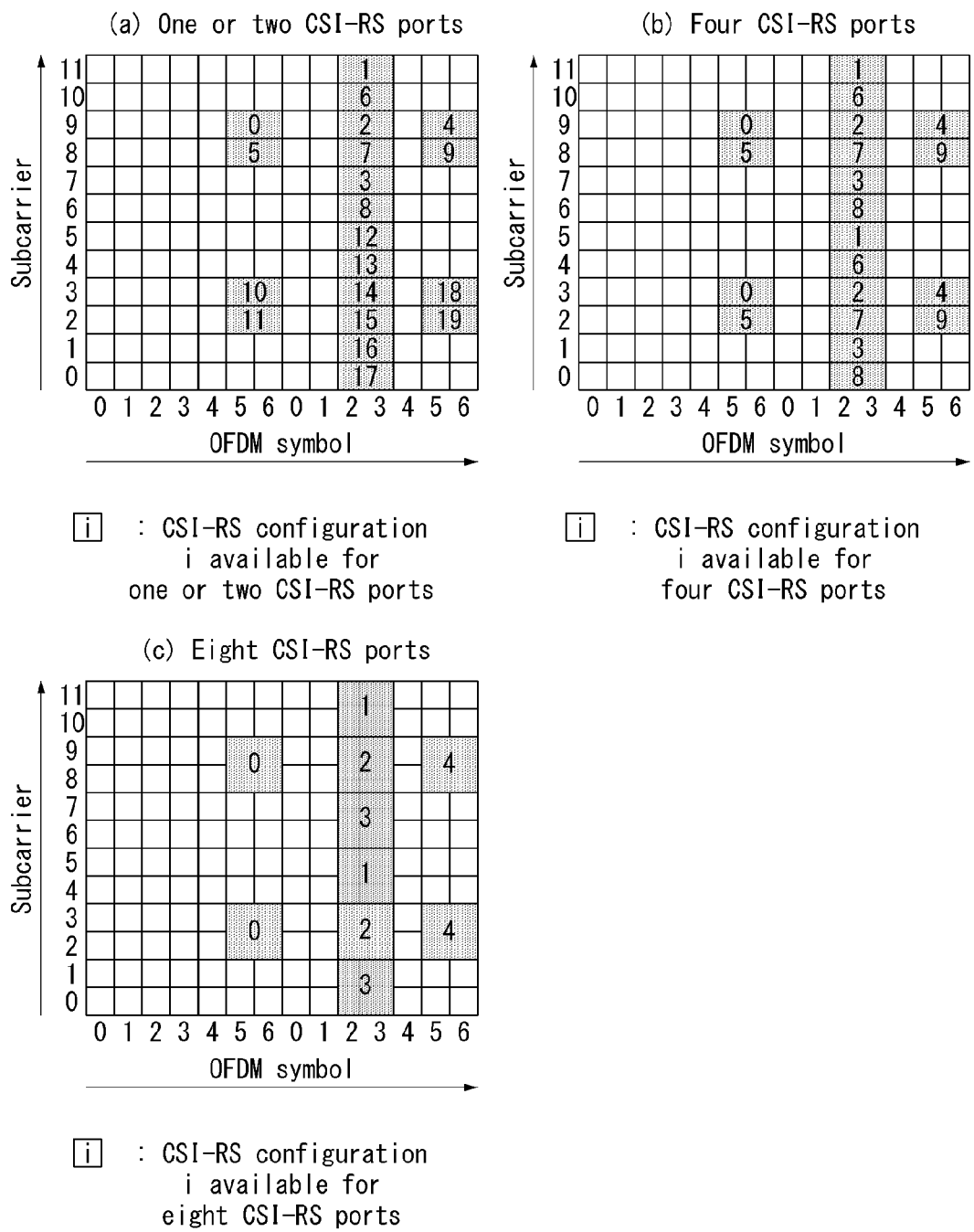
FIG. 8 is a diagram illustrating resources to which reference signals are mapped in a wireless communication system to which the present invention may be applied.

FIG. 8 is a diagram illustrating resources to which reference signals are mapped in a wireless communication system to which the present invention may be applied. Particularly, FIG. 8 illustrates CSI-RS patterns for 1, 2, 4, or 8 CSI-RS antenna ports within a subframe to which normal CP is applied.

(a) of FIG. 8 shows 20 CSI-RS configurations available for CSI-RS transmission by 1 or 2 CSI-RS antenna ports, (b) of FIG. 8 shows 10 CSI-RS configurations available for CSI-RS transmission by 4 CSI-RS antenna ports, and, (c) of FIG. 8 shows 5 CSI-RS configurations available for CSI-RS transmission by 8 CSI-RS antenna ports.

In this way, radio resources (i.e., an RE pair) in which a CSI-RS is transmitted are determined depending on each CSI-RS configuration.

When one or two antenna ports are configured for CSI-RS transmission with respect to a specific cell, the CSI-RS is transmitted on radio resources according to a configured CSI-RS configuration among the 20 CSI-RS configurations shown in (a) of FIG. 8.

Likewise, when four antenna ports are configured for CSI-RS transmission with respect to a specific cell, the CSI-RS is transmitted on radio resources according to a configured CSI-RS configuration among the 10 CSI-RS configurations shown in (b) of FIG. 8. Furthermore, when eight antenna ports are configured for CSI-RS transmission with respect to a specific cell, the CSI-RS is transmitted on radio resources according to a configured CSI-RS configuration among the 5 CSI-RS configurations shown in (c) of FIG. 8.

The CSI-RS for each of the antenna ports is transmitted by CDM on the same radio resource for each of two antenna ports (i.e., {15,16}, {17,18}, {19,20}, {21,22}). For example, although the respective CSI-RS complex symbols are the same for antenna ports 15 and 16, the CSI-RS complex symbols are mapped to the same radio resource by being multiplied by different orthogonal codes (e.g., Walsh code). The complex symbol of the CSI-RS for antenna port 15 is multiplied by [1, 1], and the complex symbol of the CSI-RS for antenna port 16 is multiplied by [1, −1], and the complex symbols are mapped to the same radio resource. This procedure is the same for antenna ports {17,18}, {19,20} and {21,22}.

A UE may detect a CSI-RS for a specific antenna port by multiplying the CSI-RS by code by which a transmitted symbol is multiplied. That is, in order to detect the CSI-RS for the antenna port 15, the UE multiplies the CSI-RS by multiplied code [1 1]. In order to detect the CSI-RS for the antenna port 16, the UE multiplies the CSI-RS by multiplied code [1 −1].

Referring to (a) and (b) of FIGS. 8, if CSI-RS configurations correspond to the same CSI-RS configuration index, radio resources according to a CSI-RS configuration having a larger number of antenna ports include radio resources according to a CSI-RS configuration having a smaller number of CSI-RS antenna ports. For example, in the case of a CSI-RS configuration 0, radio resources for eight antenna ports include both radio resources for four antenna ports and radio resources for one or two antenna ports.

Figure 9:
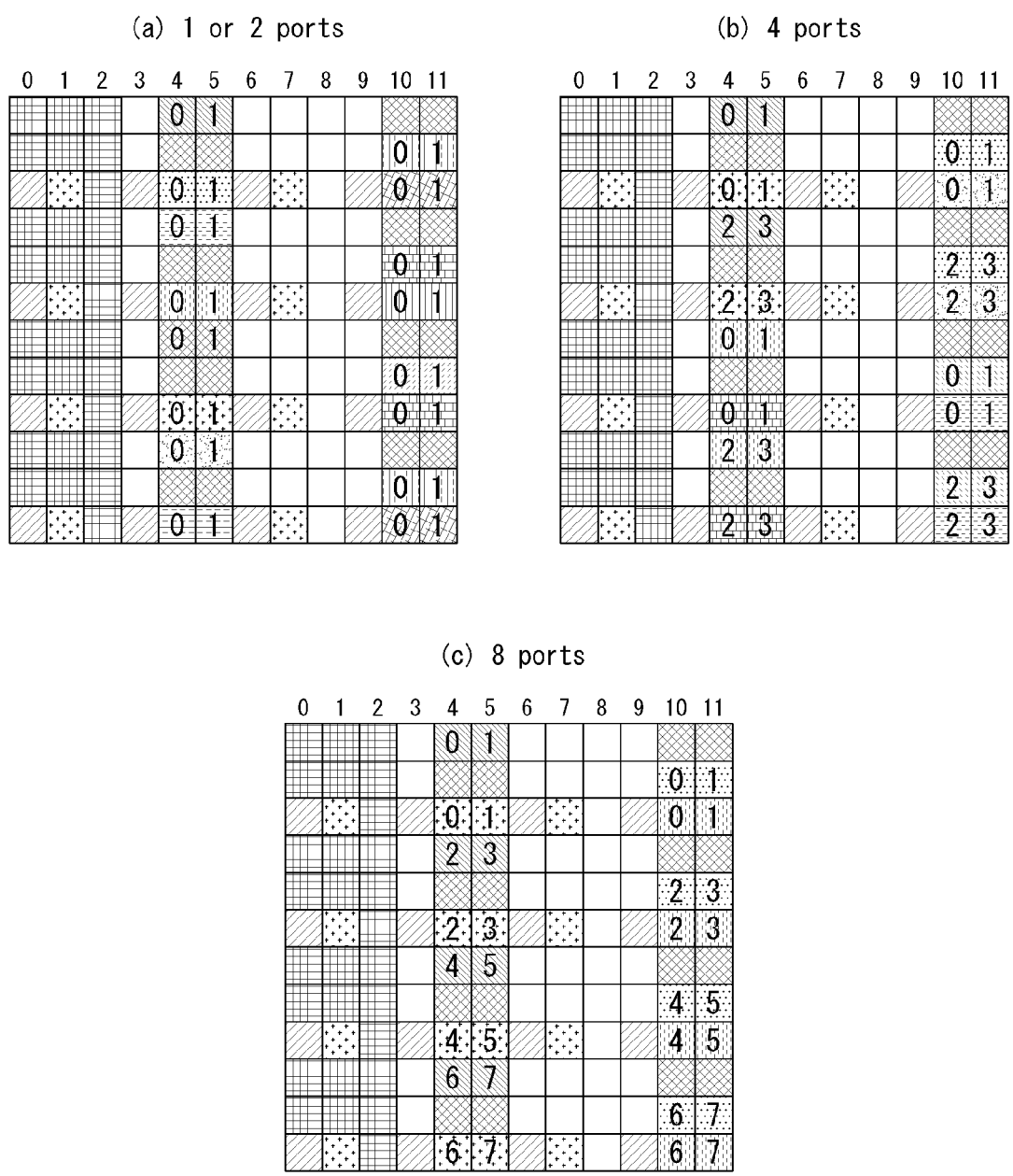
FIG. 9 is a diagram illustrating resources to which reference signals are mapped in a wireless communication system to which the present invention may be applied

FIG. 9 is a diagram illustrating resources to which reference signals are mapped in a wireless communication system to which the present invention may be applied.

Particularly, FIG. 9 illustrates CSI-RS patterns for 1, 2, 4, or 8 CSI-RS antenna ports within a subframe to which extended CP is applied.

(a) of FIG. 9 shows 16 CSI-RS configurations available for CSI-RS transmission by 1 or 2 CSI-RS antenna ports, (b) of FIG. 8 shows 8 CSI-RS configurations available for CSI-RS transmission by 4 CSI-RS antenna ports, and (c) of FIG. 8 shows 4 CSI-RS configurations available for CSI-RS transmission by 8 CSI-RS antenna ports.

In this way, radio resources (i.e., an RE pair) in which a CSI-RS is transmitted are determined depending on each CSI-RS configuration.

When one or two antenna ports are configured for CSI-RS transmission with respect to a specific cell, the CSI-RS is transmitted on radio resources according to a configured CSI-RS configuration among the 16 CSI-RS configurations shown in (a) of FIG. 9

Likewise, when four antenna ports are configured for CSI-RS transmission with respect to a specific cell, the CSI-RS is transmitted on radio resources according to a configured CSI-RS configuration among the 8 CSI-RS configurations shown in (b) of FIG. 9. Furthermore, when eight antenna ports are configured for CSI-RS transmission with respect to a specific cell, the CSI-RS is transmitted on radio resources according to a configured CSI-RS configuration among the 4 CSI-RS configurations shown in (c) of FIG. 9. A plurality of CSI-RS configurations may be used in one cell. Only 0 or 1 CSI-RS configuration may be used in a non-zero power (NZP) CSI-RS, and only 0 or several CSI-RS configurations may be used in a zero power (ZP) CSI-RS.

In a ZeroPower (ZP) CSI-RS that is a bitmap of 16 bits configured by a higher layer, a UE assumes zero transmission power in REs (e.g., excluding an RE redundant with an RE that assumes a NZP CSI-RS configured by a higher layer) corresponding to the 4 CSI-RS columns in Table 3 and Table 4 for each bit set to 1. The most significant bit (MSB) corresponds to the lowest CSI-RS configuration index, and the next bit within the bitmap sequentially corresponds to the next CSI-RS configuration index.

The CSI-RS is transmitted only in a downlink slot satisfying the condition of "n_s mod 2" and a subframe satisfying a CSI-RS subframe configuration, as shown in Table 3 and Table 4.

In the case of the frame structure type 2 (TDD), a CSI-RS is not transmitted in a special subframe, a synchronous signal (SS), a subframe that collides against the transmission of a PBCH or SystemInformationBlockType1 (SIB 1) message, or a subframe configured to send a paging message.

Furthermore, an RE in which a CSI-RS for any antenna port belonging to the antenna port set S (S={15}, S={15, 16}, S={17, 18}, S={19,20} or S={21,22}) is transmitted is not used to send a PDSCH or a CSI-RS for another antenna port.

Data throughput is reduced as CSI-RS overhead increases because time-frequency resource used to send a CSI-RS cannot be used for data transmission. Accordingly, a CSI-RS is not configured to be transmitted for each subframe, but is configured to be transmitted in each specific transmission period corresponding to a plurality of subframes by taking into consideration the reduction in the data throughput. In this case, CSI-RS transmission overhead can be reduced compared to when a CSI-RS is transmitted in each subframe.

A subframe period for CSI-RS transmission (hereinafter referred to as a "CSI transmission period") T_CSI-RS and a subframe offset Δ_CSI-RS are listed in Table 5 below.

Table 5 illustrates CSI-RS subframe configurations.

TABLE 5

| SI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Referring to Table 5, a CSI-RS transmission period T_CSI-RS and a subframe offset Δ_CSI-RS are determined by a CSI-RS subframe configuration I_CSI-RS.

In Table 5, the CSI-RS subframe configuration may be set either by the 'SubframeConfig' field or the 'zeroTxPower-SubframeConfig' field. The CSI-RS subframe configuration may be set with respect to a NZP CSI-RS and a ZP CSI-RS separately.

A subframe including a CSI-RS satisfies Equation 13 below.

$$(10n_f + \lfloor n_s/2 \rfloor - \Delta_{CSI-RS}) \bmod T_{CSI-RS} = 0 \quad \text{[Equation 13]}$$

In Equation 13, T_CSI-RS denotes a CSI-RS transmission period, Δ_CSI-RS denotes a subframe offset value, n_f denotes a system frame number, and n_s denotes a slot number.

In the case of a UE in which transmission mode 9 is set for a serving cell, a single CSI-RS resource may be configured in the UE. In the case of a UE in which transmission mode 10 is set for a serving cell, one or more CSI-RS resources may be configured in the UE.

Massive MIMO

Multiple-input multiple-output (MIMO) systems with a large number of antennas, often called massive MIMO, have received much attention as a means to improve the spectral efficiency, energy efficiency, and processing complexity.

In 3GPP, a discussion has been recently initiated regarding massive MIMO systems in order to meet the requirements of spectral efficiency of future mobile communication systems. Massive MIMO is also called Full-Dimension MIMO (FD-MIMO).

In a wireless communication system after LTE Release (Rel)-12, the introduction of an active antenna system (AAS) is taken into consideration.

Unlike in an existing passive antenna system in which an amplifier and an antenna in which the phase and size of a signal can be adjusted have been separated, the AAS means a system in which each antenna is configured to include an active element, such as an amplifier.

The AAS does not require a separate cable, a connector, and other hardware for connecting an amplifier and an antenna depending on use of an active antenna and thus has high efficiency in terms of energy and an operation cost. In particular, the AAS enables an advanced MIMO technology, such as the forming of an accurate beam pattern or 3-dimensional beam pattern in which beam direction and beam width are taken into consideration, because the AAS supports an electronic beam control method for each antenna.

Due to the introduction of an advanced antenna system, such as the AAS, a massive MIMO structure including a plurality of input/output antennas and a multi-dimensional antenna structure is also taken into consideration. For example, as opposed to the existing straight-line antenna array, if a 2-D (2-dimension) antenna array is formed, a 3-dimensional beam pattern may be formed by the active antenna of the AAS.

Figure 10:
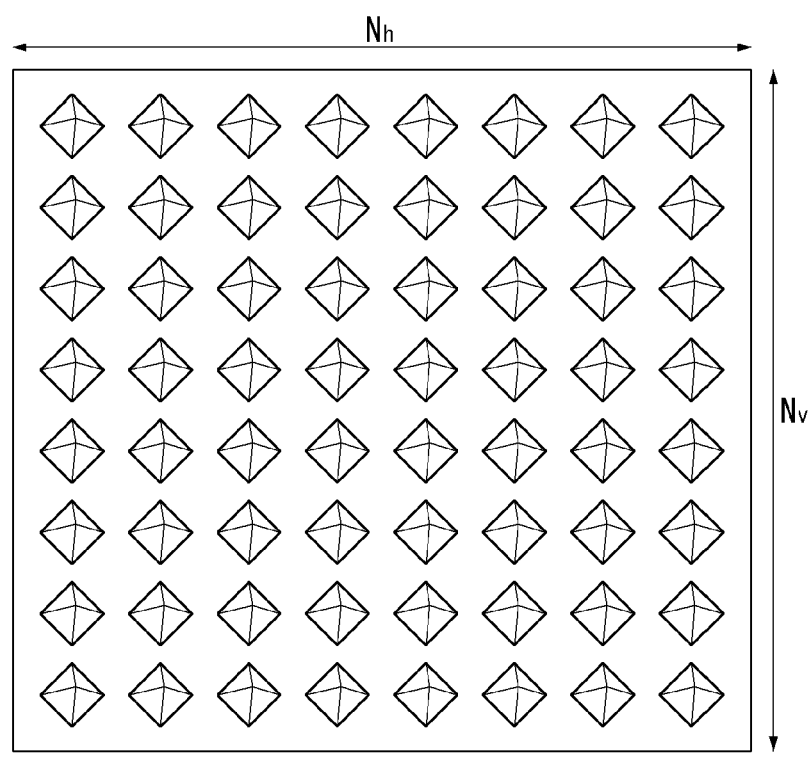
FIG. 10 illustrates a 2-dimensional active antenna system having 64 antenna elements, in a wireless communication system to which the present invention may be applied.

FIG. 10 illustrates a 2-dimensional active antenna system having 64 antenna elements, in a wireless communication system to which the present invention may be applied.

FIG. 10 illustrates a general 2D (2-dimension) antenna array, and N_t=N_v*N_h antennas may have a square shape as in FIG. 10. Here, N_h denotes the number of antenna columns in a horizontal direction, and N_v denotes the number of antenna rows in a vertical direction.

Using such an antenna array with a 2D structure, radio waves may be controlled both in a vertical direction (elevation) and a horizontal direction (azimuth) so as to control transmission beams on a three-dimensional space.

Figure 11:
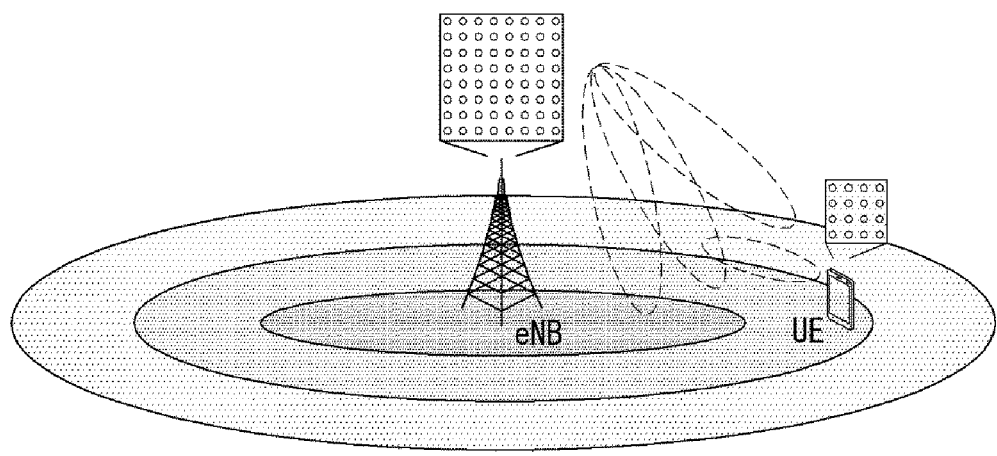
FIG. 11 illustrates a system that a base station or terminal has a plurality of transmission/reception antennas capable of forming an AAS-based 3D (3-Dimension) beam, in a wireless communication system to which the present invention may applied.

FIG. 11 illustrates a system that a base station or terminal has a plurality of transmission/reception antennas capable of forming an AAS-based 3D (3-Dimension) beam, in a wireless communication system to which the present invention may applied.

FIG. 11 is a schematic view of the aforementioned example, which illustrates a 3D-MIMO system utilizing a 2-dimensional antenna array (i.e., 2D-AAS).

If the 3D beam pattern is used from the viewpoint of a transmission antenna, semi-static or dynamic beamforming not only in a horizontal direction of a beam but also in a vertical direction may be performed and, for example, applications such as sectorization of a vertical direction may be considered.

In addition, from the viewpoint of a reception antenna, when a received beam is formed using a massive reception antenna, signal power may be increased according to antenna array gain. Accordingly, in uplink, the base station may receive a signal from the UE via a plurality of antennas. At this time, the UE may set its transmit power very low in consideration of gain of a massive reception antenna in order to reduce interference.

Figure 12:
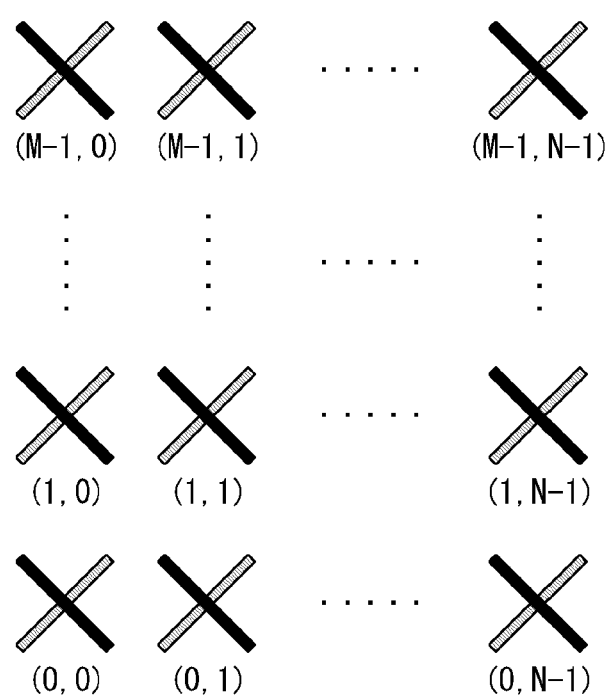
FIG. 12 illustrates a two-dimensional antenna system with cross polarization in a wireless communication system to which the present invention may be applied.

FIG. 12 illustrates a two-dimensional antenna system with cross polarization in a wireless communication system to which the present invention may be applied.

A 2D planar antenna array model with polarization taken into account may be schematized as in FIG. 12.

As opposed to the existing MIMO system using passive antennas, a system based on active antennas may dynamically adjust the gain of antenna elements by applying a weight to an active device (e.g., amplifier) attached (or included) to each antenna element. A radiation pattern depends on an antenna arrangement such as the number of antenna elements, antenna spacing, etc., so the antenna system may be modeled at the antenna element level.

The antenna array model illustrated in FIG. 12 may be represented by (M, N,P) which corresponds to parameters characterizing the antenna array structure.

M represents the number of antenna elements with the same polarization in each column (vertical direction) (i.e., the number of antenna elements with a +45° slant in each column or the number of antenna elements with a −45° slant in each column).

N represents the number of columns in horizontal direction (i.e., the number of antenna elements in horizontal direction).

P represents the number of polarization dimensions. As in FIG. 11, P=2 for cross polarization, and P=1 for co-polarization.

Antenna ports may be mapped to physical antenna elements. An antenna port may be defined by a reference signal associated with the corresponding antenna port. For example, in an LTE system, antenna port 0 may be associated with a CRS (Cell-specific Reference Signal), and antenna port 6 may be associated with a (Positioning Reference Signal) PRS.

For example, antenna ports and physical antennal elements may be mapped to each other one-to-one. This applies when a single cross-polarization antenna element is used for downlink MIMO or downlink transmission diversity. For example, antenna port 0 may be mapped to one physical antenna element, and antenna port 1 may be mapped to another physical antenna element. In this case, for the UE, two downlink transmissions exist. One is associated with a reference signal for antenna port 0, and the other is associated with a reference signal for antenna port 1.

In another example, a signal antenna port may be mapped to multiple physical antenna elements. This applies when this antenna port is used for beamforming. In beamforming, downlink transmission may be directed toward a specific UE by using multiple physical antenna elements. Generally, this may be achieved by using an antenna array consisting of multiple columns of multiple cross-polarization antenna elements. In this case, for the UE, a single downlink transmission exists. One is associated with a reference signal for antenna port 0, and the other is associated with a reference signal for antenna port 1.

That is, antenna ports represent downlink transmissions to a UE, rather than actual downlink transmission from a base station through physical antenna elements.

In another example, a plurality of antenna ports are used for downlink transmission, and each antenna port may be mapped to multiple physical antenna elements. This applies when an antenna array is used for downlink MIMO or downlink diversity. For example, antenna ports 0 and 1 each may be mapped to multiple physical antenna elements. In this case, for the UE, two downlink transmissions exist. One is associated with a reference signal for antenna port 0, and the other is associated with a reference signal for antenna port 1.

In FD-MIMO, the MIMO precoding of a data stream goes through antenna port virtualization, transceiver unit (TXRU) virtualization, and an antenna element pattern.

In antenna port virtualization, a stream on an antenna port is precoded on TXRUs. In TXRU virtualization, a TXRU signal is precoded on antenna elements. In an antenna element pattern, a signal radiated from an antenna element may have a directional gain pattern.

In a conventional transceiver modeling, it is assumed that antenna ports and TXRUs are statically mapped one to one, and a TXRU virtualization effect is integrated in a static (TXRU) antenna pattern that includes both the effects of TXRU virtualization and antenna element patterns.

Antenna port virtualization may be performed in frequency-selective manner. In LTE, an antenna port is defined in conjunction with a reference signal (or pilot). For example, for precoded data transmission on an antenna port, a DMRS is transmitted on the same bandwidth as the data signals, and both DMRS and data are precoded with the same precodeder (or with the same TXRU virtualization precoding). For CSI estimation, on the other hand, CSI-RS is transmitted on multiple antenna ports. For CSI-RS transmissions, the precoder characterizing the mapping between CSI-RS ports and TXRUx can be designed as a unique matrix to enable a UE to estimate a TXRU virtualization precoding matrix for data precoding vectors.

Two TXRU virtualization methods will be discussed: 1D TXRU virtualization and 2D TXRU virtualization, which will be described below with reference to the drawings.

Figure 13:
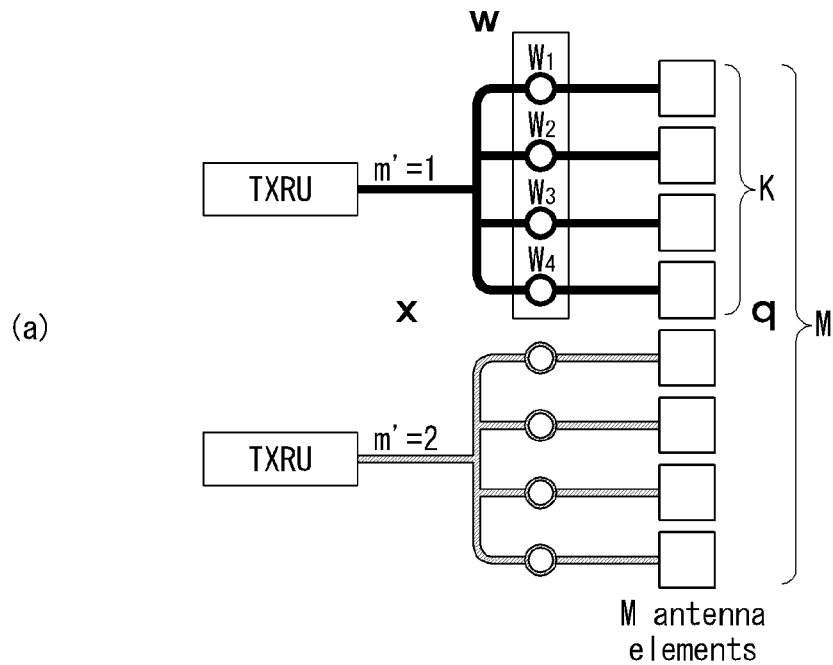
FIG. 13 illustrates a transceiver unit model in a wireless communication system to which the present invention may be applied.
Figure 13:
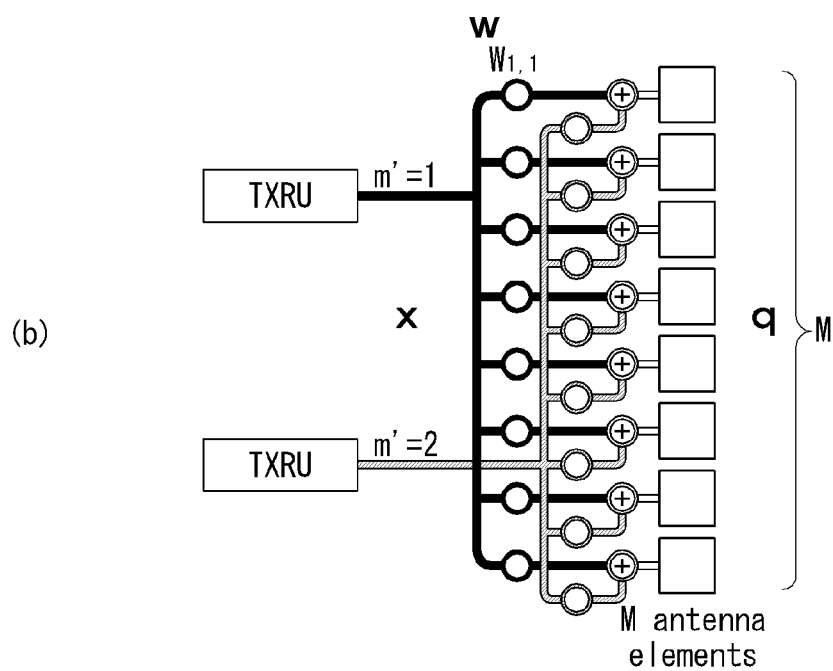

FIG. 13 illustrates a transceiver unit model in a wireless communication system to which the present invention may be applied.

In 1D TXRU virtualization, M_TXRU TXRUs are associated with only those M antenna elements comprising a column antenna array with the same polarization.

In 2D TXRU virtualization, a TXRU model configuration matching the above antenna array model configuration (M, N, P) of FIG. 12 may be represented by (M_TXRU, N, P). Here, M_TXRU denotes the number of 2D TXRUs present in the same polarization in the same column, and M_TXRU≤M is always satisfied. That is, the total number TXRUs is equal to M_TXRU×N×P.

TXRU virtualization models may be divided into a TXRU virtualization model option-1: sub-array partition model shown in (a) of FIG. 13 and a TXRU virtualization model option-2: full-connection model shown in (b) of FIG. 13, depending on the correlation between an antenna element and a TXRU.

Referring to (a) of FIG. 13, in the case of a sub-array partition model, an antenna element is split into multiple antenna element groups, and each TXRU is connected to one of the groups.

Referring to (b) of FIG. 13, in the case of a full-connection model, signals of multiple TXRUs are combined and delivered to a single antenna element (or antenna element array).

In FIG. 13, q is a transmission signal vector of M co-polarized antenna elements within a column. w is a wideband TXRU virtualization weight vector, and W is a wideband TXRU virtualization weight matrix. X is a signal vector of M_TXRU TXRUs.

Here, antenna ports and TXRUs may be mapped 1-to-1 or 1-to-many.

The TXRU-to-element mapping of FIG. 13 is only an example, and the present invention is not limited to the specific example. The present invention may be equally applied in terms of hardware to the mapping between the TXRU and antenna elements that can be implemented in various other forms.

Method for Transmitting and Receiving Channel State Information

In a massive MIMO system which employs a 2D-AAS antenna structure, it is necessary to support/design a CSI-RS pattern for a large number of RS ports so that a UE may obtain CSI and repot the obtained CSI to an eNB. As a typical example, the legacy system supports a I-port, 2-port, 4-port, or 8-port CSI-RS pattern while the Rel. 13 supports a 12-port and 16-port patterns into which existing 4-port and/or 8-port CSI-RS patterns are aggregated. To achieve higher spectral efficiency in a future, it is necessary to consider a new CSI-RS pattern which supports a larger number of ports (for example, 20-port, 24-port, 28-port, 32-port, and 64-port) and a method for configuring the new CSI-RS pattern.

A new CSI-RS pattern and a method for configuring the pattern is worth consideration because, when a Q-port CSI-RS pattern (for example, Q<=MNP) is configured for a UE to support efficient (closed-loop) MIMO transmission from a transmitting end equipped with a large number (for example, M×N×P) of transmit antenna elements, such as a massive MIMO system, the UE is required to be capable of deriving/calculating CSI by measuring the Q-port CSI-RS. In a typical use case, as a non-precoded CSI-RS, when the Q-port CSI-RS is transmitted from a transmitting end, beamforming is not applied to the Q-port CSI-RS, but the Q-port CSI-RS may be transmitted in such a way that each CSI-RS port having wide beam width is transmitted.

The present document provides options that may be taken into account for the design of a new CSI-RS pattern mapped to antenna ports having X (for example, X=18) or more ports, as follows.

First embodiment: method for aggregating 12- and 16-ports defined in the legacy (2-, 4-, and 8-port) system and the Rel. 13.

Second embodiment: method for defining a new pattern

The second embodiment describes a method for defining a plurality of CSI-RS patterns by selecting/using at least one of CSI-RS designs defined/expressed by the first embodiment.

As a more specific embodiment of the first embodiment, a 20-port CSI-RS resource/pattern may be worth consideration. To create a 20-port CSI-RS resource/pattern, ten 2-port CSI-RS resources/patterns or five 4-port CSI-RS resources/patterns may be aggregated. When ten 2-port CSI-RS resources/patterns are aggregated, a total of $_{20}C_{10}$=184756 20-port CSI-RS resources/patterns may be derived while, when five 4-port CSI-RS resources/patterns are aggregated, a total of $_{10}C_5$=252 20-port CSI-RS resources/patterns may be derived.

However, it should be noted that to increase the amount of CSI-RS resources aggregated as described above incurs increased complexity of a related system. Therefore, to prevent the complexity from being increased, the present specification proposes a method for designing a CSI-RS resource/pattern having X (where X is a natural number, and X=18, for example) or more ports by employing aggregation of two CSI-RS resources.

A method for designing a CSI-RS resource/pattern proposed in the present specification proposes configuring a new CSI-RS resource/pattern having 20 or more ports by aggregating a plurality of (for example, two) CSI-RS resources/patterns. At this time, the unit for aggregated ports may be legacy 2-, 4-, and 8-port; 12-, and 16-port defined in the Rel. 13; and a newly defined port larger than 20-port. More specifically, each aggregated CSI-RS resource/pattern may correspond to a "composite CSI-RS resource/pattern", where the composite CSI-RS resource/pattern may mean one CSI-RS resource/pattern defined in the form of aggregation of a plurality of legacy CSI-RS resources/patterns defined in the Rel. 13. For example, the aggregated CSI-RS resource/pattern may mean one 16-port CSI-RS resource/port into which two (legacy) 8-port CSI-RS resources/patterns are aggregated or one 12-port CSI-RS resource/pattern into which three legacy 4-port CSI-RS resources are aggregated.

However, it should be noted that the "composite CSI-RS resource/pattern" defined as aggregation of legacy CSI-RS resources in the present specification does not comprehensively refer to a CSI-RS resource into which legacy CSI-RS resources/patterns are aggregated arbitrarily but may refer only to a CSI-RS resource/pattern aggregated under limited conditions with a specific restriction; only the composite CSI-RS resource/pattern defined as above may correspond to at least one (namely the aggregation unit) of a plurality of (for example, two) CSI-RS resources/patterns aggregated to comprise a new CSI-RS resource/pattern having 20 or more ports.

As a typical example of specific restriction/condition, the number of ports of CSI-RS resources/patterns aggregated into a composite CSI-RS resource/pattern may be limited to have a predefined value. For example, a 16-port CSI-RS resource/pattern, as one of composite CSI-RS resource/pattern allowed, may refer only to a resource/pattern into which 8-port plus 8-port (namely two legacy 8-port CSI-RS resources/patterns) are aggregated while a 12-port CSI-RS resource/pattern may refer only to a resource/pattern into which 4-port plus 4-port plus 4-port are aggregated. In other words, when the number of ports of a CSI-RS resource/pattern aggregated into a specific CSI-RS resource/pattern corresponds to a predefined n-port, the corresponding specific CSI-RS resource/pattern corresponds to a composite CSI-RS resource/pattern and may be used as a unit for CSI-RS resource aggregation proposed in the present specification.

Besides, as a further example of the specific restriction/condition, CDM-2 and/or CDM-4 may be applied limitedly, the RE position to which CDM is applied is restricted to a specific location and/or CDM-x (x>4) may be applied limitedly.

In the present specification, 'CDM-x' may be interpreted as a CDM scheme in which the length of an orthogonal sequence included in a weight vector is x or a CDM scheme in which the number of weight vectors is x.

Also, when a new CSI-RS resource/pattern having 20 ports or more is designed by aggregating a plurality of (for example, 2) CSI-RS resources/patterns, the following limiting conditions may be applied.

For example, in the case where a new CSI-RS resource/pattern having 20 ports or more is designed, a condition may be imposed so that only predetermined resource/patterns are allowed to be aggregated. In other words, different type of aggregation (for example, aggregation of three or more CSI-RS resources/patterns or aggregation of a plurality of CSI-RS resources/patterns, each of which has a different number of ports from each other) other than the predetermined/explicitly indicated/specific aggregation is not allowed, by which implementation complexity of a UE may be kept below a specific level.

At this time, when a new CSI-RS resource/pattern having 20 ports or more is designed by aggregating two CSI-RS resources/patterns, examples of the CSI-RS resource/pattern based on a predetermined/explicitly indicated/specific aggregation allowed may include the following embodiments.

(1) 20-port CSI-RS resource/pattern:
16-port CSI-RS resource/pattern+4-port CSI-RS resource/pattern
12-port CSI-RS resource/pattern+8-port CSI-RS resource/pattern (2) 24-port CSI-RS resource/pattern:
12-port CSI-RS resource/pattern+12-port CSI-RS resource/pattern
20-port CSI-RS resource/pattern+4-port CSI-RS resource/pattern
16-port CSI-RS resource/pattern+8-port CSI-RS resource/pattern (3) 28-port CSI-RS resource/pattern:
12-port CSI-RS resource/pattern+16-port CSI-RS resource/pattern
20-port CSI-RS resource/pattern+8-port CSI-RS resource/pattern (4) 32-port CSI-RS resource/pattern:
16-port CSI-RS resource/pattern+16-port CSI-RS resource/pattern
20-port CSI-RS resource/pattern+12-port CSI-RS resource/pattern
24-port CSI-RS resource/pattern+8-port CSI-RS resource/pattern (5) 64-port CSI-RS resource/pattern:
32-port CSI-RS resource/pattern+32-port CSI-RS resource/pattern The aforementioned embodiments illustrate one example in which two CSI-RS resources/patterns are aggregated, and in the aforementioned embodiment, the order of aggregating CSI-RS resources/patterns having different sizes may be changed.

According to the embodiment described above, two distinctive CSI-RS resources/patterns may be aggregated to form a new CSI-RS resource/pattern having 20 ports or more. However, the present invention is not limited to the aforementioned embodiment; in other words, the aforementioned embodiment may be generalized or extended to the case where a plurality of distinctive CSI-RS resources/patterns are aggregated to form a new CSI-RS resource/pattern having 20 ports or more.

The CSI-RS resources/patterns aggregated according to the aforementioned embodiment may be located within the same RB, located at different subframes separated from each other along the time axis, or located at different RBs (or PRB pairs) separated from each other along the frequency axis. A case which excludes an embodiment in which aggregation is performed within one RB, in other words, an embodiment where aggregation is performed for RBs (or PRB pairs) separated from each other along the time axis or RBs (or PRB pairs) separated from each other along the frequency axis may include the case in which the cell reuse factor is increased or the case in which a CSI-RS resource/pattern exceeding 40 REs defined in the standard is formed.

When CSI-RS resources/patterns are aggregated and existed within one RB, the UE expects that CSI-RS resources/patterns to be aggregated do not overlap with each other. In other words, if CSI-RS resources/patterns to be aggregated partially overlap with each other, the UE may regard the corresponding aggregation as an error case and ignore the corresponding setting. Here, 'no overlap among CSI-RS resources/patterns to be aggregated' may be interpreted that the CSI-RS resources/patterns to be aggregated are not transmitted through the same subframe along the time axis or through the same resource block along the frequency axis.

Therefore, when the aforementioned setting is provided for a UE, a specific restriction may be imposed on the eNB/network that the setting has to be provided only in the form that CSI-RS resources/patterns to be aggregated are not overlapped with each other.

In what follows, for the convenience of descriptions, described in detail will be an embodiment in which, when two CSI-RS resources/patterns are aggregated to form a new CSI-RS resource/pattern having 20 ports or more, the CSI-RS resources/patterns to be aggregated are located at different subframes separated from each other along the time axis or located at different RBs separated with each other along the frequency axis. In the following embodiments, for the convenience of descriptions, it is assumed that two CSI-RS resources/patterns are aggregated to form a new CSI-RS resource/pattern having 20 ports or more; however, the present invention is not limited to the assumption but may be generalized or extended to include embodiments in which a plurality of distinctive CSI-RS resources/patterns are aggregated to form a new CSI-RS resource/pattern having 20 ports or more.

Figure 14:
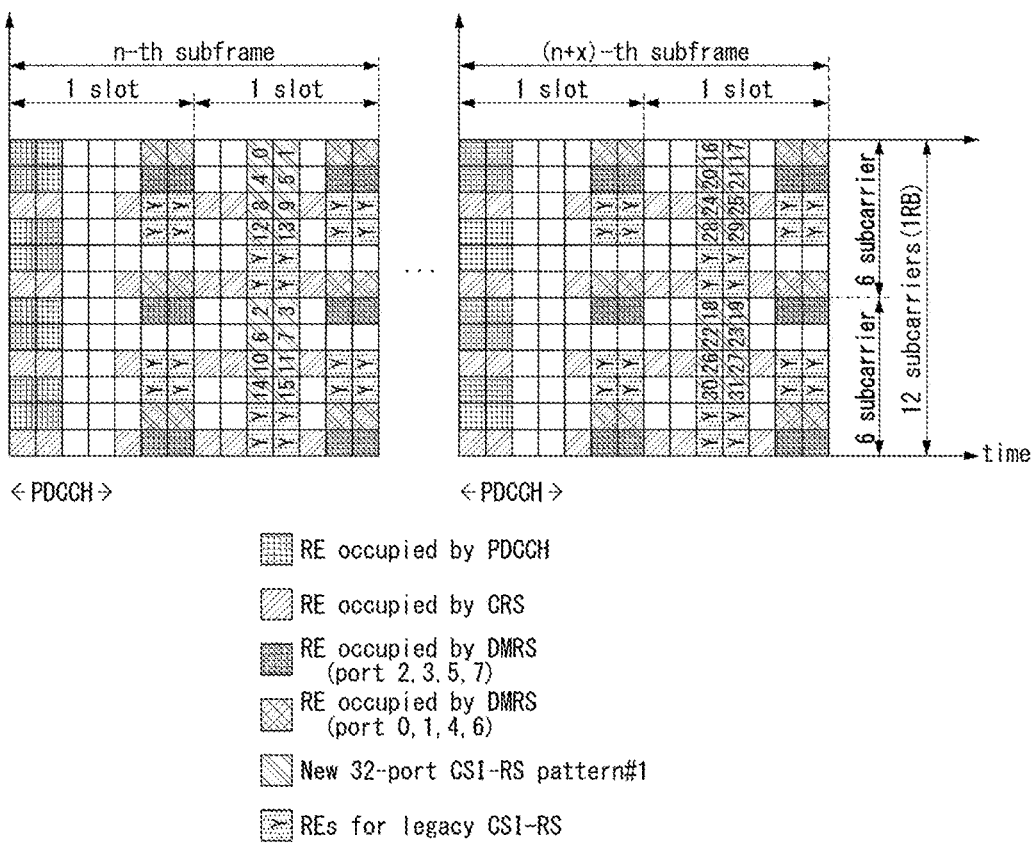
FIG. 14 illustrates a 32-port CSI-RS resource/pattern into which two 16-port CSI-RS resources/patterns are aggregated according to one embodiment of the present invention.

FIG. 14 illustrates a 32-port CSI-RS resource/pattern into which two 16-port CSI-RS resources/patterns are aggregated according to one embodiment of the present invention. In the present figure, the port number, 0, 1, 2, 3, . . . , is an example for the convenience of descriptions, and in fact, the port number, 0, 1, 2, 3, . . . , may be mapped sequentially to the port number such as 15, 16, 17, 18, . . . .

Referring to FIG. 14, the 16-port CSI-RS resources/patterns to be aggregated are located at different subframes. More specifically, two CSI-RS resources/patterns to be aggregated are located (or mapped) at the subframe n (or n-th subframe) and a second subframe n+x (or (n+x)-th subframe separated from the corresponding subframe n by x (x=0, 1, 2, . . . ) respectively to comprise a new CSI-RS resource/pattern having 20 ports or more. If the number of ports of the new CSI-RS resource/pattern becomes 40 or smaller, the corresponding CSI-RS resources/patterns may be aggregated within the same subframe (namely x=0).

Table 5 shows CSI-RS transmission subframe configurations in the LTE system. CSI-RS transmission subframe configuration is defined on the basis of a CSI-RS transmission period and a subframe offset. The CSI-RS transmission period may be set in 5, 10, 20, 40, or 80 subframe units. According to the present invention described in this document, a CSI-RS transmitted according to the time division multiplexing (TDM) scheme may have a different offset value for each CSI-RS resource (at this time, the CSI-RS resource may correspond to a composite CSI-RS resource). In other words, in the example of FIG. 14, when a 32-port CSI-RS resource is composed, the 16-port CSI-RS resource at the subframe n and the 16-port CSI-RS resource/pattern at the subframe n+x may have different CSI-RS offsets from each other. In other words, when a specific composite CSI-RS resource is aggregated to comprise a new CSI-RS resource/pattern, a restriction may be imposed such that TDM may not be applied to the resources/patterns within the corresponding composite CSI-RS resource, and the resources/patterns have to be transmitted all within the same subframe.

Figure 15:
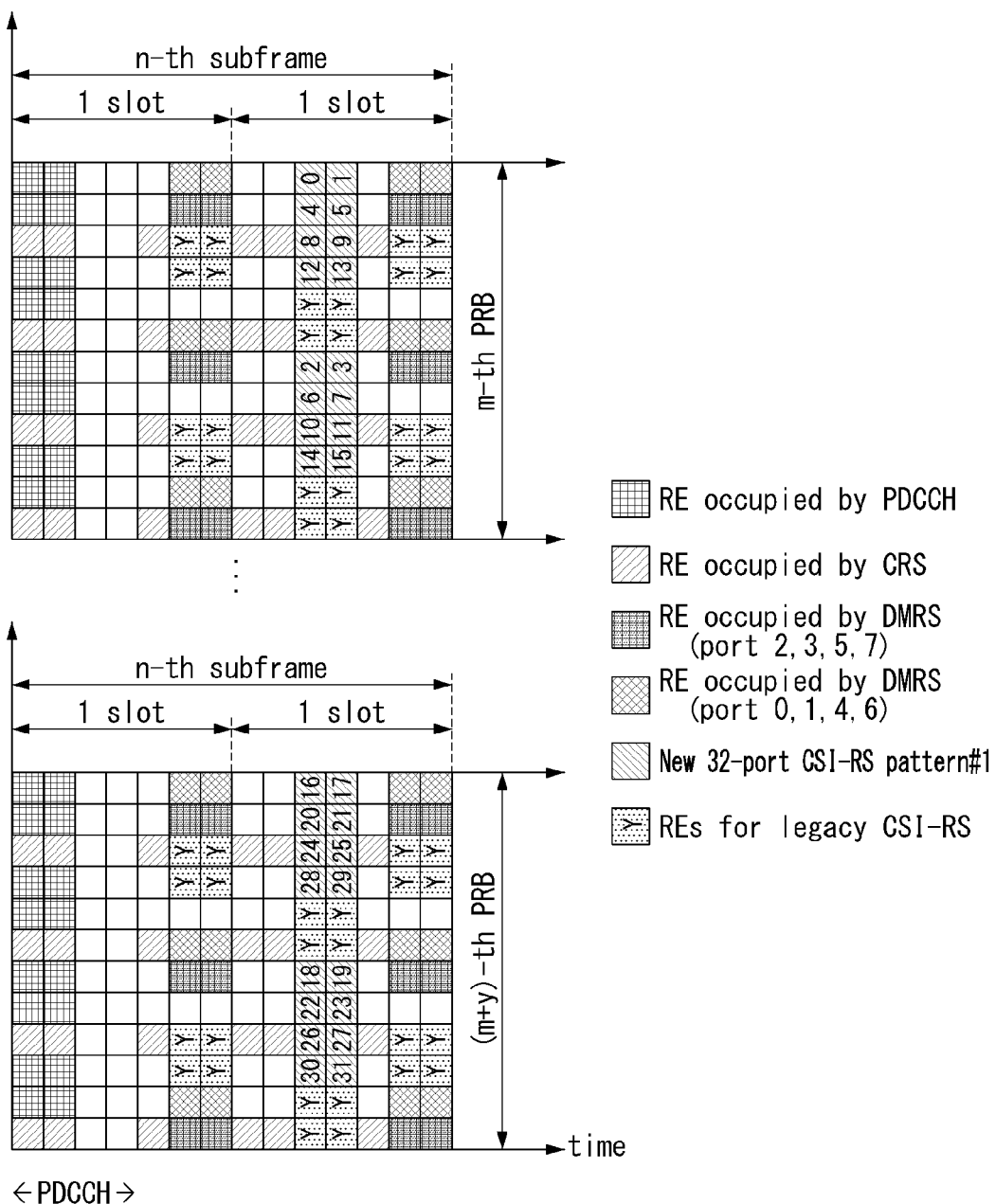
FIG. 15 illustrates a 32-port CSI-RS resource/pattern into which two 16-port CSI-RS resources/patterns are aggregated according to one embodiment of the present invention.

FIG. 15 illustrates a 32-port CSI-RS resource/pattern into which two 16-port CSI-RS resources/patterns are aggregated according to one embodiment of the present invention. In the present figure, the port number, 0, 1, 2, 3, . . . , is an example for the convenience of descriptions, and in fact, the port number, 0, 1, 2, 3, . . . , may be mapped sequentially to the port number such as 15, 16, 17, 18, . . . .

Referring to FIG. 15, the 16-port CSI-RS resources/patterns to be aggregated are located at different RBs within the same subframe. More specifically, two CSI-RS resources/patterns to be aggregated may comprise a new CSI-RS resource/pattern having 20 ports or more as the two CSI-RS resources/patterns are located (or mapped) at the m-th PRB within the subframe n and the (m+y)-the RB separated from the corresponding m-th PRB by y (y=0, 1, 2, . . . ), respectively. If the number of ports of the new CSI-RS resource/pattern becomes 40 or smaller, the corresponding CSI-RS resources/patterns may be aggregated within the same RB (namely y=0).

Figure 16:
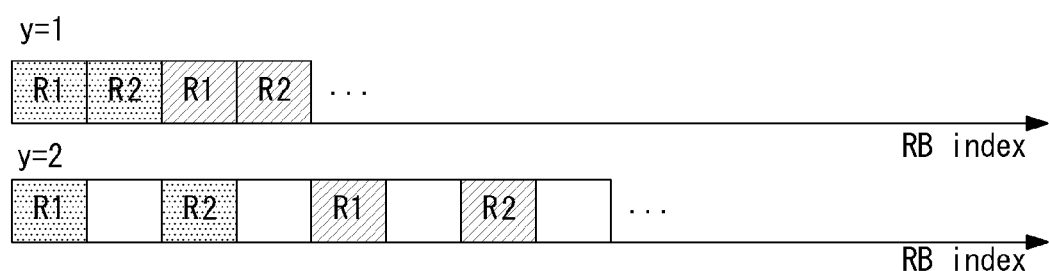
FIG. 16 illustrates a CSI-RS resource pattern design using an FDM scheme according to one embodiment of the present invention.

FIG. 16 illustrates a CSI-RS resource pattern design using an FDM scheme according to one embodiment of the present invention. In FIG. 16, R1 and R2 represent composite CSI-RS resource/pattern 1 and 2 respectively and R1 and R2 having the same pattern are aggregated to comprise a new CSI-RS resource/pattern.

Referring to FIG. 16, when two CSI-RS resources/patterns to be aggregated are located/mapped at neighboring/consecutive RBs within the same subframe (namely when y=1), consecutive two RBs may be frequency-division multiplexed (FDMed), and consecutive 24 subcarriers may comprise a new CSI-RS resource/pattern having X ports (for example, X=18) or more. Also, when two CSI-RS resources/patterns to be aggregated are located/mapped at the RBs separated from each other with one RB between them within the same subframe (namely when y=2), two RBs located at consecutive, odd-numbered indices or two RBs located at even-numbered indices may be FDMed to comprise a new CSI-RS resource/pattern having X ports (for example, X=18) or more.

In the present embodiment, if a composite CSI-RS resource/pattern is used as a constituting element of a new CSI-RS resource/pattern having 20 ports or more, the CSI-RS resources/patterns aggregated within the corresponding composite CSI-RS resource/pattern may not be FDMed, and a condition that the CSI-RS resources/patterns have to be transmitted all within the same RB pair may be imposed.

Meanwhile, although not shown in the figure, in another embodiment, as a combination of the embodiments of FIGS. 14 and 15 described above, aggregation of CSI-RS resources/patterns of the m-th RB within the subframe n and the (m+y)-th RB within the subframe (n+x) may be readily derived/applied/considered.

Figure 17:
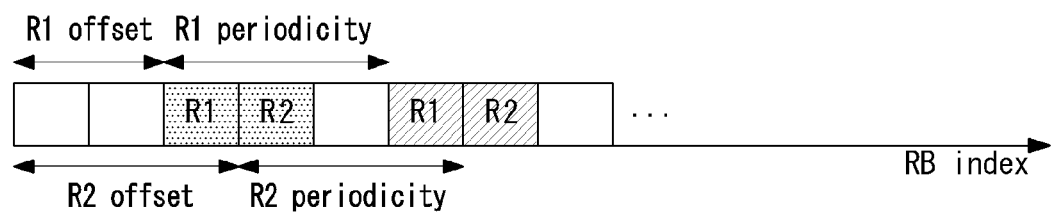
FIG. 17 illustrates a CSI-RS resource/pattern design using an FDM scheme according to one embodiment of the present invention.

FIG. 17 illustrates a CSI-RS resource/pattern design using an FDM scheme according to one embodiment of the present invention.

In order to set a CSI-RS resource/pattern by using the FDM scheme according to the embodiment described above, information such as the CSI-RS transmission (RB) period and RB offset by which a CSI-RS is transmitted/mapped has to be provided additionally to a UE through Radio Resource Control (RRC) signaling in the same way as in the TDM scheme. To this end, in this document, when a new CSI-RS resource/pattern into which a plurality of CSI-RS resources are aggregated through FDM along the frequency axis, each individual CSI-RS resource to be aggregated may be transmitted with frequency spacing of 12c, and the frequency offset may be set to 12d as shown in FIG. 17. At this time, for each CSI-RS resource to be aggregated, c and/or d may be set differently. In other words, it may be restricted such that c and/or d is set differently only for each CSI-RS resource to be aggregated, but c and/or d is not set differently for each port within an individual CSI-RS resource/pattern.

Also, when two CSI-RS resources/patterns are aggregated to comprise a new CSI-RS resource/pattern, the c value related to the period (in what follows, it is called a 'CSI-RS RB period') of an RB to which a CSI-RS is transmitted/mapped may be set to one c value to be applied commonly to two (composite) CSI-RS resources/patterns to be aggregated. In this case, the d value related to the offset (in what follows, it is called a 'CSI-RS RB offset') of an RB to which a CSI-RS is transmitted/mapped may be set individually for each CSI-RS resource/pattern. In other words, while the period of CSI-RS resources (R1, R2) to be aggregated follows an RB period set commonly, the RB offsets (R1 offset and R2 offset) may be set differently for individual resources (R1, R2) to be aggregated. This operation may be interpreted that CSI-RS resources to be aggregated are allowed to be transmitted only after being FDMed with the same RB period as shown in FIG. 17. Through this operation, each CSI-RS resource may have the same RS density.

The c value related to the CSI-RS RB period and the d value related to the CSI-RS RB offset may be defined/set in the form of joint encoding. For example, like subframeConfig used in the present standard to set a time-axis related configuration in the form of joint encoding, the RB period and/or offset may be set, in a frequency-axis related configuration, in the form of joint encoding by a single parameter such as RBconfig (in units of individual CSI-RS resources). If the c value is applied commonly to the CSI-RS resources to be aggregated as described above, it is also possible to set one c value and d values for each individual CSI-RS resource (for example, one c value and two d values (d1, d2)) by defining all of them using joint encoding in a single RBconfig parameter. As a result, this operation may be interpreted that the RBconfig parameter is set/defined from joint encoding of one c value and multiple d values (for example, d1 and d2).

When the embodiment above where two CSI-RS resources/patterns are aggregated to comprise a new CSI-RS resource/pattern is considered, information about x and/or y may be transmitted to the UE through RRC signaling. Here, in the case of (x=y=0, x=y=1), since the UE may implicitly recognize the case, additional RRC signaling may not be required. The RE position of each CSI-RS resource/pattern to be aggregated (for example, the RE position at which each CSI-RS resource/pattern is started) may be informed to the UE for each CSI-RS resource/pattern through RRC signaling.

In order to reduce signaling overhead, a specific configuration (for example, the number of ports) may be set to be the same among CSI-RS resources/patterns to be aggregated. In one embodiment, the number of ports of individual CSI-RS resources/patterns to be aggregated may be limited to a predetermined number so that to generate a 32-port CSI-RS resource/pattern, two 16-port CSI-RS resources/patterns are aggregated/composed, and to generate a 24-port CSI-RS resource/pattern, two 12-port CSI-RS resources/patterns are aggregated. Also, if CSI-RS resources/patterns to be aggregated are located at (or mapped to) different PRBs, a CSI-RS may be limited to be mapped to the same RE position in units of RB pairs.

The Rel. 13 supports CDM-2 and CDM-4 for 12-port and 16-port CSI-RS resources/patterns. When a CSI-RS resource/pattern having 20 ports or more according to the present invention consists of only 12-port or 16-port CSI-RS resources/patterns supported by the CDM-4, the CDM-2 and the CDM-4 may be extended to be supported, and information about which CDM is applied may be delivered to the UE through RRC signaling. However, the CDM-4 applied to the CSI-RS resource/pattern to be aggregated according to the present invention may differ from the CDM-4 applied to the 12-port or 16-port CSI-RS resource/pattern defined in the Rel. 13.

In other words, CDM-4 is applied to the 12-port CSI-RS resource/pattern in a legacy 4-port unit/form (namely, in a unit of two 2RE sets (or two RE pairs) separated by 6 subcarriers, for which CDM is applied), and CDM-4 is applied to 2 by 2 REs (REs forming two rows and two columns) adjacent to each other in the case of 16-port CSI-RS resource/pattern. On the basis of the aforementioned scheme, in the case of a CSI-RS resource/pattern having X-ports (for example, X=18) or more which consists of aggregation of a plurality of CSI-RS resources/patterns according to an embodiment of the present invention, different CDM-4 may be applied to each resource/pattern to be aggregated.

In one embodiment, when a 28-port CSI-RS resource/pattern consists of aggregation of a 16-port CSI-RS resource/pattern and a 12-port CSI-RS resource/pattern, CDM-4 is applied to neighboring 2 by 2 REs for the case of the 16-port CSI-RS resource/pattern to be aggregated, CDM-4 is applied in the form of a legacy 4-port for the case of a 12-port CSI-RS resource/pattern to be aggregated, and the UE performs the operation for implementing the aforementioned embodiment.

Also, if CDM-4 is applied to at least one of CSI-RS resources/patterns to be aggregated in a legacy 4-port unit/form, it may be defined so that the CDM-4 in a legacy 4-port unit/form has to be applied to a CSI-RS resource/pattern having X-ports (for example, X=18) or more which consists of aggregation of the corresponding CSI-RS resources/patterns. In other words, when an eNB/network provides a UE with a CDM-related configuration to be applied to a CSI-RS resource/pattern, an additional restriction may be imposed on the configuration that the same CDM-4 pattern is applied to CSI-RS resources/patterns to be aggregated.

When the scheme based on application of CDM-4 is used, and a CSI-RS resource/pattern the number of ports of which is larger than 24 REs for CSI-RS resources/patterns defined at OFDM symbol 9 and 10 is transmitted as in a 28- or 32-port CSI-RS resource/pattern, full power transmission may not be possible. This is so because, when CDM-4 is applied to a CSI-RS resource/pattern mapped to the 5, 6-th or the 12, 13-th OFDM symbol rather than the 9, 10-th OFDM symbol, it is difficult to obtain 6 dB boosting. Therefore, to achieve full power transmission of a 28- and 32-port CSI-RS resources/patterns, the present invention proposes an embodiment in which an FDM or TDM scheme for reducing CSI-RS density is applied/set, as follows. In other words, if CDM-4 is set for a CSI-RS resource/pattern having 24-ports or more, the corresponding CSI-RS resource/pattern may be restricted/set to be transmitted according to the FDM or TDM scheme, where the restriction/setting may be indicated through RRC signaling by an eNB.

When the aforementioned embodiment is applied, only those CSI-RS resources/patterns having ports the number of which is a multiple of 4, for example, 20-port, 24-port, 28-port, 32-port, or 64-port, may be configured limitedly. Therefore, in what follows, to configure a CSI-RS resource/pattern having a various number of ports, a method for configuring a 6-port and 10-port CSI-RS resource/pattern will also be proposed.

Figure 18:
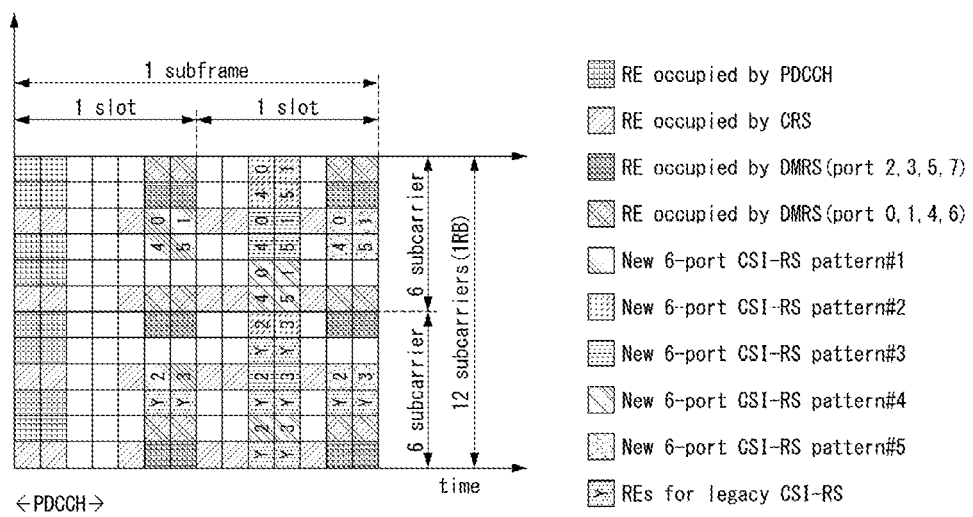
FIGS. 18 and 19 illustrate a method for configuring a 6-port CSI-RS resource/pattern according to an embodiment of the present invention.
Figure 19:
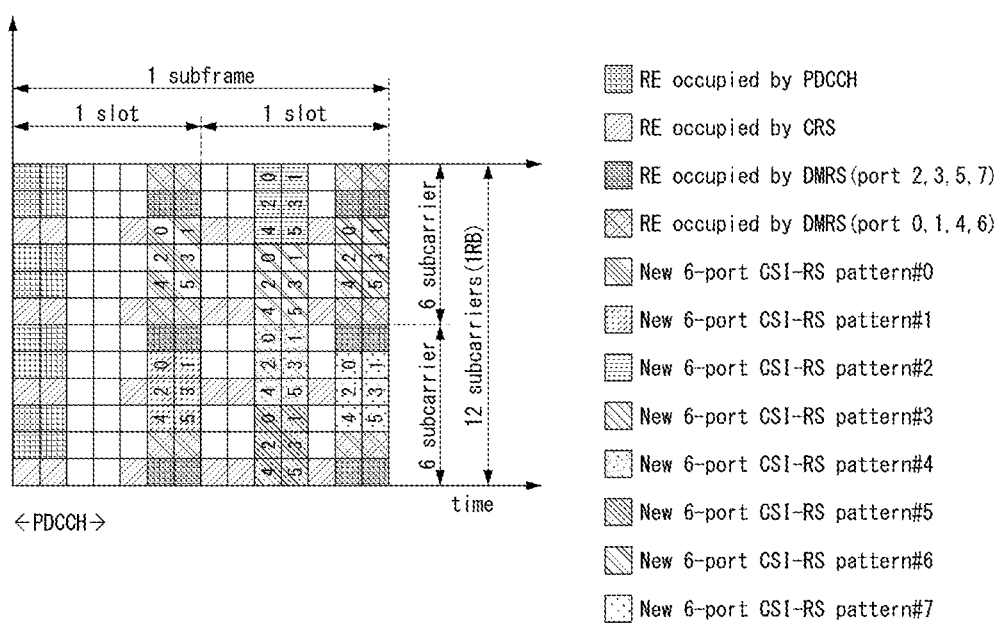

FIGS. 18 and 19 illustrate a method for configuring a 6-port CSI-RS resource/pattern according to an embodiment of the present invention.

Referring to FIG. 18, as one embodiment, a 6-port CSI-RS resource/pattern may be composed as a subset of a legacy 8-port CSI-RS resource/pattern. In other words, in the embodiment of the present figure, from the legacy 8-ports {0, 1, 2, 3, 4, 5, 6, 7}, 6 ports, for example, {0,1,2,3,4,5}, {2,3,4,5,6,7}, {0,1,4,5,6,7}, or {0,1,2,3,6,7} is selected to comprise a 6-port CSI-RS resource/pattern. At this time, 6-port CSI-RS resources/patterns may be made of the same subset of the 8-port 6-port CSI-RS resource or may use a different subset for each resource/pattern. In the present embodiment, since a 6-port CSI-RS resource/pattern consists of a subset of the legacy 8-port CSI-RS resource/pattern, the cell reuse factor of the proposed 6-port CSI-RS resource/pattern design becomes 5.

In the case of a 6-port CSI-RS resource/pattern design according to the present embodiment, the number of ports is not a multiple of 4; therefore, CDM-4 may not be applied. Therefore, only CDM-2 may be applied limitedly only for a new CSI-RS resource/pattern consisting of 6-port CSI-RS resources/patterns.

Referring to FIG. 19, CSI-RS resources previously consisting of 40 REs may be newly defined by using CSI-RS resources consisting of 48 REs. More specifically, in addition to the 40 REs defined as existing CSI-RS resources, the present embodiment may configure 8 REs corresponding to the locations of port number {4, 5} of pattern #0, port number {0, 1} of pattern #1, port number {4, 5} of pattern #6, and port number {0, 1} of pattern #7 as additional CSI-RS resources; subsequently, a total of 48 REs may be used/set as CSI-RS resources. An advantage from designing a 6-port CSI-RS resource according to the present embodiment is that the cell reuse factor is increased to 8 compared with the embodiment of FIG. 18.

A 6-port CSI-RS resource/pattern according to the present embodiment assumes to apply CDM-2, and the CDM-2 may be applied to the REs corresponding to 0 and 1, 2 and 3, and 4 and 5 of each resource/pattern.

When a 6-port CSI-RS resource/pattern according to the present embodiment is set for the UE through RRC signaling, a CSI-RS resource/pattern may be set according to the CSI-RS resource/pattern design of FIG. 19.

A 10-port CSI-RS resource/pattern may comprise aggregation of 4-port and 6-port CSI-RS resources/patterns or aggregation of 2-port and 8-port CSI-RS resources/patterns. Since the number of ports of the 10-port CSI-RS resource/pattern is not a multiple of 4, CDM-4 may not be applied. Therefore, only CDM-2 may be applied limitedly to a new CSI-RS resource/pattern composed by using a 10-port CSI-RS resource/pattern.

So far, designing a CSI-RS resource/pattern having X-ports (for example, X=18) or more has been described with respect to the embodiments for aggregating two CSI-RS resources/patterns. However, the present invention is not limited to the descriptions given above; the aforementioned embodiments may be extended to be applied to an embodiment for designing a CSI-RS resource/pattern having X-ports (for example, X=18) or more by aggregating a plurality of CSI-RS resources/patterns (namely by aggregating y CSI-RS resources/patterns (y>=2)).

When a CSI-RS resource/pattern having X-ports (for example, X=18) or more is composed according to the aforementioned embodiments, even though CDM-4 introduced in the Rel. 13 is used, full-power transmission may still be unsupported or power imbalance problem between CSI-RS transmission ports may occur. Therefore, to solve the problem above, the present specification proposes a CDM method using the length longer than 4 to be applied to a CSI-RS resource/pattern having X-ports (for example, X=18) or more.

First, CDM-6 compliant with/to be applied to the CSI-RS resource/pattern design illustrated in FIG. 19 is proposed. CDM-6 may be applied to the CSI-RSs transmitted through a new 6-port CSI-RS resource/pattern illustrated in FIG. 19 by multiplying a weight vector of Eq. 14 to the transmitted CSI-RSs. In other words, CDM-6 may be applied/set by multiplying weight vectors of Eq. 14 to the CSI-RSs mapped to 6 FDMed CSI-RS ports denoted by {0, 1, 2, 3, 4, 5} within the CSI-RS resources/patterns shown in FIG. 19. At this time, different weight vectors ($W_0$ to $W_5$) may be multiplied sequentially to the CSI-RSs mapped to the respective ports ({0, 1, 2, 3, 4,5}).

$W_0$=[1 1 1 1 1 1], $W_1$=[1 exp($2\pi j/6$)exp($2\pi j2/6$)exp($2\pi j3/6$)exp($2\pi j4/6$) exp($2\pi j5/6$)], $W_2$=[1 exp($2\pi j2/6$)exp($2\pi j4/6$)exp($2\pi j6/6$)exp($2\pi j8/6$) exp($2\pi j10/6$)], $W_3$=[1 exp($2\pi j3/6$)exp($2\pi j6/6$)exp($2\pi j9/6$)exp($2\pi j12/6$)exp($2\pi j15/6$)], $W_4$=[1 exp($2\pi j4/6$)exp($2\pi j8/6$)exp($2\pi j12/6$)exp($2\pi j16/6$)exp($2\pi j20/6$)], $W_5$=[1 exp($2\pi j5/6$)exp($2\pi j10/6$)exp($2\pi j15/6$)exp($2\pi j20/6$)exp($2\pi j25/6$)]  [Eq. 14]

Eq. 14 is derived from a 6×6 DFT matrix, where each code is orthogonal to each other.

If the aforementioned embodiment is applied, CDM guarantees 7.8 dB, thereby relieving the power imbalance issue between CSI-RS transmission ports.

Figure 20:
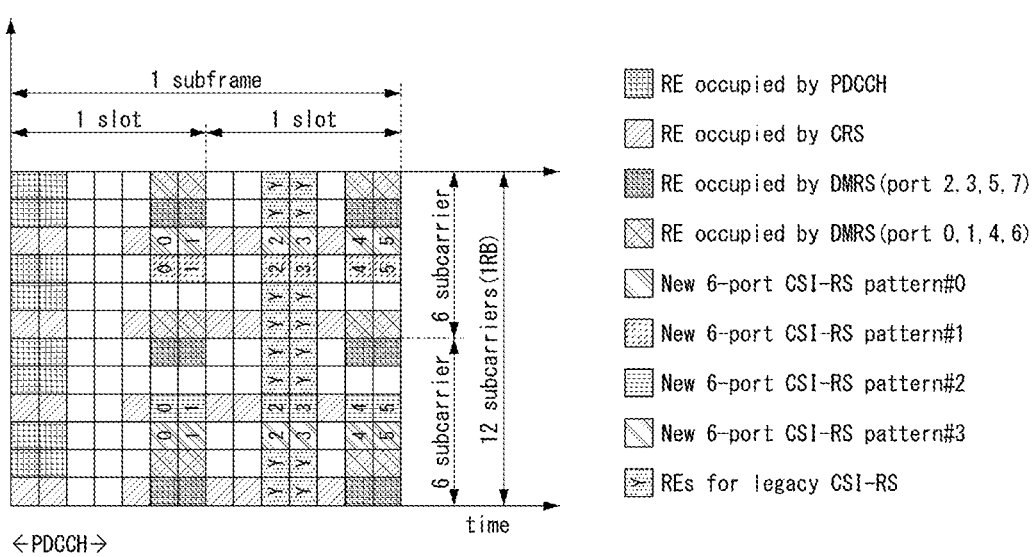
FIG. 20 illustrates a case in which CDM-6 is applied along the time axis according to one embodiment of the present invention.

FIG. 20 illustrates a case in which CDM-6 is applied along the time axis according to one embodiment of the present invention.

In the 6-port CSI-RS resource/pattern design of FIG. 20, CDM-6 may be set/applied by multiplying weight vectors of Eq. 14 to the CSI-RSs mapped to 6 TDMed CSI-RS ports denoted by {0, 1, 2, 3, 4, 5}.

In the present embodiment, when CDM is applied along the time axis, CDM is made to be applied to a set of REs which are the same along the frequency axis. However, the present invention is not limited to the embodiment, and CDM-6 may also be applied in such a way that three out of legacy 2-ports located at the OFDM symbols {5, 6}, {9, 10}, and {12, 13} may be selected (namely CDM-6 may be applied to the set of REs located on the same frequency axis or different frequency axis). In this case, system flexibility may be improved, however, performance degradation is expected in a frequency-selective environment; therefore, the present embodiment (namely the embodiment of applying CDM-6 along the time axis) may be applied limitedly to the REs the subcarrier difference of which along the frequency axis is less than 2.

In what follows, CDM-8 is proposed.

In the case of CDM-8, composition of codewords may be derived from a DFT matrix or Walsh matrix. More specifically, a codeword for CDM-8 may be derived from a DFT matrix and may be composed by extending Eq. 14 to an 8×8 DFT matrix. Also, the codeword for CDM-8 may be derived from Walsh matrix, where the weight vector of CDM-8 is composed as shown in Eq. 15 below.

$W_0$=[1 1 1 1 1 1 1 1], $W_1$=[1 1 1 1 −1 −1 −1 −1], $W_2$=[1 1 −1 −1 1 1 −1 −1], $W_3$=[1 1 −1 −1 −1 −1 1 1], $W_4$=[1 −1 1 −1 1 −1 1 −1], $W_5$=[1 −1 1 −1 −1 1 −1 1], $W_6$=[1 −1 −1 1 1 −1 −1 1], $W_7$=[1 −1 −1 1 −1 1 1 −1], or $W_0 = [1\ 1\ 1\ 1\ 1\ 1\ 1\ 1]$, $W_1 = [1\ -1\ 1\ -1\ 1\ 1\ -1\ 1\ -1]$, $W_2 = [1\ 1\ -1\ -1\ 1\ 1\ -1\ -1]$, $W_3 = [1\ -1\ -1\ 1\ 1\ -1\ -1\ 1]$, $W_4 = [1\ 1\ 1\ 1\ -1\ -1\ -1\ -1]$, $W_5 = [1\ -1\ 1\ -1\ -1\ 1\ -1\ 1]$, $W_6 = [1\ 1\ -1\ -1\ -1\ -1\ 1\ 1]$, $W_7 = [1\ -1\ -1\ 1\ -1\ 1\ 1\ -1]$,  [Eq. 15]

A plurality of Walsh matrices showing a difference in the permutation function of each row or column may be derived on the basis of Eq. 14, an example of which is shown in Eq. 15.

Figure 21:
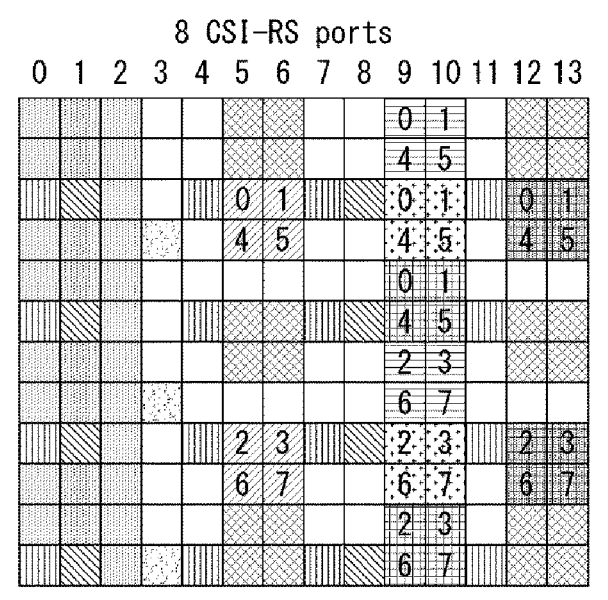

FIG. 21 illustrates 5 legacy CSI-RS configurations available for CSI-RS transmission by 8 CSI-RS antenna ports. Descriptions about FIG. 8(c) may also be applied to the description of the present figure.

CDM-8 may be applied/set by multiplying weight vectors of Eq. 15 to the CSI-RSs mapped to the CSI-RS ports denoted by {0, 1, 2, 3, 4, 5, 6, 7} within the 8-port CSI-RS resource/pattern in the present figure. In other words, CDM-8 may be applied in units of legacy 8-port CSI-RS resources/patterns.

As another example of applying/performing CDM-8, CDM-8 may be applied/set by multiplying the weight vectors of Eq. 15 sequentially to the CSI-RS ports mapped to the individual ports in the order of {0, 1, 4, 5, 2, 3, 6, 7} in the 8-port CSI-RS resource/pattern of the present figure (or in a predetermined/preset order for specific 8 REs to be aggregated, for example, in the order of {0, 1, 2, 3, 4, 5, 6, 7}).

Figure 22:
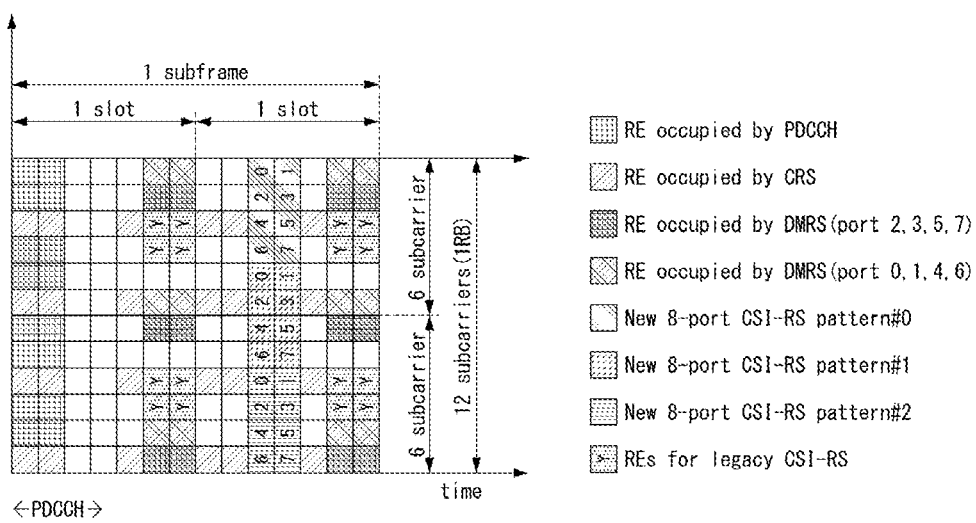
FIGS. 22 to 24 illustrate an 8-port CSI-RS resource/pattern design to which CDM-8 is applied according to an embodiment of the present invention.
Figure 23:
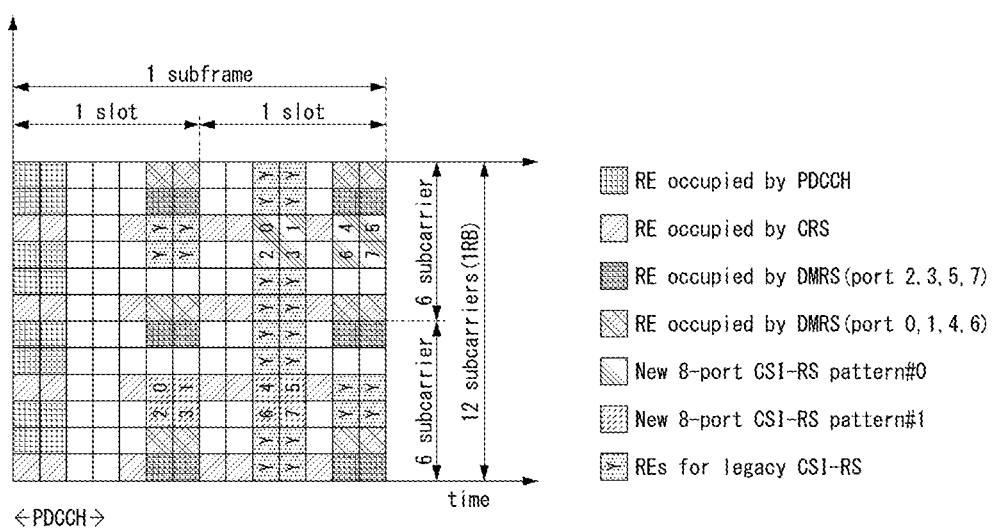
Figure 24:
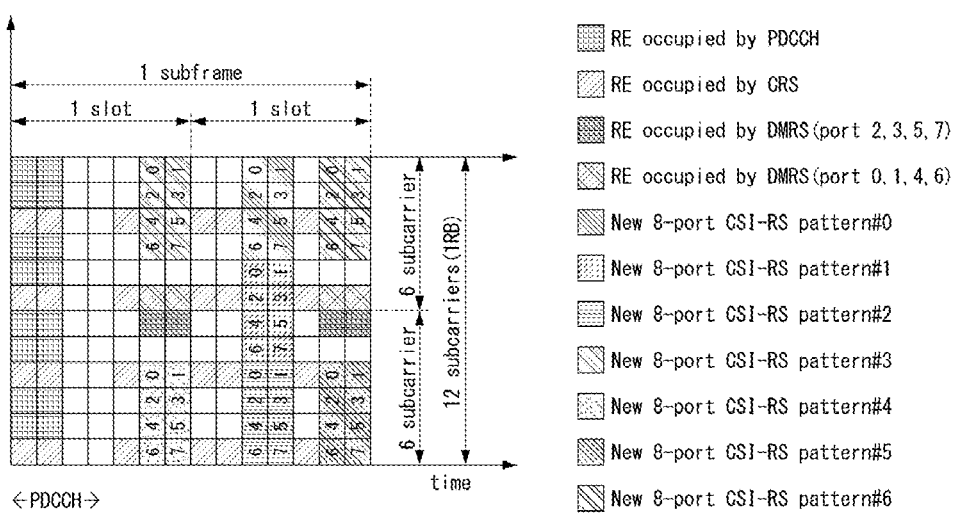

FIGS. 22 to 24 illustrate an 8-port CSI-RS resource/pattern design to which CDM-8 is applied according to an embodiment of the present invention.

In the case of 8-port CSI-RS resource/pattern according to an embodiment of FIG. 22, since the REs to which CDM-8 is applied are located more tightly along the frequency axis than the case of the legacy 8-port CSI-RS resource/pattern design of FIG. 21, the performance is expected to be more excellent in a frequency selective channel.

The embodiment of FIG. 23 illustrates the case in which CDM-8 is applied to the CSI-RS mapped to 8 REs distributed over 2 subcarriers and 4 OFDM symbols. In the embodiment of FIG. 23, since REs are more compactly located along the time axis in the case of 8-port CSI-RS resource/pattern #0 compared with the pattern #1, it is expected that the related performance will be more robust to phase drift.

The embodiments of FIGS. 22 and 23 are characterized in that two port groups {0, 1, 2, 3} and {4, 5, 6, 7} are mapped respectively to two RE groups comprising 4 REs located along the time and the frequency axis in the form of a 2×2 matrix. The present embodiments may be understood as being designed to be densely populated as much as possible along the time and/or frequency axis to obtain better performance in an environment in which channel conditions vary significantly. In other words, in the respective embodiments, it may be designed so that spacing between the two port groups is 2 OFDM symbols at maximum, and spacing between subcarriers is left not to be configured (for example, the two port groups may be located within/mapped to 4 consecutive subcarriers or located at/mapped to the same subcarrier).

FIG. 24 illustrates a method for designing an 8-port CSI-RS resource/pattern by using a maximum of 56 REs by allocating REs which may be allocated for a DM-RS (or REs which may be allocated for data transmission) for the purpose of transmitting a CSI-RS.

The 8-port CSI-RS resource/pattern of FIG. 24 provides an advantage in that the cell reuse factor is 7, which is larger than that of the 8-port CSI-RS pattern/resource of FIG. 22.

Meanwhile, the three 8-port CSI-RS resources/patterns of FIG. 22 may be aggregated to comprise one 24-port CSI-RS resource/pattern. More specifically, as shown in FIG. 22, a 24-port CSI-RS resource/pattern may consist of aggregation of three 8-port CSI-RS resources/patterns located at the 9-th (or 10-th) and 10-th (or 11-th) OFDM symbols along the time axis within one subframe and located being close/adjacent to each other along the frequency axis.

For example, the 24-port CSI-RS resource/pattern may consist of the first to the third 8-port CSI-RS resources/patterns, where the first to the third 8-port CSI-RS resources/patterns may be located at two OFDM symbols (9-th/10-th and 10-th/11-th OFDM symbol) within one subframe and 4 consecutive subcarriers, respectively.

At this time, the first 8-port CSI-RS resource/pattern may be located at the 9-th/10-th and 10-th/11-th OFDM symbol within one subframe and the 11-th/1-st to the 8-th/4-th subcarrier regions. To express specific coordinates for the first 8-port CSI-RS resource/pattern by using (k', l') described with reference to FIG. 8 (where k' denotes a subcarrier index within a resource block, and l' denotes an OFDM symbol index within a slot), the coordinates may be expressed as (11, 2), (11, 3), (10, 2), (10, 3), (9, 2), (9, 3), (8, 2), and (8, 3) of the second slot within the subframe.

Similarly, the second 8-port CSI-RS resource/pattern may be located at the 9-th/10-th and 10-th/11-th OFDM symbol within one subframe and the 7-th/5-th to the 4-th/8-th subcarrier regions. To express specific coordinates of the second 8-port CSI-RS resource/pattern by using (k', l') described with reference to FIG. 8, the coordinates may be expressed as (7, 2), (7, 3), (6, 2), (6, 3), (5, 2), (5, 3), (4, 2), and (4, 3) of the second slot within the subframe.

Similarly, the third 8-port CSI-RS resource/pattern may be located at the 9-th/10-th and 10-th/11-th OFDM symbol within one subframe and the 3-th/9-th to the 0-th/12-th subcarrier regions. To express specific coordinates of the third 8-port CSI-RS resource/pattern by using (k', l') described with reference to FIG. 8, the coordinates may be expressed as (3, 2), (3, 3), (2, 2), (2, 3), (1, 2), (1, 3), (0, 2), and (0, 3) of the second slot within the subframe.

At this time, CDM-8 may be applied to each of the CSI-RSs mapped to the first to the third 8-port CSI-RS resources/patterns, as described above.

In what follows, CDM-16 is proposed.

A weight vector of CDM-16 may also be derived from a Walsh matrix similarly to the proposed CDM-8. In other words, weight vectors may be derived from a 16×16 Walsh matrix, as shown in Eq. 16 below.

$W_0 = [1\ 1\ 1\ 1\ 1\ 1\ 1\ 1\ 1\ 1\ 1\ 1\ 1\ 1\ 1\ 1]$, $W_1 = [1\ -1\ 1\ -1\ 1\ -1\ 1\ -1\ 1\ -1\ 1\ -1\ 1\ -1\ 1\ -1]$, $W_2 = [1\ -1\ -1\ 1\ 1\ -1\ -1\ 1\ 1\ -1\ -1\ 1\ 1\ -1\ -1\ 1]$, $W_3 = [1\ -1\ -1\ 1\ 1\ -1\ -1\ 1\ 1\ -1\ -1\ 1\ 1\ -1\ -1\ 1]$, $W_4$=[1 1 1 1 −1 −1 −1 −1 1 1 1 1 −1 −1 −1 −1], $W_5$=[1 −1 −1 −1 −1 −1 1 1 1 −1 −1 −1 −1 1 −1 1], $W_6$=[1 1 −1 −1 −1 −1 1 1 1 −1 −1−1 −1 1 1], $W_7$=[1 −1 −1 1 −1 1 1 −1 1 −1 −1 1 −1 1 1 −1], $W_8$=[1 1 1 1 1 1 1 1 −1 −1 −1 −1 −1 −1 −1 −1], $W_9$=[1−1 1 −1 1 −1 1 −1 1 −1 1 −1 1 −1 1 1], $W_{10}$=[1 1 −1 −1 1 1 −1 −1 −1 −1 1 1 −1 −1 1 1], $W_{11}$=[1 −1 −1 1 1 −1 −1 1 1 −1 1 1 −1 −1 1 1 −1], $W_{12}$=[1 1 1 1 1 −1 −1 −1 −1 −1 −1 −1 −1 1 1 1 1], $W_{13}$=[1 −1 1 −1 −1 1 −1 1 −1 1 −1 1 1 1 −1 1 −1], $W_{14}$=[1 1 −1 −1 −1 −1 1 1 −1 −1 1 1 1 1 −1 −1], $W_{15}$=[1 −1 −1 1 1 −1 1 1 1 −1 −1 1 1 −1 1 −1 −1 1 1]  [Eq. 16]

CDM-16 proposed by the present specification may be applied to one 16-port CSI-RS resource/pattern comprising aggregation of two 8-port CSI-RS resources/patterns to which the CDM-8 proposed above is applied.

For example, one 16-port CSI-RS resource/pattern may comprise aggregation of two arbitrary resources/patterns from among legacy 8-port CSI-RS resources/patterns of FIG. 21, where CDM-16 may be applied to the composed resource/pattern. At this time, two CSI-RS resources/patterns to be aggregated may be numbered sequentially as {0, 1, 2, 3, 4, 5, 6, 7} and {8, 9, 10, 11, 12, 13, 14, 15}, after which CDM-16 is applied, or numbered as {0, 1, 4, 5, 2, 3, 6, 7} and {0, 1, 4, 5, 2, 3, 6, 7}+8, after which CDM-16 is extended to be applied.

In other words, when CDM-16 is applied, the former case represents a method of performing port numbering sequentially in a legacy 8-port unit while the latter case represents a method of performing port numbering in a 2×2 RE unit as in the 16-port CDM-4 method of the Rel. 13.

Besides, the embodiments related to CDM-8 described in detail with reference to FIGS. 22 to 24 may be aggregated as described above and extended to be applied as an embodiment in which CDM-16 is applied.

In what follows, CDM-12 and CDM-20 are proposed.

As described above, if CDM-x where x is not an exponent of 2 is applied, a DFT matrix has been used. This scheme is based on the fact that a Walsh matrix composed of binary values (1 or −1) does not exist. However, when x=12 or 20, too, if Paley construction is employed to build a Hadamard matrix, a binary orthogonal matrix composed of 1s and −1s may be constructed. This operation brings an advantage of lowering complexity compared to the case when an orthogonal matrix is composed by using a DFT matrix because a CDM weight vector is made of integer numbers. Paley construction is a method for composing a Hadamard matrix by using finite fields, which uses quadratic residue of GF(q), where q represents an odd prime number. In this case, the Hadamard matrix of (q+1) may be expressed by Eq. 17 below.

$$H = I + \begin{bmatrix} 0 & 1^T \\ -1^T & Q \end{bmatrix}$$  [Eq. 17]

Here, I is the (q+1)×(q+1) identity matrix, 1 is the all-1 vector of length q, Q is the q×q Jacobsthal matrix whose entry in row a and column b is $\chi$(a−b), where $\chi$(a) indicates whether the finite field element a is a perfect square. For example, if a=$b^2$ for some non-zero finite field element b, $\chi$(a)=1, otherwise (for example, if a is not the square of any finite field element), $\chi$(a)=−1 On the basis of the properties described above, the weight vector of CDM-12 may be derived by Eq. 18 as follows.

$W_0$=[1 1 1 1 1 1 1 1 1 1 1 1], $W_1$=[1 −1 1 −1 1 1 1 −1 −1 −1 1 −1], $W_2$=[1 −1 −1 1 −1 1 1 1 −1 −1 −1 1], $W_3$=[1 1 −1 −1 1 −1 1 1 1 −1 −1 −1], $W_4$=[1 −1 1 −1 −1 1 −1 1 1 1 −1 −1], $W_5$=[1 −1 −1 1 −1 −1 1 −1 1 1 1 −1], $W_6$=[1 −1 −1 −1 1 −1 −1 1 −1 1 1 1], $W_7$=[1 1 −1 −1 −1 1 −1 −1 1 −1 1 1], $W_8$[=1 1 1 −1 −1 −1 1 −1 −1 1 −1 1], $W_9$=[1 1 1 1 −1 −1 −1 1 −1 −1 1 −1], $W_{10}$=[1 −1 1 1 1 −1 −1 −1 1 −1 −1 1], $W_{11}$=[1 1 −1 1 1 1 −1 −1 −1 1 −1 −1],  [Eq. 18]

The CDM-12 proposed in the present specification may be applied to one 12-port CSI-RS resource/pattern comprising aggregation of two 6-port CSI-RS resources/patterns to which the CDM-6 proposed above is applied.

For example, one 12-port CSI-RS resource/pattern may comprise aggregation of two arbitrary resources/patterns from among 6-port CSI-RS resources/patterns of FIG. 19, where CDM-16 may be applied to the composed resource/pattern by using Eq. 18. At this time, two CSI-RS resources/patterns to be aggregated may be numbered sequentially as {0, 1, 2, 3, 4, 5} and {8, 9, 10, 11, 12, 13}, after which CDM-12 may be applied.

Besides, the embodiments related to CDM-6 described in detail with reference to FIGS. 18 to 20 may be aggregated as described above and extended to be applied as an embodiment in which CDM-12 is applied.

The weight vector of CDM-20 may be composed by using Eq. 19 as follows.

$W_0$=[1 1 1 1 1 1 1 1 1 1 1 1 1 1 1 1 1 1 1 1], $W_1$=[1 −1 −1 1 1 −1 −1 −1 −1 1 1 −1 1 −1 1 1 1 1 −1 −1 1], $W_2$=[1 −1 1 1 −1 −1 −1 −1 1 1 −1 1 1 1 1 −1 −1 1 −1], $W_3$=[1 1 1 −1 −1 −1 1 1 −1 1 −1 1 1 1 1 −1 −1 1 1 −1 −1], $W_4$=[1 1 −1 −1 −1 1 −1 1 −1 1 1 1 1 −1 −1 1 −1 −1 1 1], $W_5$=[1 −1 −1 −1 1 1 −1 1 −1 1 1 1 1 −1 −1 1 1 −1 −1 1 1 1], $W_6$=[1 −1 −1 −1 1 1 −1 1 1 1 1 1 −1 −1 1 −1 1 1 −1], $W_7$=[1 -1 -1 1 -1 1 -1 1 1 1 1 -1 -1 1 -1 -1 1 1 1 -1 -1], $W_8$=[1 -1 1 -1 1 -1 1 1 1 1 -1 -1 1 -1 -1 1 1 1 -1 -1 -1], $W_9$=[1 1 -1 1 -1 1 1 1 1 -1 -1 1 -1 -1 1 1 1 -1 -1 -1 -1], $W_{10}$=[1 -1 1 -1 1 1 1 1 -1 -1 1 -1 -1 1 1 1 -1 -1 -1 -1 1 1], $W_{11}$=[1 1 -1 1 1 1 1 -1 -1 1 -1 -1 1 1 1 -1 -1 -1 -1 1 1 -1], $W_{12}$=[1 -1 1 1 1 1 -1 -1 1 -1 -1 1 1 1 -1 -1 -1 -1 1 -1 1 1], $W_{13}$=[1 1 1 1 1 -1 -1 1 -1 -1 1 1 1 -1 -1 -1 -1 1 -1 1 -1 -1 1 1 -1 -1], $W_{14}$=[1 1 1 1 -1 -1 1 -1 -1 1 1 1 -1 -1 -1 -1 1 -1 1 1 -1 1 1], $W_{15}$=[1 1 1 -1 -1 1 -1 -1 1 1 1 -1 -1 -1 -1 1 1 -1 1 -1 1 1 1], $W_{16}$=[1 1 -1 -1 1 -1 -1 1 1 1 -1 -1 -1 -1 1 -1 1 1 1 1 1], $W_{17}$=[1 -1 -1 1 -1 -1 1 1 1 -1 -1 -1 -1 1 -1 1 1 -1 1 1 1], $W_{18}$=[1 -1 1 -1 -1 1 1 1 -1 -1 -1 -1 1 -1 1 1 -1 1 1 1 1 -1], $W_{19}$=[1 1 -1 -1 1 1 -1 -1 -1 -1 1 -1 1 1 -1 1 1 1 1 -1 -1], [Eq. 19]

The CSI-RS resource/pattern to which the weight vector of Eq. 19 is applied may be applied to the 20-port CSI-RS resource/pattern composed according to the embodiments proposed by the present specification, port numbering may be applied to the aggregated resources/patterns sequentially, and CDM-20 may be applied to the corresponding resource/pattern.

The present specification has proposed a method for comprising CDM-12 and CDM-20 by using Paley construction; however, the proposed method may be extended to use a DFT matrix which comprises CDM-6.

Also, the eNB may inform the UE of the information about the CDM length applied to a CSI-RS through RRC signaling.

Figure 25:
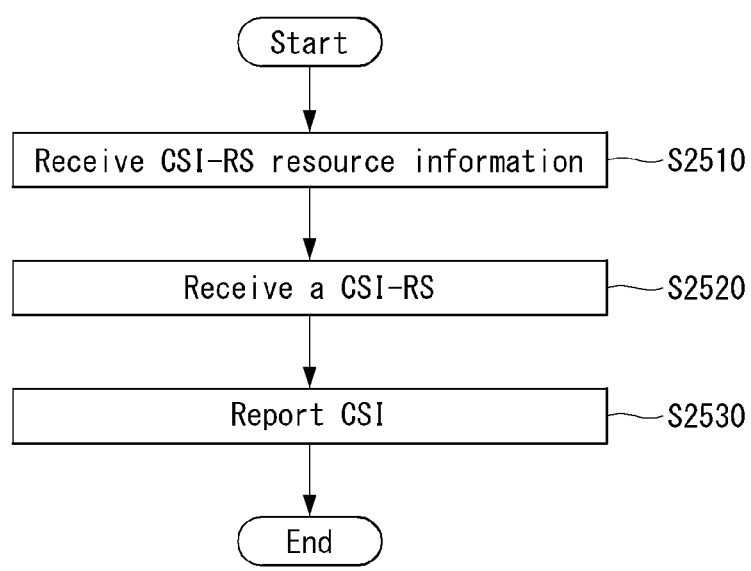
FIG. 25 is a flow diagram illustrating a method for CSI reporting by a UE according to one embodiment of the present invention.

FIG. 25 is a flow diagram illustrating a method for CSI reporting by a UE according to one embodiment of the present invention. The aforementioned embodiment and related descriptions may be applied to the present flow diagram in the same manner/in a similar manner, and repeated descriptions thereof will be omitted.

First, the UE may receive, from the eNB, CSI-RS resource information about a CSI-RS resource to which a CSI-RS is mapped S2510.

The CSI-RS resource used at this step comprises aggregation of a plurality of CSI-RS resources, where CSI-RS resources to be aggregated may be located at different subframes along the time axis or at different resource blocks along the frequency axis. At least one of the CSI-RS resources to be aggregated may correspond to a composite CSI-RS resource comprising aggregation of a plurality of legacy CSI-RS resources. Also, a plurality of legacy CSI-RS resources comprising the composite CSI-RS resource may be limited to the CSI-RS resources having the same number of ports. And/or the CSI-RS resource may be limited to consist of aggregation of CSI-RS resources having a predetermined number of ports.

Also, different subframes at which CSI-RS resources to be aggregated are located may have different CSI-RS subframe offsets. Also, if CSI-RS resources to be aggregated are located at different subframes separated from each other by a predetermined number of subframes, information about the predetermined number of subframes may be transmitted to the UE through RRC signaling. Also, if CSI-RS resources to be aggregated are located at different subframes along the time axis, the CSI-RS resources to be aggregated may be mapped to the same subcarriers within different subframes.

If CSI-RS resources to be aggregated are located at different resource blocks separated from each other by a predetermined number of resource blocks, information about the predetermined number of resource blocks may be transmitted to the UE through RRC signaling. Also, the transmission period of different resource blocks at which CSI-RS resources to be aggregated are located may be set to be the same for each of the CSI-RS resources to be aggregated. At this time, the transmission period and resource block offset may be transmitted to the UE after being jointly encoded.

Also, if at least one of CSI-RS resources to be aggregated corresponds to a 12-port CSI-RS resource or a 16-port CSI-RS resource, Code Division Multiplexing (CDM) for which the number of orthogonal weight vectors is 2 or 4 may be applied to the CSI-RS mapped to the 12-port CSI-RS resource or 16-port CSI-RS resource.

Next, the UE may receive a CSI-RS transmitted from the eNB through one or more antenna ports on the basis of the received CSI-RS resource information S2520.

Finally, the UE may generate CSI on the basis of the received CSI-RS and report the generated CSI to the eNB S2530.

Meanwhile, CDM for which the number of orthogonal weight vectors is 6, 8, 12, 18, or 20 may be applied to the CSI-RS according to the number of ports of the CSI-RS resources to be aggregated into a CSI-RS resource to which the CSI-RS is mapped.

In what follows, an additional embodiment of the aforementioned CDM-8 is proposed.

As another embodiment, a method for applying CDM-8 to the CSI-RS resource/pattern/configuration having X-ports (for example, x=18) or more consisting of aggregation of legacy ports (for example, 2-, 4-, 8-, 12-, and 16-ports) may be taken into account. In the present document, application of CDM-x to an X-port CSI-RS resource/pattern/configuration may be interpreted that CDM-x is applied to the CSI-RS transmitted through the X-port CSI-RS resource/pattern.

Figure 26:
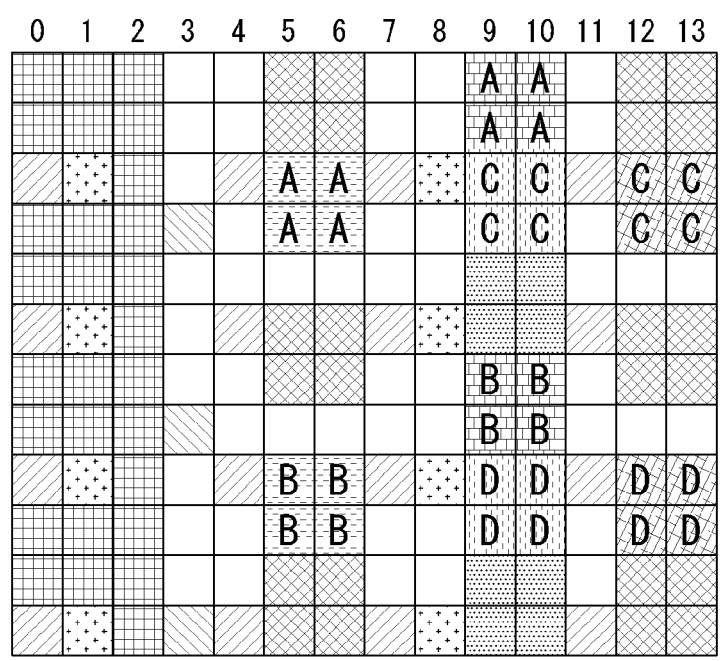
FIGS. 26 and 27 illustrate an aggregated 32-port CSI-RS resource/pattern/configuration design to which CDM-8 is applied according to one embodiment of the present invention.
Figure 27:
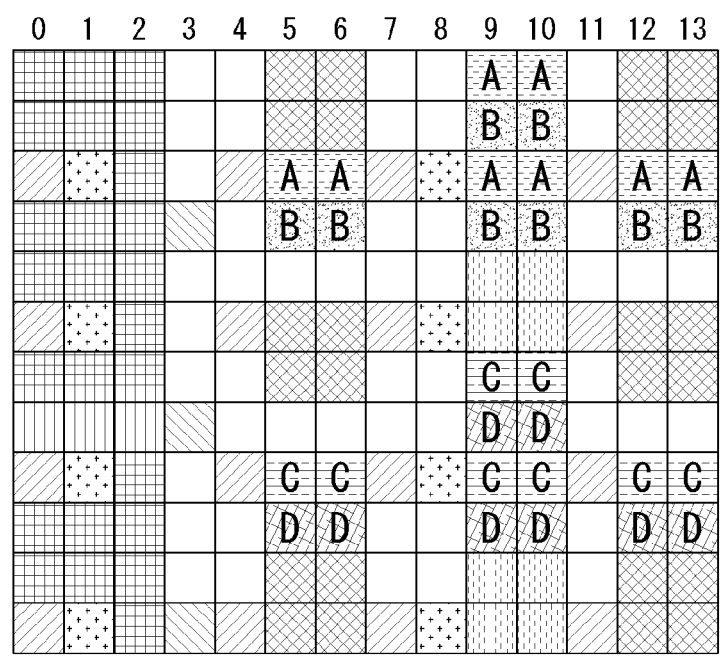

FIGS. 26 and 27 illustrate an aggregated 32-port CSI-RS resource/pattern/configuration design to which CDM-8 is applied according to one embodiment of the present invention. In FIGS. 26 and 27, each block represents an RE; OFDM symbol indices ranging from 0 to 13 are allocated to the REs sequentially from left to right direction, and subcarrier indices ranging from 0 to 11 are allocated to the REs sequentially from bottom to top direction. Also, in FIGS. 26 and 27, a 32-port CSI-RS resource/pattern/configuration is composed by selective aggregation of 8-port CSI-RS resources/patterns/configurations.

CDM-8 may be applied to the 32-port CSI-RS resource/pattern/configuration shown in FIGS. 26 and 27 in a group unit denoted by the same letter of the alphabet (for example, A, B, C, and D). For example, the 32-port CSI-RS resource/pattern/configuration may be divided into a first group including 8 REs denoted by A, a second group including 8 REs denoted by B, a third group including 8 REs denoted by C, and a fourth group including 8 REs denoted by D, where CDM-8 may be applied for each group unit.

In other words, (the same) CDM-8 may be applied to the CSI-RS transmitted through the first group, CSI-RS transmitted through the second group, CSI-RS transmitted through the third group, and CSI-RS transmitted through the fourth group, respectively.

Suppose the full transmission power per CSI-RS port is '1'. According to the embodiment of FIG. 26, the full transmission power then becomes '¾' (as CDM-8 is applied to the REs of the 5-th and the 6-th OFDM symbol index, power is boosted 8 times, and three times of power boosting is achieved by borrowing transmission power from other ports). Therefore, when the CSI-RS resource/pattern/configuration according to the embodiment of FIG. 26 is used, full transmission power for each CSI-RS port is not achieved.

To solve the problem above, the embodiment of FIG. 27 may be proposed. If full transmission power per CSI-RS port is assumed to be 'P', and the embodiment of FIG. 27 is employed, 8 times of power boosting is achieved as CDM-8 is applied to the REs of the 5-th and the 6-th OFDM symbol index, 4 times of power boosting is achieved by borrowing transmission power from other ports, and thereby full transmission power of '1' may be achieved.

In the embodiment of FIG. 27, aggregation of four (legacy) 8-port CSI-RS resources/patterns/configurations may be restricted so that one from the 5-th and the 6-th OFDM symbol index, one from the 12-th and the 13-th, and the remaining two from the 9-th and the 10-th are selected. FIG. 27 illustrates an example in which [0, 1, 2, 4] configurations are selected among five (legacy) 8-port CSI-RS resource configurations defined in FIG. 8(c) to comprise a 32-port CSI-RS resource/pattern/configuration. Therefore, the (legacy) 8-port CSI-RS resource configuration 3, not shown in the present figure, may also be used for aggregation into a 32-port CSI-RS resource. For example, a 32-port CSI-RS resource/pattern/configuration may be composed as [0, 1, 3, 4] or [0, 2, 3, 4] configurations are selected among five (legacy) 8-port CSI-RS resource configurations defined in FIG. 8(c).

In the embodiment of FIG. 27, specific coordinates of each group to which CDM-8 is applied may be expressed in the form of (k', l') as follows (where k' denotes the subcarrier index within a resource block, and l' denotes the OFDM symbol index over two slots).

First group denoted by 'A': (9, 5), (9, 6), (11, 9), (11, 10), (9, 9), (9, 10), (9, 12), and (9, 13)
Second group denoted by 'B': (8, 5), (8, 6), (10, 9), (10, 10), (8, 9), (8, 10), (8, 12), (8, 13)
Third group denoted by 'C': (3, 5), (3, 6), (5, 9), (5, 10), (3, 9), (3, 10), (3, 12), (3, 13)
Fourth group denoted by 'D': (2, 5), (2, 6), (4, 9), (4, 10), (2, 9), (2, 10), (2, 12), (2, 13)

As with other CSI-RS resource configurations, the CSI-RS resource configuration 3 not shown in the figure may also be distinguished by four groups to which CDM-8 is applied independently. For example, if specific coordinates of a group for applying CDM-8 within the CSI-RS resource configuration 3 are expressed by using the aforementioned form of (k', l') (where k' denotes the subcarrier index within a resource block, and l' denotes the OFDM symbol index over two slots), the REs of (7, 9), (7, 10) may belong to a first group corresponding to the alphabet 'A', the REs of (6, 9), (6, 10) may belong to a second group corresponding to the alphabet 'B', the REs of (1, 9), (1, 10) may belong to a third group corresponding to the alphabet 'C', and the REs of (0, 9), (0, 10) may belong to a fourth group corresponding to the alphabet 'D'.

In other words, to summarize the embodiment of FIG. 27 above, in the case of a 32-port CSI-RS resource/pattern/configuration in the eFD-MIMO system, individual (legacy) 8-port CSI-RS resources/patterns/configurations may be distinguished by a plurality of lower groups/patterns expressed by different letters of the alphabet; a CDM-8 pattern/group to which CDM-8 is applied may consist of aggregation of a plurality of lower groups/patterns (for example, CDM-2 pattern) denoted by the same letter of the alphabet among the entire (legacy) 8-port CSI-RS resources/patterns/configurations.

At this time, port numbering to be described later may be determined according to the order of resourceConfig.

The 32-port CSI-RS resource/pattern/configuration to which CDM-8 is applied for each group will be described later in detail with reference to FIG. 30.

If the UE is set by the 32-port CSI-RS resource/pattern/configuration to which CDM-8 is applied according to the embodiment of FIG. 27, the eNB may inform the UE of 8-port CSI-RS resources to be aggregated through RRC signaling. In this case, although the eNB may inform the UE of all of four 8-port CSI-RS resources/patterns/configurations to be aggregated into a 32-port CSI-RS resource through RRC signaling, the eNB may inform the UE of only two 8-port CSI-RS resources/patterns/configurations to be aggregated into the 32-port CSI-RS resource/pattern/configuration from among three (legacy) 8-port CSI-RS resources/patterns/configurations located at the 9-th and the 10-th locations, thereby reducing signaling overhead.

If the 32-port CSI-RS resource/pattern/configuration of the embodiment of FIG. 27 is applied, an embodiment of port numbering to apply CDM-8 to the corresponding resource/pattern/configuration is expressed by Eq. 20. By default, each CDM-8 weight mapping is depicted by a Walsh matrix, but there may be a difference in applying the mapping depending on permutation.

$$l=(k-l)8+p', \ p'=15,16,\ldots,22, k=1,2,\ldots K, \quad \text{[Eq. 20]}$$

In Eq. 20, l represents a final CSI-RS port number obtained as a result of port numbering, k represents the number of a CSI-RS resource/configuration to be aggregated, K represents the number of CSI-RS resources/patterns/configurations to be aggregated/included, and p' represents the port number of a legacy CSI-RS to be aggregated.

If k is set to range from 0 to K−1 rather than 1 to K in Eq. 20, the port numbering embodiment may also be expressed as shown in Eq. 21 below.

$$l=8k+p', \ p'=15,16,\ldots 22, k=0,1,\ldots K-1, \quad \text{[Eq. 21]}$$

Eq. 20 (or Eq. 21) may indicate that antenna ports are numbered in the order of CSI-RS resource/configuration number defined by Table 3.

CDM-8 may be applied to the CSI-RS transmitted through each CSI-RS port numbered according to Eq. 20 (or Eq. 21), as shown in Table 7.

TABLE 7

| l | [wp'(0) wp'(1) wp'(2) wp'(3) wp'(4) wp'(5) wp'(6) wp'(7)] |
|---|---|
| 15, 17, 19, 21 | [1 1 1 1 1 1 1 1] |
| 16, 18, 20, 22 | [1 −1 1 −1 1 −1 1 −1] |
| {15, 17, 19, 21} + 8 | [1 1 −1 −1 1 1 −1 −1] |
| {16, 18, 20, 22} + 8 | [1 −1 −1 1 1 −1 −1 1] |
| {15, 17, 19, 21} + 16 | [1 1 1 1 −1 −1 −1 −1] |
| {16, 18, 20, 22} + 16 | [1 −1 1 −1 −1 1 −1 1] |
| {15, 17, 19, 21} + 24 | [1 1 −1 −1 −1 −1 1 1] |
| {16, 18, 20, 22} + 24 | [1 −1 −1 1 −1 1 1 −1] |

Table 7 shows 8 weight vectors applied according to the CSI-RS port number derived by Eq. 20 (or Eq. 21). Each row is composed of 4 elements, where each element represents a group to which the CDM-8 pattern is applied independently. In other words, a 32-port CSI-RS resource/pattern/configuration consists of four groups to which a total of four independent CDM-8 patterns are applied. And each of 8 rows represents a port to which one of the 8 weight vectors constituting CDM-8 is applied. Each column represents a group to which the CDM-8 pattern is applied independently.

Therefore, CDM-8 may be applied (independently) to the first group {15, 16, 23, 24, 31, 32, 39, 40}, second group {17, 18, 25, 26, 33, 34, 41, 42}, third group {19, 20, 27, 28, 35, 36, 43, 44}, and fourth group {21, 22, 29, 30, 37, 38, 45, 46}, respectively. Also, the weight vector [1 1 1 1 1 1 1 1] is applied to the {15, 17, 19, 21} ports selected from the respective groups, [1 −1 1 −1 1 −1 1 −1] to the {16, 18, 20, 22} ports, [1 1 −1 −1 1 1 −1 −1] to the {23, 25, 27, 29} ports, [1 −1 −1 1 1 −1 −1 1] to the {24, 26, 28, 30} ports, [1 −1 1 −1 1 −1 1 1] to the {32, 34, 36, 38} ports, [1 1 −1 −1 −1 −1 1 1] to the ports {39, 41, 43, 45}, and [1 −1 −1 1 −1 1 1 −1] to the {40, 42, 44, 46} ports.

The embodiment according to FIGS. 26 and/or 27 described in detail above may be applied to a 24-port CSI-RS resource/pattern/configuration in the same manner/in a similar manner. For example, when CDM-8 is applied to a 24-port CSI-RS resource/pattern/configuration, three groups may be selected from the CSI-RS resource/pattern/configuration groups distinguished by different letters of the alphabet A, B, C, D (+E) as in FIGS. 26 and/or 27, and CDM-8 may be applied independently to each selected group.

However, in this case, some REs are left unused for CSI-RS transmission, leading to waste of resources. Therefore, in what follows, a 24-port CSI-RS resource/pattern/configuration to which CDM-8 is applied is proposed as shown in FIG. 28.

Figure 28:
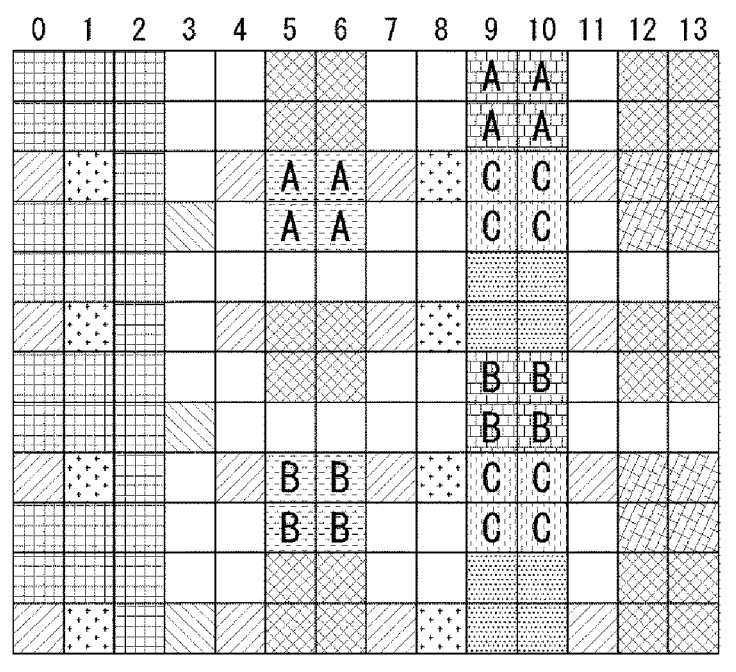

FIG. 28 illustrates a CDM-8 pattern design applied to a 24-port CSI-RS resource/pattern/configuration according to one embodiment of the present invention. The 8 REs grouped to have the same pattern in FIG. 28 represent one (legacy) 8-port CSI-RS resource/pattern/configuration. Also, each block in the figure represents REs; OFDM symbol indices ranging from 0 to 13 are allocated to the REs sequentially from left to right direction, and subcarrier indices ranging from 0 to 11 are allocated to the REs sequentially from bottom to top direction.

Referring to FIG. 28, to achieve full transmission power for each CSI-RS port, a 24-port CSI-RS resource/pattern/configuration may be composed by selecting one (legacy) 8-port CSI-RS resource/pattern/configuration from those having OFDM symbol index 5, 6, 12, or 13; and two from those having OFDM symbol index 9 and 10. Also, as shown in the figure, REs may be divided into groups according to alphabet letters, and CDM-8 may be applied to each group. At this time, to have a power boosting gain for each RE group to which CDM-8 is applied, a restriction may be imposed so that each of the two RE groups indicated by OFDM symbol index 5, 6 or 12, 13 (for example, A and B group) forms a group to which CDM-8 is applied independently of the RE group(s) indicated by OFDM symbol index 9, 10.

Figure 29:
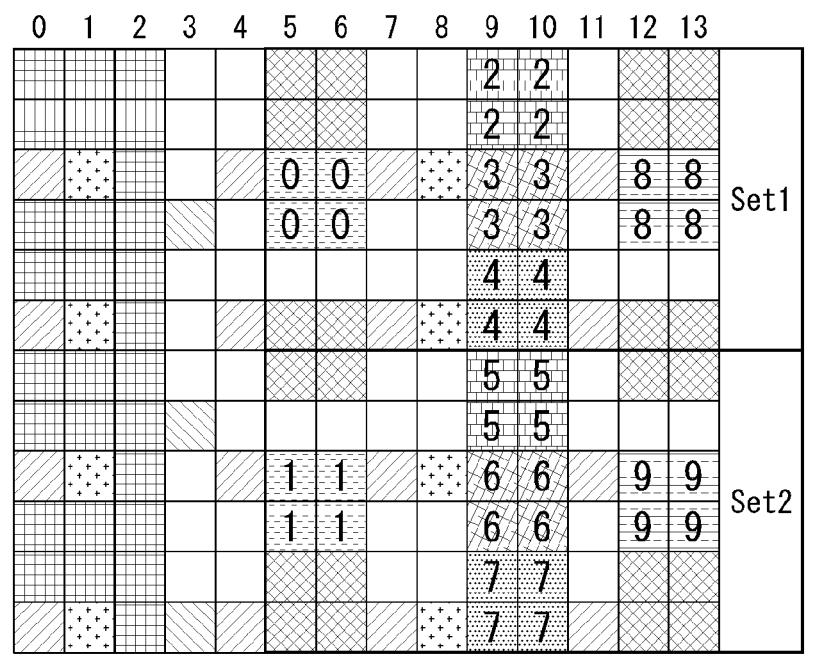

FIG. 29 illustrates a CDM-8 pattern design applied to a 24-port CSI-RS resource/pattern/configuration according to one embodiment of the present invention. The 8 REs grouped to have the same pattern in FIG. 29 represent one (legacy) 8-port CSI-RS resource/pattern/configuration comprising a 24-port CSI-RS resource/pattern/configuration. In other words, RE groups denoted by 0 and 1, 2 and 5, 3 and 6, 4 and 7, and 8 and 9 represent a (legacy) 8-port CSI-RS configuration, respectively. Also, each block in the figure represents REs, and OFDM symbol indices ranging from 0 to 13 are allocated to the REs sequentially from left to right direction, and subcarrier indices ranging from 0 to 11 are allocated to the REs sequentially from bottom to top direction.

In the case of Q-ports, a multiple of 8, to which CDM-8 may be applied effectively (for example, Q=24, 32), REs may be aggregated in units of (legacy) 8-port CSI-RS resource/pattern/configuration. In this case, CDM-8 may be applied in units of (legacy) 8-port CSI-RS resource/pattern/configuration to be aggregated; however, in the case of a (legacy) 8-port CSI-RS resource/pattern/configuration corresponding to the RE group denoted by 0 and 1, and 8 and 9, power boosting gain is not large since transmission power of other ports is unavailable. Also, the embodiments of FIGS. 24 and 26 to 28 in which full transmission power is available are not easy to be applied commonly to all of the CSI-RS resources/patterns/configurations.

Therefore, as shown in FIG. 29, to apply CDM-8 to enable full transmission power, a method for using a 4-port CSI-RS pool (or resource/pattern/configuration) is proposed. In the present embodiment, a (legacy) 8-port CSI-RS resource/pattern/configuration is divided into two 4-port CSI-RS pools, and each 4-port CSI-RS pool may be regarded as a basic unit in which CDM-4 is performed. In the aforementioned 4-port CSI-RS pool, CDM-4 is applied by using the rows and columns of Eq. 22 as weight vectors.

$$W(4) = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad [\text{Eq. 22}]$$

According to the present embodiment, if a 24- or 32-port CSI-RS resource/pattern/configuration is set/applied to the UE, information about (legacy) 8-port CSI-RS resources/patterns/configurations (three 8-port CSI-RS resources/patterns/configurations in the case of a 24-port and four in the case of a 32-port) to be aggregated may be set through RRC signaling. For example, if the UE set for a 24-port CSI-RS resource/pattern/configuration has been set by a total of three (legacy) 8-port CSI-RS resources/patterns/configurations {0, 1}, {2, 5}, and {4, 7}, it may be regarded that the UE has been set by six 4-port CSI-RS pools (or resources/patterns/configurations) for application of CDM-8.

In this case, the eNB may additionally inform the UE through RRC signaling of the information about two sub-4-port CSI-RS pool (or resources/patterns/configurations)

groups/pairs to which CDM-8 is to be applied independently among 4-port CSI-RS pools (or resources/patterns/configurations) set for the UE or may set the information to the UE in advance. Each 4-port pair/group has the weight vector whose element is $[1\ 1]^T$ or $[1\ -1]^T$, and CDM-8 may be applied by using the weight vector. The method described above may be expressed by a mathematical equation, as shown in Eq. 23 below.

$$\begin{bmatrix}1\\1\end{bmatrix} \otimes \begin{bmatrix}1 & 1 & 1 & 1\\1 & -1 & 1 & -1\\1 & 1 & -1 & -1\\1 & -1 & -1 & 1\end{bmatrix} \text{ or } \begin{bmatrix}1\\-1\end{bmatrix} \otimes \begin{bmatrix}1 & 1 & 1 & 1\\1 & -1 & 1 & -1\\1 & 1 & -1 & -1\\1 & -1 & -1 & 1\end{bmatrix} \qquad \text{[Eq. 23]}$$

However, in the case of additional RRC signaling about the 24-port CSI-RS resource/pattern/configuration, since two out of six sub-4-port CSI-RS pools (or resources/patterns/configurations) to be aggregated are selected, the number of cases becomes 6_C_2; in the case of additional RRC signaling about the 32-port CSI-RS resource/pattern/configuration, since two out of eight sub-4-port CSI-RS pools (or resources/patterns/configurations) to be aggregated are selected, the number of cases becomes 8_C_2, which may increase signaling overhead. Therefore, it is possible to limit the set to which CDM-8 is applied, which may be informed to the UE through RRC signaling.

In one embodiment, a set to which CDM-8 is applied may be determined with respect to the location of the subcarrier; for example, as shown in the figure, the REs of which the subcarrier index (k') is 0 to 5 may be defined as set2 while the REs of which the subcarrier index is 6 to 11 may be defined as set1. In this case, the CSI-RS resource/pattern/configuration to which CDM-8 is applied may be determined with respect to a predefined set as described above.

In the case of 24-port, among three (legacy) 8-port CSI-RS resources/patterns/configurations to be aggregated, two of them are selected from within the same set, for which CDM-8 may be applied while, for the remaining, unselected one (legacy) 8-port CSI-RS resource/pattern/configuration, CDM-8 may be applied directly to the corresponding resource/pattern/configuration. For example, when the first to the third (legacy) 8-port CSI-RS resources/patterns/configurations are {0, 1}, {2, 5}, and {4, 7} of FIG. 29, CDM-8 may be applied/set to {0 and 2}, {1 and 5}, and {4 and 7}, respectively.

In the case of 32-port, among four (legacy) 8-port CSI-RS resources/patterns/configurations to be aggregated, two of them are selected from within the same set, for which CDM-8 may be applied; for the remaining two (legacy) 8-port CSI-RS resources/patterns/configurations, too, two of them may be selected from within the same set, for which CDM-8 may be applied. For example, when the first to the fourth (legacy) 8-port CSI-RS resources/patterns/configurations are {0, 1}, {2, 5}, {4, 7}, and {8, 9} of FIG. 29, CDM-8 may be applied to {0 and 2}, {1 and 5}, {4 and 8}, and {7 and 9}, respectively. At this time, Eq. 23 is applied to {0, 1, 4, 7}, the first sub-4-port CSI-RS pool to which CDM-8 is applied, by using the weight vector of $[1\ 1]^T$ and to {2, 5, 8, 9}, the second sub-4-port CSI-RS pool, by using the weight vector of $[1\ -1]^T$, thereby forming a CDM-8 pattern.

According to the present embodiment, the eNB has to inform the UE of the information about resource selection through RRC signaling. In other words, in the case of 24-port, the eNB may inform the UE of two resources/patterns/configurations selected for application of CDM-8 within each set from among three (legacy) 8-port CSI-RS resources/patterns/configurations set for the UE (a total of three resources/patterns/configurations which may be indicated in the form of a 2-bit map) while, in the case of 32-port, the eNB may inform the UE of two resources/patterns/configurations selected for application of CDM-8 within each set from among four (legacy) 8-port CSI-RS resources/patterns/configurations (a total of six resources/patterns/configurations which may be indicated in the form of a 3-bit map) through additional RRC signaling.

Similarly, without additional RRC signaling for CDM-8, the eNB and the UE may predefine a method for applying CDM-8 in the order of 8-port CSI-RS resources/patterns/configurations to be aggregated. In other words, the aforementioned CDM-8 mapping may be applied in the order of resources/patterns/configurations for aggregation.

For example, when the first and the second 8-port CSI-RS resources/patterns/configurations of the UE set by a 24-port CSI-RS resource/pattern/configuration are {0, 1} and {2, 5} of FIG. 29, CDM-8 is applied to {0 and 2} and {1 and 5}, respectively while CDM-8 is applied/set to {4, 7}, which is the third 8-port CSI-RS resource/pattern/configuration. In the case of a 32-port, CDM-8 is applied to two sub-4-port CSI-RS pools included in the first and the second CSI-RS resources/patterns/configurations within the same set; and CDM-8 may also be applied to two sub-4-port CSI-RS pools included in the third and the fourth 8-port CSI-RS resources/patterns/configurations within the same set. For example, when the first to the fourth 8-port CSI-RS resources/patterns/configurations of the UE set by the 32-port CSI-RS resource/pattern/configuration are {0, 1}, {2, 5}, {4, 7}, and {8, 9}, CDM-8 may be applied to {0 and 2}, {1 and 5}, {4 and 8}, and {7 and 9}, respectively.

Figure 30:
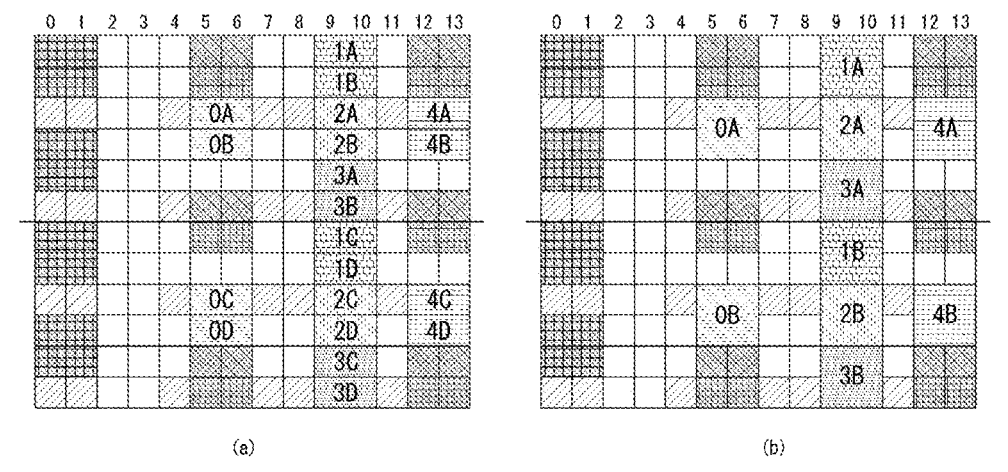

FIG. 30 illustrates CDM-8 patterns according to one embodiment of the present invention. More specifically, FIG. 30(a) generalizes the embodiment described with reference to FIG. 27, and FIG. 30(b) generalizes the embodiment described with reference to FIG. 29. The REs of FIG. 30 represented by the same pattern correspond to one (legacy) 8-port CSI-RS resource/pattern/configuration to be aggregated, and REs denoted by the same letter of the alphabet correspond to one CDM-8 pattern or group to which CDM-8 is applied. Also, each block in the figure represents REs, and OFDM symbol indices ranging from 0 to 13 are allocated to the REs sequentially from left to right direction, and subcarrier indices ranging from 0 to 11 are allocated to the REs sequentially from bottom to top direction.

Referring to FIG. 30, when CDM-8 is applied, (legacy) 8-port CSI-RS resources/patterns/configurations to be aggregated may be divided into four (see FIG. 30(a)) or two (see FIG. 30(b)) groups, and CDM-8 may be applied for each group denoted by the same letter of the alphabet. This scheme may be interpreted that for the purpose of achieving full transmission power, CDM-8 is applied not only for one (legacy) 8-port CSI-RS resource/pattern/configuration but also for the entire (legacy) 8-port CSI-RS resources/patterns/configurations to be aggregated.

More specifically, the UE may be set to receive 32-port CSI-RS resources/patterns/configurations in the form of aggregation of four 8-port CSI-RS resources/patterns/configurations, and as shown in the figure, CDM-8 may be applied in units of sub-2-port CSI-RS resources/patterns/configurations (in the case of FIG. 30(a)) or sub-4-port CSI-RS resources/patterns/configurations (in the case of FIG. 30(b)) grouped (denoted) by the same letter of the alphabet among (legacy) 8-port CSI-RS resources/patterns/configurations to be aggregated, respectively. Each (legacy) 8-port CSI-RS resource/pattern/configuration may be grouped into two or four groups, and CDM-8 may be applied on the basis of the same group for the entire 8-port CSI-RS resources/patterns/configurations.

Both of the embodiments of FIGS. 30(a) and 30(b) provide an advantage in terms of full transmission power and versatility (for example, when resources/patterns/configurations are divided into two groups under the same CSI-RS density, CDM-8 may be applied to both of the 24- and 32-port while resources/patterns/configurations are divided into four groups, CDM-8 may be applied to the 32-port). Also, taking into account the advantages and disadvantages of performance enhancement due to channel variation in the frequency/time domain and full power transmission, the aforementioned two options may need flexibility which may be set by the eNB. In this case, the eNB may indicate/designate the information about sub-CSI-RS resource/pattern/configuration to which CDM-8 is applied (or (legacy) 8-port CSI-RS resources/patterns/configurations divided into two or four groups) for the UE through RRC signaling.

Also, CDM-8 applied to the 20-port and the 28-port CSI-RS resource/pattern/configuration may be configured/set by a subset of CDM-8 patterns proposed in FIG. 30. For example, the 20-port CSI-RS resource/pattern/configuration may be selected within the 24-port CSI-RS resource/pattern/configuration obtained by applying the OCC code of Eq. 15 to each of three groups/patterns A, B, and C. In the simplest embodiment for selecting a 20-port CSI-RS resource/pattern/configuration, port numbering is performed sequentially in the 24-port CSI-RS resource/pattern/configuration for each group/pattern to which CDM-8 is applied (for example, A group/pattern: 15, 16, . . . , 22; B group/pattern: 23, 24, . . . , 30; and C pattern: 31, 32, . . . , 38), after which the 20-port CSI-RS resource/pattern/configuration may be composed by CSI-RS resources/patterns/configurations having port numbers ranging from 15 to 34. Similarly, the 28-port may consist of selections of CSI-RS resources/patterns/configurations from within the 32-port CSI-RS resource/pattern/configuration.

In the aforementioned embodiment, the 24-port or the 32-port CSI-RS resource/pattern/configuration consists of aggregation of (legacy) 8-port CSI-RS resources/patterns/configurations, and each CDM-8 group pattern to which CDM-8 is applied is defined as aggregation of sub-groups/patterns distinguished in terms of the (legacy) 8-port CSI-RS resource/pattern/configuration. In other words, when the (legacy) 8-port CSI-RS resource/pattern/configuration is divided into two or four sub-groups/patterns, a CDM-8 group/pattern may be defined in the form of aggregation of two or four sub-groups/patterns divided according to the respective (legacy) 8-port CSI-RS resource patterns.

However, different from the above, if 23-port or 32-port CSI-RS resource/pattern/configuration comprises aggregation of legacy 4-port CSI-RS resources/patterns/configurations, and CDM-8 group/pattern comprises aggregation of sub-patterns/groups divided in units of legacy 4-port CSI-RS resources/patterns/configurations, the eNB is allowed to configure a CSI-RS to which CDM-8 is applied in a more flexible manner. However, in this case, too, to prevent performance degradation, full power transmission has to be considered for each CSI-RS port, and spacing between REs comprising the CDM-8 group/pattern has to be kept small. In what follows, in an embodiment for aggregating legacy 4-port CSI-RS resources/patterns/configurations, a rule for aggregating sub-groups/patterns to prevent performance degradation is proposed.

Figure 31:
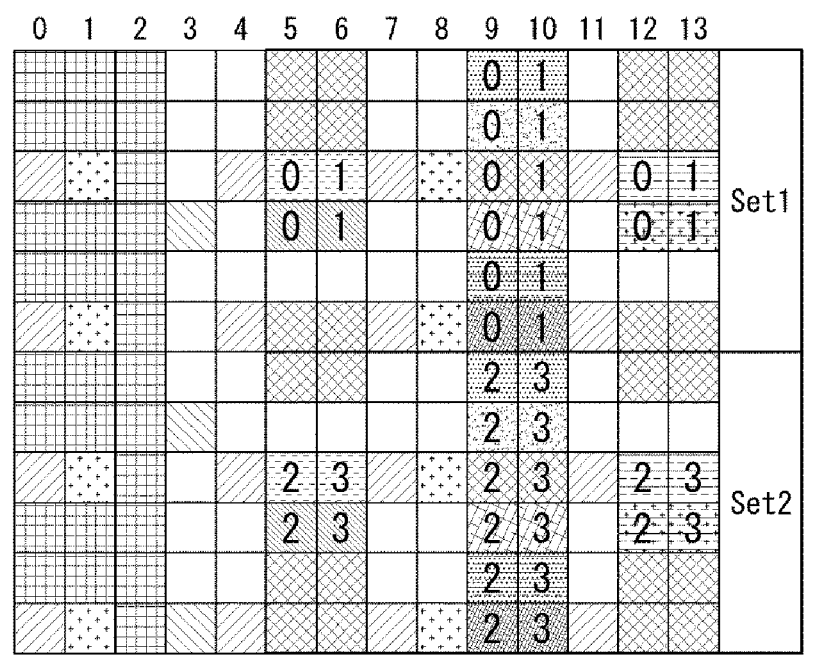

FIG. 31 illustrates CDM-8 patterns according to one embodiment of the present invention. Also, each block in the figure represents REs, and OFDM symbol indices ranging from 0 to 13 are allocated to the REs sequentially from left to right direction, and subcarrier indices ranging from 0 to 11 are allocated to the REs sequentially from bottom to top direction. The REs of FIG. 31 represented by the same pattern correspond to one (legacy) 8-port CSI-RS resource/pattern/configuration. Also, in FIG. 31, a set to which CDM-8 is applied may be determined with respect to the location of the subcarrier; for example, as shown in the figure, the REs of which the subcarrier index (k') is 0 to 5 may be defined as set2 while the REs of which the subcarrier index is 6 to 11 may be defined as set1.

Referring to FIG. 31, in the case of legacy 4-port CSI-RS resources/patterns/configurations to be aggregated (into 24- or 32-port CSI-RS resource/pattern/configuration), a condition may be imposed that at least one from the OFDM symbol index 5 and 6; and one from 12 and 13 have to be necessarily selected. Also, to solve power imbalance, the same number of 4-port CSI-RS resources/patterns/configurations (for example, 1 or 2) may be set to be selected from the OFDM symbol index 5 and 6; and 12 and 13. And/or the set1 and the set2 may include the same number of aggregated REs and/or to improve performance of CDM-8, it may be imposed so that CDM-8 is applied only within each set.

For example, one CDM-8 pattern may comprise four (0, 1) RE pairs from set 1 of FIG. 31. If two legacy 4-port CSI-RS resources/patterns/configurations located respectively at the OFDM symbol 5, 6 and 12, 13 are aggregated, one CDM-8 pattern/group may consist of the REs at the same subcarrier locations. For example, (0, 1) REs located at the subcarrier index 9 and OFDM symbol index 5, 6; and (0, 1) REs located at the subcarrier index 9 and OFDM symbol index 12, 13 may comprise the same CDM-8 pattern/group. Also, a condition may be imposed that two (0, 1) RE pairs located at the same OFDM symbol index are not included in one CDM-8 pattern/group. For example, (0, 1) REs located at the subcarrier index 9 and OFDM symbol index 5, 6; and (0, 1) REs located at the subcarrier index 8 and OFDM symbol index 5, 6 are not allowed to comprise the same CDM-8 pattern/group. Similarly, (0, 1) RE pairs located at the OFDM symbol index 5, 6 and 12, 13 may be restricted so that only one RE pair is allowed to be included in one CDM-8 pattern/group.

In the case of a CSI-RS design to which CDM-8 is applied, two types of port numbering as shown in Eqs. 24 and 25 below may be considered.

$$n = kN + p', \ p' = 15, \ldots, +14+N, k = 0, 1, \ldots, K-1 \quad \text{[Eq. 24]}$$

$$n = \begin{cases} p' + \dfrac{N}{2}k, & p' = 15, 16, \ldots, +14 + \dfrac{N}{2} \\ p' + \dfrac{N}{2}(k+K-1), & p' = 15 + \dfrac{N}{2}, \ldots, +14+N \end{cases} \quad \text{[Eq. 25]}$$

In Eqs. 24 and 25, n indicates a final CSI-RS port number according to the port numbering result, K indicates the number of CSI-RS configurations, N indicates the number of antenna ports for each CSI-RS configuration to be aggregated. In addition, descriptions about parameters used in Eqs. 24 and 25 are the same as given with respect to Eq. 20.

Equation 24 describes the simplest port numbering rule which sequentially numbers CSI-RS ports to be aggregated.

Equation 25 is forward-compatible, which may be set for the purpose of sharing a CSI-RS between the UE set with a CSI-RS resource/pattern/configuration having 32-ports or more to which CDM-8 is applied and a Rel-14 CDM-8 UE.

The port numbering rule according to Eqs. 24 and 25 may be agreed upon between the UE and the eNB in advance, or the eNB may indicate the rule for the UE through RRC signaling.

Up to this point, descriptions have been given with a focus on the embodiment in which a plurality of CSI-RS resources/patterns/configuration are aggregated (for example, aggregation of 2 to 4 CSI-RS resources/patterns/configurations, where each CSI-RS resource/pattern/configuration to be aggregated may be in the form of a "composite resource" consisting of a plurality of legacy CSI-RS resources/patterns/configurations). In what follows, rather than additionally defining the "composite resource" form in particular, the embodiment is extended to a more generalized form in which individual (legacy) CSI-RS resources/patterns/configurations are aggregated.

In what follows, to avoid confusion in terms, (like the term defined in the current physical layer standard) "CSI-RS configuration" may be regarded as the RE location of each PRB pair to which CSI-RS is transmitted/mapped (which may be referred to as "resourceConfig" in terms of the upper layer). Also, (like the term defined in the current physical layer standard) "CSI-RS resource (configuration)" may be used as a term indicating scrambling parameter information (for example, virtual cell ID (VCID)), number of CSI-RS antenna ports, transmission subframe period/offset information and/or qcl-CRS related information in addition to the CSI-RS configuration information (which may be referred to as "CSI-RS-ConfigNZP" in terms of the upper layer).

In the aforementioned CSI-RS design for 20-, 24-, 28-, and 32-port, a method for aggregating a plurality of (legacy) 4- and 8-port CSI-RS resources/patterns/configurations as shown below may be considered.
- 20-port CSI-RS resource/pattern/configuration: 4+4+4+4+4 (namely aggregation of five (legacy) 4-port CSI-RS resources/patterns/configurations)
- 24-port CSI-RS resource/pattern/configuration: 4+4+4+4+4+4/8+8+8 (namely aggregation of six (legacy) 4-port CSI-RS resources/patterns/configurations or three (legacy) 8-port CSI-RS resources/patterns/configurations)
- 28-port CSI-RS resource/pattern/configuration: 4+4+4+4+4+4+4 (namely, aggregation of seven (legacy) 4-port CSI-RS resources/patterns/configurations)
- 32-port CSI-RS resource/pattern/configuration: 4+4+4+4+4+4+4+4/8+8+8+8 (namely aggregation of eight (legacy) 4-port CSI-RS resources/patterns/configurations or four (legacy) 8-port CSI-RS resources/patterns/configurations)

In other words, a CSI-RS resource/pattern/configuration for 20-ports or more may consist of aggregation of legacy CSI-RS resources/patterns/configurations of the same size (for example, 4- or 8-port CSI-RS resources/patterns/configurations).

Besides the aggregation embodiment described above, 20-, 24-, 28-, and 32-port CSI-RS resource/pattern/configuration may be derived in the form of aggregation among CSI-RS resources/patterns/configurations having a different number of ports; however, in the present specification, it is assumed that for the simplicity of configuration/operation, all of k (k=1, 2, . . . , K) CSI-RS resources/patterns/configurations to be aggregated are restricted to have the same number of ports (namely $N_1=N_2= \ldots N_K=N$, N=4 or 8).

As one example, as shown in Table 8 below, a predetermined restriction may be imposed so that CSI-RS resource/pattern/configuration having a particular number of ports (for example, 20, 24, 28, or 32) may be configured/set/indicated by using only the combination of the number (K) of CSI-RS resources/patterns/configurations to be aggregated and the number of antenna ports (N) per aggregated CSI-RS resource/pattern/configuration.

TABLE 8

| Total # of ports in the CSI-RS resource | 20 | 24 | 28 | 32 |
|---|---|---|---|---|
| # of CSI-RS configurations (K) | 5 | 3 | 7 | 3 |
| # of antenna ports per aggregated CSI-RS configuration (N) | 4 | 8 | 4 | 8 |

In other words, as shown in Table 8, CSI-RS resource/pattern/configuration having a particular number of ports may be designed in a direction to minimize/simplify the combination of aggregated (legacy) CSI-RS resources/patterns/configurations.

According to the present embodiment, all of N aggregated CSI-RS resources/patterns/configurations may be transmitted in PRB units or specific PRB-pair group units through the TDM and/or FDM scheme. In the latter case, each PRB may include a specific number of aggregated CSI-RS resources/patterns/configurations, where the number is smaller than N. When the CSI-RS resources/patterns/configurations are transmitted according to the TDM and/or FDM scheme, it brings an effect of reducing CSI-RS transmission overhead from a network point of view.

In the case of TDM or FDM transmission, a scheme may be defined/set so that N aggregated CSI-RS resources/patterns/configurations are transmitted over A (for example, A=2) (neighboring) PRB-pairs (namely a scheme for transmitting N/A CSI-RS resources/patterns/configurations per PRB-pair). And/or the scheme may further be defined/set so that the A PRB-pair groups are repeated over the whole frequency band (or over a specific frequency band). Embodiments for the aforementioned definitions/configurations are illustrated in Tables 9 and 10 below.

TABLE 9

```
CSI-RS-ConfigNZP-r11 ::=      SEQUENCE {
    csi-RS-ConfigNZPId-r11        CSI-RS-ConfigNZPId-r11,
    antennaPortsCount-r11         ENUMERATED {an1, an2, an4, an8},
    resourceConfig-r11            INTEGER (0..31),
    subframeConfig-r11            INTEGER (0..154),
    scramblingIdentity-r11        INTEGER (0..503),
    qcl-CRS-Info-r11              SEQUENCE {
        qcl-ScramblingIdentity-r11    INTEGER (0..503),
```

TABLE 9-continued

```
    crs-PortsCount-r11                  ENUMERATED {n1, n2, n4, spare1},
    mbsfn-SubframeConfigList-r11        CHOICE {
        release                             NULL,
        setup                               SEQUENCE {
            subframeConfigList                  MBSFN-SubframeConfigList
        }
    }                                   OPTIONAL    -- Need
ON
    }                                   OPTIONAL,   -- Need
OR
```

TABLE 10

```
CSI-RS-ConfigNZP-EMIMO-r13 ::=  CHOICE {
    release                         NULL,
    setup                           SEQUENCE {
        nzp-resourceConfigList-r13      SEQUENCE (SIZE (1..6)) OF NZP-ResourceConfig-r13,
        cdmType-r13                     ENUMERATED {cdm2, cdm4}  OPTIONAL  -- Need OR
    }
}
NPZ-ResourceConfig-r13 ::= SEQUENCE {
    resourceConfig-r13              ResourceConfig-r13,
    fdmtype                         ENUMERATED {odd, even}
      or
    fdmtype                         ENUMERATED {0,1,2}
    ...
}
```

In Tables 9 and 10, "fdmtype" is an indicator indicating index(es) of a PRB-pair (for example, 0, 1, 2, . . . , $N_{RB}-1$, where $N_{RB}$ denotes the total number of RBs corresponding to the system bandwidth) to inform through which PRB-pair each aggregated CSI-RS resource/pattern/configuration is transmitted.

For example, fdmtype may be set to indicate either of {even, odd}. If fdmtype is set to "even", it may indicate that the CSI-RS resource/pattern/configuration which is an object indicated by fdmtype has to be all transmitted through PRB-pairs having the index of 0, 2, 4, and so on. Similarly, if fdmtype is set to "odd", it may indicate that the CSI-RS resource/pattern/configuration which is an object indicated by fdmtype has to be all transmitted through PRB-pairs having the index of 1, 3, 5, and so on.

In another example, fdmtype may indicate one of {0, 1, 2, . . . , M−1}. This example corresponds to the case where the repetition factor (RPF) is M, where M may be indicated separately through RRC signaling or set to be the same as the number (N) of aggregated CSI-RS resources/patterns/configurations.

If fdmtype='0', it may indicate that the CSI-RS resource/pattern/configuration which is an object indicated by fdmtype has to be all transmitted through PRB-pairs having the index of 0, M, 2M, and the like; in the case of '1', it may indicate that the CSI-RS resource/pattern/configuration which is an object indicated by fdmtype has to be all transmitted through PRB-pairs having the index of 1, M+1, 2M+1, and the like. If fdmtype is 'M−1', it may indicate that the CSI-RS resource/pattern/configuration which is an object indicated by fdmtype has to be all transmitted through PRB-pairs having the index of M−1, 2M−1, 3M−1, and the like.

If M is set to be the same as the number (N) of aggregated CSI-RS resources/patterns/configurations, the number of ports transmitted from one PRB-pair becomes K. For example, when 24-port CSI-RS resource/pattern/configuration is configured as (N, K)=(3, 8), the number of ports transmitted from one PRB becomes 8 (N=3). In this case, too, CSI-RS density is set to ⅓ RE/RB/port.

If M is determined by decimation of the CSI-RS, transmission of Q-port (Q=NK) CSI-RS from M PRBs may be taken into consideration. At this time, M may be indicated by RRC signaling or predefined as described above.

For example, when M=2, Q-port (Q=NK) CSI-RS may be transmitted only from (every) odd or (every) even PRB; when M=3, CSI-RS may be transmitted only from the PRB 0, 3, 6, and the like, where a different offset value may be set for each UE. For example, a UE set by the offset '1' may transmit Q-port (Q=NK) CSI-RS only from the PRB 1, 4, 7, and the like.

And/or it may be predetermined that M is set to be the same as N. At this time, as described below, among the total of N CSI-RS resources/patterns/configurations, $N_d$ (for example, $N_d$=1) specific resources/patterns/configurations may be included in the existing CSI-RS resource/pattern/configuration-related setting (or legacy field) (for example, CSI-RS-ConfigNZP-r11). In this case, since it is difficult to add a new field such as "fdmtype" to a legacy field (legacy UEs are unable to recognize the new field), the "fdmtype" about $N_d$ CSI-RS resources/patterns/configurations may be set/indicated as a specific "default state" separately through RRC signaling or fixed to a specific state in the standard. For example, the "default state" about $N_d$ CSI-RS resources/patterns/configurations may be fixed to "even". This again indicates that $N_d$ (default) CSI-RS resources/patterns/configurations are all transmitted through PRB-pairs always having the index of 0, 2, 4, and the like.

In this case, an advantage is obtained that fdmtype may be set to either of {even, odd} in a flexible manner for each resource/pattern/configuration with respect to the remaining $(N-N_d)$ CSI-RS resources/patterns/configurations other than the $N_d$ CSI-RS resources/patterns/configurations. As one example, even though fdmtype of $N_d$ (default) CSI-RS resources/patterns/configurations is even (or odd)", the eNB may set all of the other $(N-N_d)$ CSI-RS resources/patterns/configurations to "odd (or even)".

The present embodiment is characterized in that application of such asymmetrical FDM scheme is possible to improve the eNB's flexibility in setting the FDM scheme. The present embodiment may be regarded as being related to fdmtype having (RE/RB/port) density of ½.

If the FDM type has density lower than that of the present embodiment, 1/M (for example, M=3), a specific offset value F (for example, F=0, 1, ..., M−1) other than an even or odd number may be simply set for the UE, and CSI-RS may be transmitted from the PRB-pairs having indices satisfying the modular M operation with respect to the F (for example, F=mod(I, M), where I=0, ..., N_RB_max−1).

For example, the CSI-RS set to M=3 and F=0 may be regarded as being transmitted from PRB-pairs indexed by 0, 3, 6, and the like. In this case, the default state may be fixed to "F=0". If the embodiment is applied to the case where density=½, F may be set to 0 and 1 (F=0 and F=1).

By using signaling related to CSI-RS resource Config and fdmtype (for example, F value), the eNB may set/apply the CSI-RS resource/pattern/configuration to the UE to which the FDM type has been set/applied in a flexible manner. In this case, the CSI-RS resource/pattern/configuration may be set independently for each PRB-pair.

Also, an embodiment may be proposed, where a legacy UE maximizes use of other resources except for the CSI-RS resource set to the UE to which FDM type is set/applied or maximizes cell reuse factor. In one embodiment, in the case of a UE for which FDM type is applied, the CSI-RS resource/pattern/configuration is kept to be the same, but only signaling related to the FDM type may be restricted to be set differently. For example, to set 32-port CSI-RS resource/pattern/configuration and ½ density, the eNB may set 8-port CSI-RS configuration 1 and 2 to an even PRB-pair; and 8-port CSI-RS configuration 1 and 2 to an odd PRB-pair.

As another embodiment, to set 20-port CSI-RS resource/pattern/configuration and ½ density, the eNB may set 4-port CSI-RS configuration 1, 2, and 3 to an even PRB-pair; and 4-port CSI-RS configuration 1 and 2 to an odd PRB-pair.

When the K value indicating aggregation such as 20-port and 28-port CSI-RS resource/pattern/configuration is an odd number, the default state in the aforementioned example (for example, "even/odd PRB-pair") may be predefined so that one CSI-RS resource/pattern/configuration is additionally mapped.

On the other hand, if the UE, from signaling of density value (d), is set to d=1 (M=1), the UE recognizes density as '1'; if the UE is set to d=½ (M=2), the UE recognizes the density as '½'; and if the UE is set to d=⅓ (M=3), the UE recognizes the density as '⅓'. In this case, the UE may be set by M CSI-RS resources/patterns/configurations only.

In this case, the first [K/M] resource configurations having the same resource configuration number are all recognized as being set to the UE together with F=0, F=1, ..., F=M−1; and the remaining K−[K/M]M resource configurations may be defined as being set to a PRB-pair in the default state (for example, F=0). For example, to set 28-port CSI-RS resource/pattern/configuration and ⅓ density (d=⅓, M=3), if the eNB sets 4-port CSI-RS configurations 3, 6, 7 and M=3 to the UE, the UE may recognize that 4-port CSI-RS configurations 3, 6, and 7 are mapped/set to the default PRB pairs where F=0; and 4-port CSI-RS configurations 3 and 6 are mapped/set to the PRB-pairs where F=1 and F=2.

And/or not only the "fdmtype" information described above but also "tdmtype" information may be signaled in a similar manner as in the fdmtype information. Here, "tdmtype" is an indicator indicating at which subframe index(es) (for example, 0, 1, 2, ..., N_period −1, where N_period is the period of CSI-RS transmission) each aggregated CSI-RS configuration is transmitted.

As a simple example of tdmtype, tdmtype may be indicated by using one of {0, 1, 2, 3, 4}, which may indicate that CSI-RS is transmitted from a subframe with an index separated by {0, 1, 2, 3, 4} from a CSI-RS transmission offset. Here, the fact that tdmtype is indicated by one of {0, 1, 2, 3, 4} indicates that even when N_period is 10, the subframe index to which CSI-RS aggregation is applied is restricted to {0, 1, 2, 3, 4}, which provides an advantage that performance degradation due to phase drift is reduced.

At this time, specific $N_d$ (for example, $N_d$=1) CSI-RS configurations among a total of N aggregated CSI-RS configurations may be included in an existing CSI-RS resource/pattern/configuration-related setting (or legacy field) (for example, CSI-RS-ConfigNZP-r11). In this case, since it is difficult to add a new field such as "tdmtype" to a legacy field (legacy UEs are unable to recognize the new field), the "tdmtype" about $N_d$ CSI-RS resources/patterns/configurations may be set/indicated as a specific "default state" separately through RRC signaling or fixed to a specific state in the standard.

In one example, the "default state" may be fixed to "offset+0". This setting indicates that all of $N_d$ (for example, $N_d$=1) (default) CSI-RS resources/patterns/configurations are always transmitted from the subframe having the index of 'offset+0'. The eNB may set the remaining (N −$N_d$) CSI-RS resources/patterns/configurations in a flexible manner among offset+{0, 1, 2, 3, 4} for each resource/pattern/configuration.

For example, although the eNB may set Na (default) CSI-RS resources/patterns/configurations to "offset+0", all of the remaining (N −$N_d$) CSI-RS resources/pattern/configurations may be set to "offset+1". The present embodiment is characterized in that application of such asymmetrical TDM scheme is possible to improve the eNB's flexibility in setting the TDM scheme.

The proposed "fdmtype" and "tdmtype" related embodiments may be applied independently or in conjunction with each other.

When an FDMed CSI-RS is set up, to perform noise suppression, information such as delay spread, Doppler spread, Doppler shift, average gain, and average delay needs to be measured accurately. However, in the case of a UE set by transmission mode (TM) 10 and QCL-type B, QCL information is set so that the QCL assumption with respect to a specific CRS (indicated by a physical cell-ID (PCI)) is made to be performed only for Doppler spread and Doppler shift (according to CSI-RS configuration); thus, in the case of an FDMed CSI-RS, it is difficult to measure the information about delay spread accurately by using the CSI-RS only.

To solve the problem above, in one embodiment, when an FDMed CSI-RS is set to the UE, even if QCL-type B is set to the UE (in the TM 10), specific QCLed CRS (associated with a PCI) information, which makes the QCL assumption performed (additionally) on the corresponding FDMed CSI-RS and delay spread and/or average delay, may be provided to the UE.

Similarly, when an FDMed CSI-RS is set, QCLed CRS information may be made to be necessarily provided to the UE so that the UE improves performance in measuring the FDMed CSI-RS by always using large-scale parameters (LSPs) of the channel including Delay spread and/or Average delay estimated through the corresponding QCLed CRS. More specifically, in a new CSI-RS setting where density of CSI-RS such as the FDMed CSI-RS becomes lower than the existing density, even if the UE is generally set to measure/estimate specific LSPs (for example, Delay spread and/or Average delay) by using the corresponding CSI-RS itself without support from other RS as in the case where the UE is set to the QCL-type B, the UE's operation may be defined/set to (exceptionally) follow at least one of the following options.

Option 1: in the aforementioned condition, the UE is assumed to be of "QCL-type A" to (exceptionally) measure/estimate the channel of (FDMed) CSI-RS. This indicates that in measuring/estimating the channel of the (FDMed) CSI-RS, performance enhancement may be obtained by utilizing LSPs estimated from serving-cell CRS ports 0 to 3 as in the case of the QCL-type A assumption. According to the present option, when the UE is set to the (FDMed) CSI-RS together with other existing CSI-RS (for example, for the purpose of CoMP), the QCL-type B has to be still applied for the existing CSI-RS and therefore, either the QCL-type A or the QCL-type B may be applied selectively depending on the attribute of the specific CSI-RS.

Option 2: in the aforementioned condition, when the UE (exceptionally) measures/estimates the channel of the (FDMed) CSI-RS, in addition to the QCLed CRS (intended for Doppler spread and Doppler shift) associated to be applied by default for QCL-type B, the QCL assumption is additionally applied for serving cell CRS ports 0 to 3 and Delay spread and/or Average delay. According to the present option, when the PCI of a specific CRS (which is indicated with the PCI) set by default in a CSI-RS configuration is different from the PCI of a serving-cell CRS, CRSs for which the QCL assumption is applicable may be different for specific LSPs. Also, according to the present option, an advantageous effect is obtained in that flexibility in setting an eNB may be provided.

Option 3: in the aforementioned condition, when the UE (exceptionally) measures/estimates the channel of the (FDMed) CSI-RS, the QCL assumption is made to be applied, from the QCLed CRS (indicated with PCI) associated to be applied by default for the QCL-type B, not only to Doppler spread and Doppler shift but also to Delay spread and/or Average delay. According to the present option, in channel measurement/estimation of a new type CSI-RS proposed by the present specification and an existing CSI-RS, there may be different combinations of available LSPs among the LSPs estimated from QCLed CRSs which may benefit from the QCL assumption for performance enhancement. In other words, in the case of the existing CSI-RS, only the Doppler spread and Doppler shift parameters may be utilized from a QCLed CRS according to the QCL assumption; however, in the case of the new CSI-RS, in addition to the corresponding parameters, Delay spread and/or Average delay parameter may also be utilized according to the QCL assumption.

A CSI-RS may be transmitted at a specific period (for example, 5 ms grid, 10 ms grid, and the like). Considering that the number of REs which may be allocated for an existing CSI-RS is 40 per PRB-pair, when a CSI-RS resource/pattern/configuration having X-ports (for example, X=24, 28, or 32) exceeding 20-ports is set to one PRB-pair, cell reuse factor amounts only to '1'. Therefore, to increase the cell reuse factor, inter-cell coordination may be performed at the network level.

For example, CSI-RS 1 and CSI-RS 2 are set to cell 1 and cell 2 respectively with grids of 10 ms, but the subframe (SF) offset is set to have a difference as much as 5 ms between the cells. From the setting above, UEs within the coverage of each cell are set to a specific zero-power (ZP) CSI-RS which covers both of the transmission locations of CSI-RS 1 and CSI-RS 2 with grids of 5 ms, by which the UEs are applied to PDSCH rate matching. As a result, through an appropriate ZP CSI-RS setting as described above, the location of a transmission resource of each CSI-RS x is prevented from being overlapped with the PDSCH transmission resource location, and thereby reception quality of each CSI-RS x may be guaranteed.

However, the present embodiment has a problem that for a CSI-RS resource/pattern/configuration having X-ports (for example, X=24, 28, or 32) exceeding 20-ports, a CSI-RS with grids of 5 ms may not be set to increase the cell reuse factor.

To solve the problem above, a ZP CSI-RS which does not need to conform to the constraint of 5 ms grid may be set in addition to an existing ZP CSI-RS setting (only for the case where a new CSI-RS setting such as the aforementioned CSI-RS resource/pattern/configuration having X-ports (for example, X=24, 28, or 32) exceeding 20-ports is applied). In other words, in an example where the cell 1 and the cell 2 are set to the CSI RS 1 and the CSI-RS 2 respectively with grids of 10 ms, each UE may be set additionally to the ZP CSI-RS 2 while being set to an existing, specific ZP CSI-RS 1. In this case, the ZP CSI-RS 2 may be set to have an arbitrary value of SF offset together with the ZP CSI-RS 1, and the UE may be set to the additional ZP CSI-RS 2 for which a specific restriction such as 5 ms grid is not imposed.

By doing so, the cell 1 and the cell 2 become capable of setting the CSI-RS 1 and the CSI-RS 2 respectively to, for example, 5 ms grid, and a CSI-RS may be transmitted while the SF offset between the CSI-RSs being kept to be as much as 1 ms, thereby providing an advantage that rate matching is performed by the ZP CSI-RS 1 and/or 2 and collision with PDSCH transmission is prevented.

At this time, the additional ZP CSI-RS 2 may be designed to be set to the ZP CSI-RS REs existing, for example, in a plurality of adjacent SFs (or multiple SFs within the same period). In other words, instead of being set to a period and a single SF offset as in the existing ZP CSI-RS 1, the ZP CSI-RS 2 may be set to a period and a plurality of SF offsets (for example, a period of 5 ms and SF offsets of 0 and 1).

The new form of ZP CSI-RS proposed above may be restricted to be set only when at least one of the following specific conditions are met:

When (at least one) specific new type of CSI-RS (for example, 24-, 28-, or 32-port CSI-RS) for which the cell reuse factor is only 1 (or 2) is set within 40 REs (per PRB pair) which may be allocated when an existing CSI-RS is set.

When a specific transmission mode (for example, TM11) is set.

When setting of a new type of CSI-RS is indicated through a specific RRC indicator while a CSI procedure is being set, a new ZP CSI-RS associated with the indication may be set. Similarly, the aforementioned setting/operation may be activated/deactivated by a separate, explicit RRC indicator.

In the case of a CSI-RS transmitted in the form of aggregation of a plurality of legacy CSI-RS resources/patterns/configurations, CDM-2 may be applied as in the case of an existing legacy CSI-RS. Also, as defined in the Rel. 13, CDM-4 may be applied in units of legacy 4-port CSI-RS resource/pattern/configuration for the case of aggregation in 4-port units while, for the case of aggregation in 8-port units, CDM-4 may be applied in the form of a 2-by-2 RE matrix for which OFDM symbols and subcarriers are concatenated. In the case of CDM-x (where x>4), the aforementioned embodiment may be employed, and when a CSI-RS is FDMed or TDMed to be configured/transmitted, the same CDM may be applied over the resources within each PRB.

Figure 32:
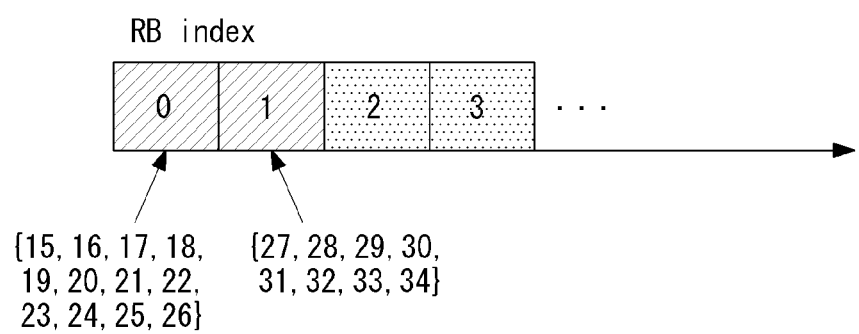
FIG. 32 illustrates port numbering according to one embodiment of the present invention.

FIG. 32 illustrates port numbering according to one embodiment of the present invention.

Referring to FIG. 32, when a CSI-RS is FDMed and transmitted through a PRB pair, among the ports of the CSI-RS resource/pattern/configuration to which the corresponding CSI-RS is mapped, those ports corresponding to the CSI-RS transmitted from a PRB having the same even (or odd)-numbered index are first numbered, after which those ports corresponding to the CSI-RS transmitted from a PRB having the remaining odd (or even)-numbered index are numbered.

For example, when X-ports (where X=20) are configured, through RRC signaling or according to an agreement made in advance between the eNB and the UE, three out of five 4-port CSI-RS resources/patterns/configurations are configured/mapped to the 0-th PRB, the ports of which are numbered sequentially as 15 to 26 while the two remaining CSI-RS resources/patterns/configurations may be configured/mapped to the first PRB, the port of which are numbered sequentially as 27 to 34. Next, the second and the third PRB may also be numbered according to the aforementioned port numbering rule in the same manner as in the 0-th and the 1st PRB.

Similarly, information about N CSI-RS configuration(s) comprising X-port CSI-RS resource/pattern/configuration configured/mapped for each (FDMed/TDMed) PRB-pair group may be provided independently through RRC signaling, and in this case, the port numbering rule described above may be applied. The aforementioned port numbering rule may be extended to be applied to an embodiment of aggregation of a PRB-pair group (A>2) consisting of two or more PRB-pairs.

In addition to the port numbering rule by which CSI-RS ports corresponding to the respective PRB-pairs are numbered sequentially, another port numbering rule as shown in Eq. 26 below may also be used so that legacy UEs may reuse an X-port CSI-RS resource/pattern/configuration to be aggregated.

$$l = \begin{cases} p' + \frac{L}{2}(k + 1_{z=odd} \cdot K_{even}) & p' = 15, 16, \ldots, +14 + \frac{L}{2} \\ p' + \frac{L}{2}(k + K - 1 + 1_{z=odd} \cdot K_{even}) & p' = 15 + \frac{L}{2}, \ldots, +14 + L \end{cases} \quad [\text{Eq. 26}]$$

In Eq. 26, $1_{z=odd}$ is an indicator function and assumes a value of 1 only when the PRB index z is an odd number (otherwise, it is '0'), and $K_{even}$ represents the number of CSI-RS configurations aggregated in an even-numbered PRB-pair (or indexed with an even number). For example, in the embodiment of FIG. 32, $K_{even}=3$. Descriptions about the remaining parameters are the same as given with respect to the equations above.

If Eq. 26 is extended to be applied to FDM transmission, the ports of the CSI-RS configuration mapped to a set specific PRB offset value F (where F=0, 1, ..., M−1) may be numbered sequentially. For example, if 28-port CSI-RS resource/pattern configuration comprises aggregation of seven 4-port CSI-RS resources/patterns/configurations and transmitted/set by FDM with M=3 (density ⅓), three 4-port CSI-RS resources/patterns/configurations may be set/mapped to F=0, three 4-port CSI-RS resources/patterns/configurations may be set/mapped to F=1, and one 4-port CSI-RS resource/pattern/configuration may be set/mapped to F=2. In this case, those ports transmitting the three 4-port CSI-RS resources/patterns/configurations of F=0 may be numbered sequentially as 15, 16, 17, 18/19, 20, 21, 22/23, 24, 25, and 26; those ports transmitting the three 4-port CSI-RS resources/patterns/configurations of F=1 may be numbered sequentially as 27, 28, 29, 30/31, 32, 33, 34/35, 36, 31, and 38; and those ports transmitting the one 4-port CSI-RS resource/pattern/configuration of F=2 may be numbered sequentially as 39, 40, 41, and 42.

Equation 26 may be applied to the CSI-RS where CDM-2 is applied. In the case of 12- or 16-port CSI-RS resource/pattern/configuration to which CDM-4 is applied, Eq. 26 may be applied only when the total number of ports of CSI-RS resources/patterns/configurations aggregated within all of the individual PRB pairs is 12 (or 16) in the aforementioned example of the X-port (where X=20, 24, 28, and 32) CSI-RS resource/pattern/configuration. For example, Eq. 26 may be applied only when 24-port CSI-RS resource/pattern/configuration is transmitted by being divided into two PRB-pairs with 12-ports (24=12+12) or when 36-port CSI-RS resource/pattern/configuration is transmitted by being divided into two PRB-pairs with 18-ports (32=16+16).

An embodiment of RRC signaling related to the CDM-x proposed by the present specification is described as follows.

1. CDM-6 may be applied to an X-port (for example, X=12, 24, 30, and the like) CSI-RS resource/pattern/configuration which comprises aggregation of CSI-RS resources/patterns/configurations in units of 6-ports or where the total number of ports is a multiple of 6. In the case of an X-port CSI-RS resource/pattern/configuration to which CDM-6 is applied, CDM-2 may also be applied. Therefore, the eNB may inform the UE of which CDM-type is applied/used through RRC signaling. In other words, through RRC signaling, the eNB may inform the UE of which CDM type is applied/used between CDM-2 and CDM-6.

2. CDM-8 may be applied to an X-port (for example, X=16, 24, 32, 40, and the like) CSI-RS resource/pattern/configuration which comprises aggregation of CSI-RS resources/patterns/configurations in units of 8-ports or where the total number of ports is a multiple of 8. In the case of an X-port CSI-RS resource/pattern/configuration to which CDM-8 is applied, CDM-2 and CDM-4 may also be applied. Therefore, the eNB may inform the UE of which CDM-type is applied/used through RRC signaling. In other words, through RRC signaling, the eNB may inform the UE of which CDM type is applied/used from a set consisting of CDM-2, CDM-4, and CDM-8 or from a set consisting of at least part of the three CDM types.

3. CDM-12 may be applied to an X-port (for example, X=12, 24, 36, 48, and the like) CSI-RS resource/pattern/configuration where the total number of ports is a multiple of 12. In the case of an X-port CSI-RS resource/pattern/configuration to which CDM-12 is applied, CDM-2 and CDM-6 may also be applied. Therefore, the eNB may inform the UE of which CDM-type is applied/used through RRC signaling. In other words, through RRC signaling, the eNB may inform the UE of which CDM type is applied/used from a set consisting of CDM-2, CDM-6, and CDM-12 or from a set consisting of at least part of the three CDM types.

4. CDM-16 may be applied to an X-port (for example, X=16, 32, 48, 64, and the like) CSI-RS resource/pattern/configuration where the total number of ports is a multiple of 16. In the case of an X-port CSI-RS resource/pattern/configuration to which CDM-16 is applied, CDM-2, CDM-4, and CDM-8 may also be applied. Therefore, the eNB may inform the UE of which CDM-type is applied/used through RRC signaling. In other words, through RRC signaling, the eNB may inform the UE of which CDM type is applied/used from a set consisting of CDM-2, CDM-4, CDM-8, and CDM-16 or from a set consisting of at least part of the four CDM types.

5. CDM-20 may be applied to an X-port (for example, X=20, 40, 60, and the like) CSI-RS resource/pattern/configuration where the total number of ports is a multiple of 20. In the case of an X-port CSI-RS resource/pattern/configuration to which CDM-20 is applied, CDM-2 may also be applied. Therefore, the eNB may inform the UE of which CDM-type is applied/used through RRC signaling. In other words, through RRC signaling, the eNB may inform the UE of which CDM type is applied/used between CDM-2 and CDM-20.

In the description above, an embodiment in which the same CDM-x is applied to a set X-port CSI-RS has been described. For example, according to the embodiment above, CDM-4 is applied for all of five 4-port CSI-RSs comprising 20-port CSI-RS. However, different from the description above, in what follows, an embodiment in which different CDM types are applied to an X-port CSI-RS comprising aggregation of CSI-RSs in small port units will be proposed additionally. For example, CDM-8 and CDM-4 or CDM-2 and CDM-4 may be applied to a 20-port CSI-RS in a mixed form.

According to the present embodiment, the eNB is enabled to set the type of CDM applied to a CSI-RS in a more flexible manner, and thereby an advantageous effect of relieving power imbalance between CSI-RS ports that may occur due to aggregation of CSI-RS resources/patterns/configurations is obtained. Through RRC signaling, the eNB may inform the UE of which CDM type is applied for each RE or for each aggregated CSI-RS resource/pattern/configuration.

Two alternative approaches may be considered to support new {20, 24, 28, 32}CSI-RS ports in the eFD-MIMO, as follows.

Alt. 1: Fixes a new CSI-RS pattern.
Alt 2: A new CSI-RS port comprises a set of legacy 2/4/8 ports.
Alt. 1 indicates that at least one of new CSI-RS configurations has to be added to the standard and fixed therein. An advantage of the present alternative is that issues in implementing a UE may be minimized, and improved functions may be integrated into the existing standard table.

On the other hand, compared with the Alt. 1, Alt. 2 provides an advantage that more flexibility is provided in RRC setting with respect to aggregation of K (>1) CSI-RS configurations.

If consistency with CSI-RS design in the Rel. 13 FD-MIMO is considered, Alt. 2 may be more preferable. In this respect, a rule for aggregating 12-port and 16-port of Rel. 13 may be reused. In the 12-port and 16-port CSI-RS design, only the aggregation case exhibiting the minimum K value is allowed, where N1=N2= . . . =NK=N. Here, K is the number of aggregated CSI-RS configurations, and N is the number of antenna ports per CSI-RS configuration. According to the present principle, a new CSI-RS port may be configured by the value of (K, N) as shown in Table 11 below.

TABLE 11

| Total # of CSI-RS ports | 20 | 24 | 28 | 32 |
|---|---|---|---|---|
| # of aggregated CSI-RS configurations (K) | 5 | 3 | 7 | 4 |
| # of antenna ports per aggregated CSI-RS configuration (N) | 4 | 8 | 4 | 8 |

According to Table 11, to design a 20-, 24-, 28-, or 32-port CSI-RS, a rule for aggregating 12-port and 16-port CSI-RS of the Rel. 13 consisting of the minimum number (K) of aggregated CSI-RS configurations and the maximum number (N) of the same ports per aggregated CSI-RS configuration may be maintained.

Another feature of the CSI-RS design of the Rel. 13 is that CDM-4 is introduced to improve 12-port and 16-port CSI-RS transmission power. Since the same method for aggregating a 12-port and 16-port CSI-RSs is considered for a new CSI-RS port, the same method as the CDM-4 applied to the Rel. 13 may be directly extended to be applied to a newly defined CSI-RS port. In other words, in the case of 4-port aggregation, CDM-4 is applied to four REs located at a legacy 4-port CSI-RS, and CDM-4 applied to four REs in the form of a 2-by-2 matrix may also be considered to be applied for an 8-port aggregation case.

In the legacy CSI-RS design, CSI-RS density of 1 RE/RB/port is maintained. However, with this density, the cell reuse factor of a newly defined CSI-RS having 24-, 28-, and 32-port becomes 1 at maximum. To increase the cell reuse factor and reduce the overall network CSI-RS overhead, an FDM-based CSI-RS design may be considered. In the FDM-based CSI-RS design, two neighboring PRB-pairs may be used to configure a new CSI-RS port. In this case, CSI-RS density becomes 0.5 RE/RB/port.

Figure 33:
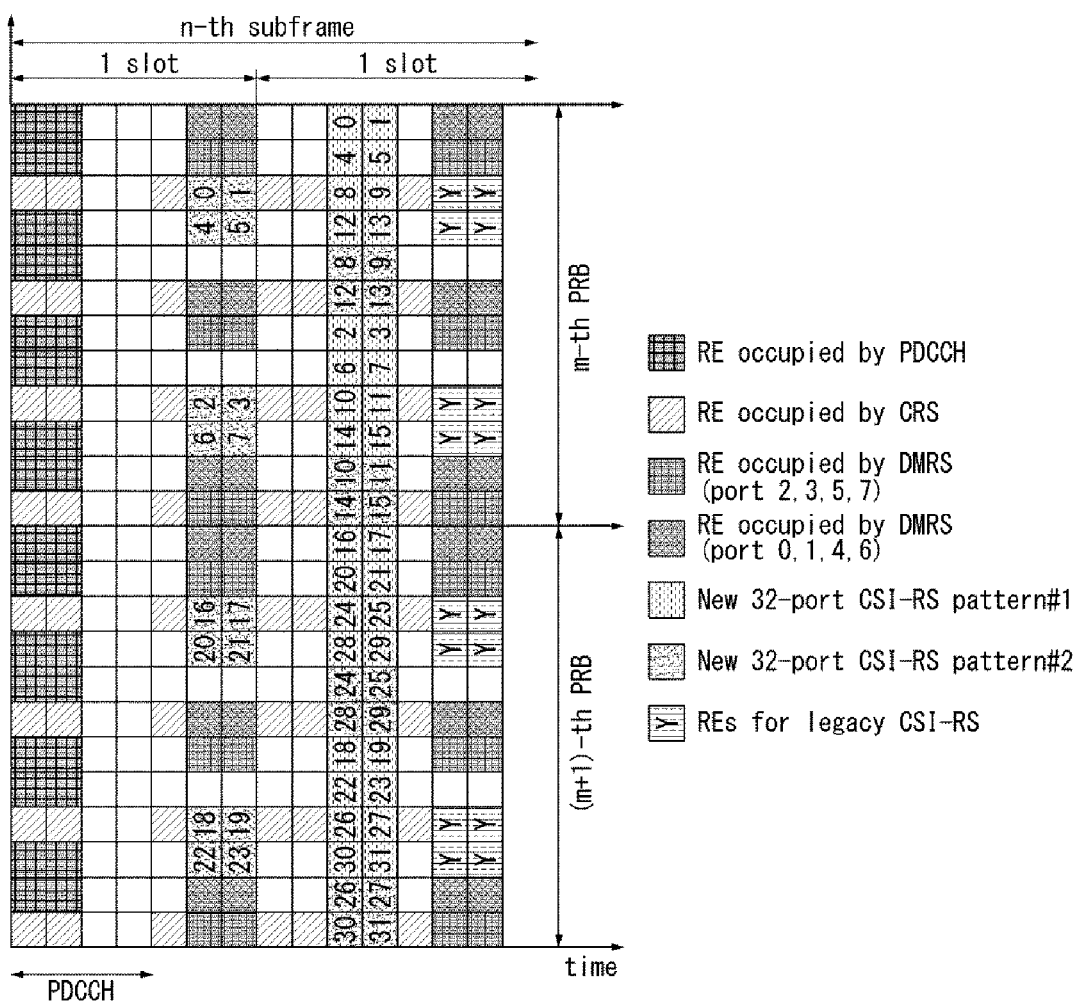
FIG. 33 illustrates an FDM-based 32-port CSI-RS design according to one embodiment of the present invention.

FIG. 33 illustrates an FDM-based 32-port CSI-RS design according to one embodiment of the present invention.

Each block in the figure represents REs, and OFDM symbol indices ranging from 0 to 13 are allocated to the REs sequentially from left to right direction, and subcarrier indices ranging from 0 to 11 are allocated to the REs sequentially from bottom to top direction.

If such FDM-based CSI-RS design is chosen with low CSI-RS density (<1 RE/RB/port), delay spread may not be estimated accurately only with the FDM-based CSI-RS, thereby leading to degradation of noise suppression performance.

To solve the problem, QCL linkage between a CSI-RS and a CRS may be assumed for delay spread in addition to at least existing QCL features (namely Doppler shift and Doppler spread). Also, in the case of an FDM-based CSI-RS design, power boosting of CSI-RS transmission according to CDM-4 may not be satisfactory due to the large number of CSI-RS ports. Therefore, CDM-8 may be applied to a new CSI-RS design supporting 8-port aggregation (namely 24- and 32-port CSI-RSs). In this case, CDM-8 may be applied to the REs located at the aggregated (legacy) 8-port CSI-RS.

Figure 34:
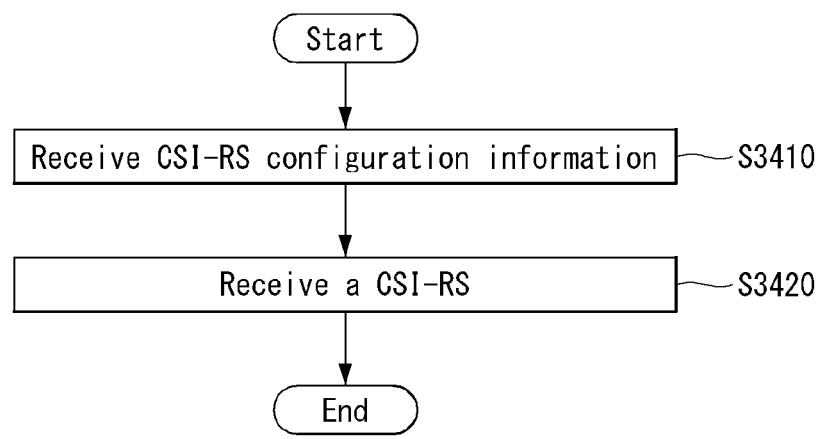
FIG. 34 is a flow diagram illustrating a method for receiving a CSI-RS by a UE according to one embodiment of the present invention.

FIG. 34 is a flow diagram illustrating a method for receiving a CSI-RS by a UE according to one embodiment of the present invention. In particular, the present flow diagram corresponds to an extended/supplementing embodiment of the embodiments described above with reference to FIGS. 27 and 30(*a*). Since descriptions already given with respect to the embodiments above may also be applied in the same way or in a similar way for the description of the present figure, repeated descriptions will be omitted.

First, the UE may receive CSI-RS configuration information about a CSI-RS configuration to which the CSI-RS is mapped S3410. Next, on the basis of the received CSI-RS configuration information, the UE may receive a CSI-RS transmitted through a plurality of antenna ports from the eNB S3420.

When the CSI-RS configuration is a 32-port CSI-RS configuration into which four 8-port CSI-RS configurations are aggregated, CDM-8 pattern, in which the number of orthogonal weight vectors is 8, may be applied to the 32-port CSI-RS configuration. In this case, the CDM-8 pattern may be applied to one RE-pair selected for each of the aggregated 8-port CSI-RS configurations.

As described above, the 32-port CSI-RS configuration may comprise aggregation of a first to a fourth (legacy) 8-port CSI-RS configurations selected from among five (legacy) 8-port CSI-RS configurations located at a RB-pair (namely PRB-pair).

At this time, as shown in Table 3, suppose an 8-port CSI-RS configuration '0' including REs located at orthogonal frequency division multiplexing (OFDM) symbol index 5 to 6, subcarrier index 8 to 9 and 2 to 3; an 8-port CSI-RS configuration '1' located at the OFDM symbol index 9 to 10, the subcarrier index 10 to 11 and 4 to 5; an 8-port CSI-RS configuration '2' located at the OFDM symbol index 9 to 10, the subcarrier index 8 to 9 and 2 to 3; an 8-port CSI-RS configuration '3' located at the OFDM symbol index 9 to 10, the subcarrier index 6 to 7 and 0 to 1; and an 8-port CSI-RS configuration '4' located at the OFDM symbol index 12 to 13, the subcarrier index 8 to 9 and 2 to 3 is defined. In this case, the first to the fourth 8-port CSI-RS configurations may be selected from among the 8-port CSI-RS configurations '0' to '4'. For example, the first (legacy) 8-port CSI-RS configuration may correspond to the 8-port CSI-RS configuration '0', and the fourth (legacy) 8-port CSI-RS configuration may correspond to the 8-port CSI-RS configuration '4'. Also, the second and the third (legacy) 8-port CSI-RS configurations may be selected from the 8-port CSI-RS configurations '1' to '3'. For example, the second (legacy) 8-port CSI-RS configuration may be selected from the 8-port CSI-RS configuration '2', and the third (legacy) 8-port CSI-RS configuration may be selected from the 8-port CSI-RS configuration '3', respectively.

Also, suppose a first group consisting of aggregation of RE pairs having the highest subcarrier index for each of the aggregated 8-port CSI-RS configurations, a third group consisting of aggregation of RE pairs having the second highest subcarrier index for each of the aggregated 8-port CSI-RS configurations, a second group consisting of aggregation of RE pairs having the third highest subcarrier index for each of the aggregated 8-port CSI-RS configurations, and a fourth group consisting of aggregation of RE pairs having the fourth highest subcarrier index for each of the aggregated 8-port CSI-RS configurations are defined. In this case, the same CDM-8 pattern may be applied to each of the first to the fourth groups.

At this time, coordinates (k', l') of RE pairs included in the first group may correspond to (9, 5) and (9, 6); (9, 9) and (9, 10); (7, 9) and (7, 10); and (9, 12) and (9, 13), the coordinates of the RE pairs included in the third group may correspond to (8, 5) and (8, 6); (8, 9) and (8, 10); (6, 9) and (6, 10); and (8, 12) and (8, 13), the coordinates of the RE pairs included in the second group may correspond to (3, 5) and (3, 6); (3, 9) and (3, 10); (1, 9) and (1, 10); and (3, 12) and (3, 13), and the coordinates of the RE pairs included in the fourth group may correspond to (2, 5) and (2, 6); (2, 9) and (2, 10); (0, 9) and (0, 10); and (2, 12) and (2, 13), respectively.

If subframes to which a CSI-RS is transmitted are divided into a first set the subcarrier index of which ranges from 0 to 5 along the frequency axis and a second set the subcarrier index of which ranges from 6 to 11, the first and the second group may be located in the first set, and the third and the fourth group may be located in the second set.

The 32 CSI-RS antenna ports transmitting the 32-port CSI-RS configuration may be numbered in units of 8-ports. More specifically, 32 CSI-RS antenna ports transmitting the 32-port CSI-RS configuration may be numbered according to Eq. 20, 21, or 24.

Also, antenna port numbers corresponding to the first group may be {15, 16, 23, 24, 31, 32, 39, 40}, antenna port numbers corresponding to the second group may be {17, 18, 25, 26, 33, 34, 41, 42}, antenna port numbers corresponding to the third group may be {19, 20, 27, 28, 35, 36, 43, 44}, and antenna port numbers corresponding to the fourth group may be {21, 22, 29, 30, 37, 38, 45, 46}.

At this time, the weight vector of the CDM-8 pattern applied for each group may be determined by Eq. 15. Therefore, a CDM-8 pattern of [1 1 1 1 1 1 1 1] may be applied to the CSI-RS transmitted through antenna ports numbered as 15, 17, 19, and 21; a CDM-8 pattern of [1 −1 1 −1 1 −1 1 −1] may be applied to the CSI-RS transmitted through antenna ports numbered as 16, 18, 20, and 22; a CDM-8 pattern of [1 1 −1 −1 1 1 −1 −1] may be applied to the CSI-RS transmitted through antenna ports numbered as 23, 25, 27, and 29; a CDM-8 pattern of [1 −1 −1 1 1 −1 −1 1] may be applied to the CSI-RS transmitted through antenna ports numbered as 24, 26, 28, and 30; a CDM-8 pattern of [1 1 1 1 −1 −1 −1 −1] may be applied to the CSI-RS transmitted through antenna ports numbered as 31, 33, 35, and 37; a CDM-8 pattern of [1 −1 1 −1 −1 1 −1 1] may be applied to the CSI-RS transmitted through antenna ports numbered as 32, 34, 36, and 38; a CDM-8 pattern of [1 1 −1 −1 −1 −1 1 1] may be applied to the CSI-RS transmitted through antenna ports numbered as 39, 41, 43, and 45; and a CDM-8 pattern of [1 −1 −1 1 −1 1 1 −1] may be applied to the CSI-RS transmitted through antenna ports numbered as 40, 42, 44, and 46. The application of CDM-8 per antenna port may be summarized as shown in Table 7.

The Apparatus to which the Present Invention May be Applied in General

Figure 35:
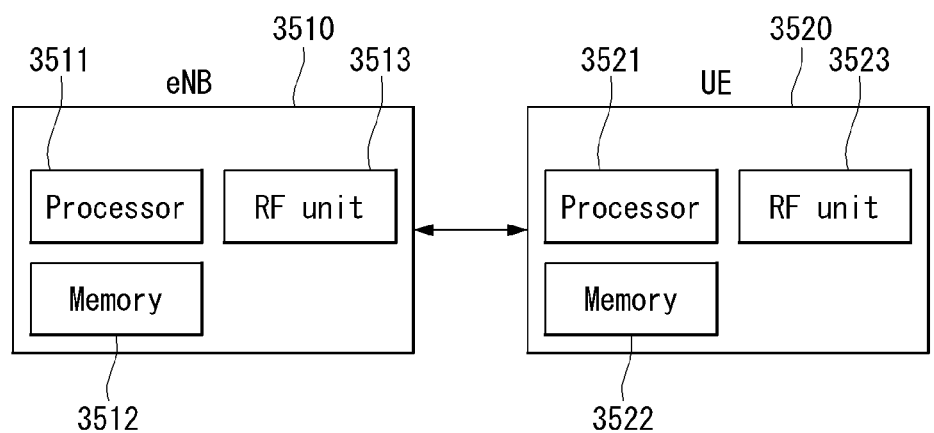
FIG. 35 illustrates a block diagram of a wireless communication apparatus according to one embodiment of the present invention.

FIG. 35 illustrates a block diagram of a wireless communication apparatus according to one embodiment of the present invention.

Referring to FIG. 35, a wireless communication system comprises an eNB 3510 and a plurality of UEs 3520 located within the range of the eNB 3510.

The eNB 3510 comprises a processor 3511, memory 3512, and RF (Radio Frequency) unit 3513. The processor 3511 implements the functions, processes and/or methods described with reference to FIGS. 1 to 34. Layers of a wireless interface protocol may be implemented by the processor 3511. The memory 3512, being connected to the processor 3511, stores various kinds of information to operate the processor 3511. The RF unit 3513, being connected to the processor 3511, transmits and/or receives a radio signal.

The UE 3520 comprises a processor 3521, memory 3522, and RF unit 3523. The processor 3521 implements the functions, processes and/or methods described with reference to FIGS. 1 to 34. Layers of a wireless interface protocol may be implemented by the processor 3521. The memory 3522, being connected to the processor 3521, stores various kinds of information to operate the processor 3521. The RF unit 3523, being connected to the processor 3521, transmits and/or receives a radio signal.

The memory 3512, 3522 may be installed inside or outside the processor 3511, 3521 and may be connected to the processor 3511, 3521 via various well-known means. Also, the eNB 3510 and/or the UE 3520 may be equipped with a single antenna or multiple antennas.

The embodiments described above are combinations of constituting elements and features of the present invention in a predetermined form. Each individual element or feature has to be considered as optional except where otherwise explicitly indicated. Each individual element or feature may be implemented solely without being combined with other elements or features. Also, it is also possible to construct the embodiments of the present invention by combining a portion of the elements and/or features. A portion of a structure or feature of an embodiment may be included in another embodiment or may be replaced with the corresponding structure of feature of another embodiment. It should be clearly understood that the claims which are not explicitly cited within the technical scope of the present invention may be combined to form an embodiment or may be included in a new claim by an amendment after application.

The embodiments of the present invention may be implemented by various means such as hardware, firmware, software, or a combination thereof. In the case of hardware implementation, one embodiment of the present invention may be implemented by using one or more of ASICs (Application Specific Integrated Circuits), DPSs (Digital Signal Processors), DSPDs (Digital Signal Processing Devices), PLDs (Programmable Logic Devices), FPGAs (Field Programmable Gate Arrays), processors, controllers, micro-controllers, and micro-processors.

In the case of implementation by firmware or software, one embodiment of the present invention may be implemented in the form of modules, procedures, functions, and the like which perform the functions or operations described above. Software codes may be stored in the memory and activated by the processor. The memory may be located inside or outside of the processor and may exchange data with the processor by using various well-known means.

It is apparent for those skilled in the art that the present invention may be embodied in other specific forms without departing from the essential characteristics of the present invention. Therefore, the detailed descriptions above should be regarded as being illustrative rather than restrictive in every aspect. The technical scope of the present invention should be determined by a reasonable interpretation of the appended claims, and all of the modifications that fall within an equivalent scope of the present invention belong to the technical scope of the present invention.

MODE FOR INVENTION

Various forms for embodiment of the present invention have been described in the best mode for embodiment of the present invention.

INDUSTRIAL APPLICABILITY

This document discloses a method for transmitting and receiving data in a wireless communication system with examples based on the 3GPP LTE/LTE-A system; however, the present invention may be applied to various other types of wireless communication systems in addition to the 3GPP LTE/LTE-A system.

The invention claimed is:

1. A method for receiving a channel state information-reference signal (CSI-RS) by a user equipment (UE) in a wireless communication system, the method comprising:
   receiving, from a base station, CSI-RS configuration information about a CSI-RS configuration to which the CSI-RS is mapped; and
   receiving the CSI-RS transmitted from the base station through plurality of antenna ports based on the received CSI-RS configuration information,
   wherein, when the CSI-RS configuration is a 32-port CSI-RS configuration into which four 8-port CSI-RS configurations are aggregated, a code division multiplexed (CDM)-8 pattern, in which the number of orthogonal weight vectors is 8, is applied to the 32-port CSI-RS configuration,
   wherein the CDM-8 pattern is applied to a plurality of resource element (RE) pairs selected for each of the four 8-port CSI-RS configurations,
   wherein all or some of the plurality of RE pairs are not contiguous in at least one of a time domain and a frequency domain.

2. The method of claim 1, wherein the 32-port CSI-RS configuration comprises aggregation of the four 8-port CSI-RS configurations selected from among five 8-port CSI-RS configurations located at a resource block (RB)-pair.

3. The method of claim 2, wherein an 8-port CSI-RS configuration '0' including REs located at orthogonal frequency division multiplexing (OFDM) symbol index 5 to 6, subcarrier index 8 to 9 and 2 to 3;
   an 8-port CSI-RS configuration '1' located at the OFDM symbol index 9 to 10, the subcarrier index 10 to 11 and 4 to 5;
   an 8-port CSI-RS configuration '2' located at the OFDM symbol index 9 to 10, the subcarrier index 8 to 9 and 2 to 3;
   an 8-port CSI-RS configuration '3' located at the OFDM symbol index 9 to 10, the subcarrier index 6 to 7 and 0 to 1; and
   an 8-port CSI-RS configuration '4' located at the OFDM symbol index 12 to 13, the subcarrier index 8 to 9 and 2 to 3 is defined.

4. The method of claim 3, wherein the four 8-port CSI-RS configurations are selected from among the 8-port CSI-RS configurations '0' to '4'.

5. The method of claim 4, wherein the first 8-port CSI-RS configuration corresponds to the 8-port CSI-RS configuration '0', the second 8-port CSI-RS configuration corresponds to the 8-port CSI-RS configuration '2', the third 8-port CSI-RS configuration corresponds to the 8-port CSI-RS configuration '3', and the fourth 8-port CSI-RS configuration corresponds to the 8-port CSI-RS configuration '4'.

6. The method of claim 4, wherein, when a first group consisting of aggregation of RE pairs having the highest subcarrier index for each of the aggregated 8-port CSI-RS configurations, a third group consisting of aggregation of RE pairs having the second highest subcarrier index for each of the aggregated 8-port CSI-RS configurations, a second group consisting of aggregation of RE pairs having the third highest subcarrier index for each of the aggregated 8-port CSI-RS configurations, and a fourth group consisting of aggregation of RE pairs having the fourth highest subcarrier index for each of the aggregated 8-port CSI-RS configurations are defined, the same CDM-8 pattern is applied to each of the first to the fourth groups.

7. The method of claim 6,
wherein coordinates (k', l') of RE pairs included in the first group correspond to (9, 5) and (9, 6); (9, 9) and (9, 10); (7, 9) and (7, 10); and (9, 12) and (9, 13);
the coordinates of the RE pairs included in the third group correspond to (8, 5) and (8, 6); (8, 9) and (8, 10); (6, 9) and (6, 10); and (8, 12) and (8, 13);
the coordinates of the RE pairs belonging to the second group correspond to (3, 5) and (3, 6); (3, 9) and (3, 10); (1, 9) and (1, 10); and (3, 12) and (3, 13); and
the coordinates of the RE pairs included in the fourth group correspond to (2, 5) and (2, 6); (2, 9) and (2, 10); (0, 9) and (0, 10); and (2, 12) and (2, 13), respectively, and
wherein the k' indicates the subcarrier index within one subframe, and the l' denotes the OFDM symbol index within the one subframe.

8. The method of claim 6, wherein 32 CSI-RS antenna ports transmitting the 32-port CSI-RS configuration are numbered in units of 8-ports.

9. The method of claim 8, wherein 32 CSI-RS antenna ports transmitting the 32-port CSI-RS configuration are numbered according to Equation. 1 below:

$$n=kN+p', p'=15,\ldots,+14+N, k=0,1,\ldots,K-1,$$ [Eq. 1]

wherein n indicates a final CSI-RS port number determined according to the Equation. 1, N indicates the number of antenna ports for each of the aggregated CSI-RS configurations, and k indicates the aggregated CSI-RS configuration number.

10. The method of claim 9, wherein antenna port numbers corresponding to the first group are {15, 16, 23, 24, 31, 32, 39, 40}, antenna port numbers corresponding to the second group are {17, 18, 25, 26, 33, 34, 41, 42}, antenna port numbers corresponding to the third group are {19, 20, 27, 28, 35, 36, 43, 44}, and antenna port numbers corresponding to the fourth group are {21, 22, 29, 30, 37, 38, 45, 46}.

11. The method of claim 10, wherein the weight vector of the CDM-8 pattern is determined by Equation. 2 below:

$$W_0=[1\ 1\ 1\ 1\ 1\ 1\ 1\ 1],$$

$$W_1=[1\ -1\ 1\ -1\ 1\ -1\ 1\ -1],$$

$$W_2=[1\ 1\ -1\ -1\ 1\ 1\ -1\ -1],$$

$$W_3=[1\ -1\ -1\ 1\ 1\ -1\ -1\ 1],$$

$$W_4=[1\ 1\ 1\ 1\ -1\ -1\ -1\ -1],$$

$$W_5=[1\ -1\ 1\ -1\ -1\ 1\ -1\ 1],$$

$$W_6=[1\ 1\ -1\ -1\ -1\ -1\ 1\ 1],$$

$$W_7=[1\ -1\ -1\ 1\ -1\ 1\ 1\ -1].$$ [Eq. 2]

12. The method of claim 11, wherein a CDM-8 pattern of [1 1 1 1 1 1 1 1] is applied according to the Equation. 2 to CSI-RS transmitted through antenna ports numbered as 15, 17, 19, and 21 according to the Equation. 1,
a CDM-8 pattern of [1 -1 1 -1 1 -1 1 -1] is applied according to the Equation. 2 to CSI-RS transmitted through antenna ports numbered as 16, 18, 20, and 22 according to the Equation. 1,
a CDM-8 pattern of [1 1 -1 -1 1 1 -1 -1] is applied according to the Equation. 2 to CSI-RS transmitted through antenna ports numbered as 23, 25, 27, and 29 according to the Equation. 1,
a CDM-8 pattern of [1 -1 -1 1 1 -1 -1 1] is applied according to the Equation. 2 to CSI-RS transmitted through antenna ports numbered as 24, 26, 28, and 30 according to the Equation. 1,
a CDM-8 pattern of [1 1 1 1 -1 -1 -1 -1] is applied according to the Equation. 2 to CSI-RS transmitted through antenna ports numbered as 31, 33, 35, and 37 according to the Equation. 1,
a CDM-8 pattern of [1 -1 1 -1 -1 1 -1 1] is applied according to the Equation. 2 to CSI-RS transmitted through antenna ports numbered as 32, 34, 36, and 38 according to the Equation. 1,
a CDM-8 pattern of [1 1 -1 -1 -1 -1 1 1] is applied according to the Equation. 2 to CSI-RS transmitted through antenna ports numbered as 39, 41, 43, and 45 according to the Equation. 1, and
a CDM-8 pattern of [1 -1 -1 1 -1 1 1 -1] is applied according to the Equation. 2 to CSI-RS transmitted through antenna ports numbered as 40, 42, 44, and 46 according to the Equation. 1.

13. The method of claim 12, wherein the CSI-RS configuration is set to one of the 32-port CSI-RS configuration which is aggregation of the four 8-port CSI-RS configurations, 20-port CSI-RS configuration which is aggregation of five 4-port CSI-RS configurations, 24-port CSI-RS configuration which is aggregation of three 8-port CSI-RS configurations, and 28-port CSI-RS configuration which is aggregation of 7 four-port CSI-RS configurations.

14. A UE receiving a CSI-RS in a wireless communication system, the UE comprising:
a Radio Frequency (RF) unit transmitting and receiving a radio signal; and
a processor controlling the RF unit, wherein the processor is configured
to receive, from a base station, CSI-RS configuration information about a CSI-RS configuration to which the CSI-RS is mapped; and
to receive the CSI-RS transmitted from the base station through plurality of antenna ports based on the received CSI-RS configuration information, wherein, when the CSI-RS configuration is a 32-port CSI-RS configuration into which four 8-port CSI-RS configurations are aggregated, a code division multiplexed (CDM)-8 pattern, in which the number of orthogonal weight vectors is 8, is applied to the 32-port CSI-RS configuration, wherein the CDM-8 pattern is applied to resource element (RE) pairs selected for each of the four 8-port CSI-RS configurations,
wherein all or some of the plurality of RE pairs are not contiguous in at least one of a time domain and a frequency domain.

15. The UE of claim 14, wherein the 32-port CSI-RS configuration comprises aggregation of the four 8-port CSI-RS configurations selected from among five 8-port CSI-RS configurations located at a resource block (RB)-pair.

* * * * *